(12) United States Patent
Murata et al.

(10) Patent No.: US 7,907,184 B2
(45) Date of Patent: Mar. 15, 2011

(54) PICTURE PROCESSING APPARATUS, PICTURE PROCESSING METHOD, PICTURE TAKING APPARATUS, AND PROGRAM

(75) Inventors: Makoto Murata, Tokyo (JP); Machiko Segawa, Tokyo (JP); Keigo Ihara, Tokyo (JP); Nobuyuki Matsushita, Kanagawa (JP); Eiji Takahashi, Chiba (JP); Ryu Aoyama, Kanagawa (JP); Caoyi Lu, Tokyo (JP); Hiroyuki Maruyama, Kanagawa (JP); Brian Clarkson, Tokyo (JP)

(73) Assignee: Sony Corporation, Tokyo (JP)

( * ) Notice: Subject to any disclaimer, the term of this patent is extended or adjusted under 35 U.S.C. 154(b) by 1596 days.

(21) Appl. No.: 11/195,824

(22) Filed: Aug. 3, 2005

(65) Prior Publication Data

US 2006/0078312 A1 Apr. 13, 2006

(30) Foreign Application Priority Data

Aug. 11, 2004 (JP) ................................. 2004-234392

(51) Int. Cl.
*H04N 5/228* (2006.01)
(52) U.S. Cl. ............. 348/222.1; 348/333.01; 348/231.2; 348/231.6; 348/231.9
(58) Field of Classification Search ............... 348/222.1, 348/333.01–333.09, 231.2, 231.6, 231.9; 386/117, 125
See application file for complete search history.

(56) References Cited

U.S. PATENT DOCUMENTS

| 5,005,083 A * | 4/1991 | Grage et al. ................. 348/588 |
| 6,347,313 B1 * | 2/2002 | Ma et al. ........................... 707/3 |
| 6,680,749 B1 * | 1/2004 | Anderson et al. ........ 348/231.99 |
| 7,337,403 B2 * | 2/2008 | Pavley et al. .................. 715/747 |

FOREIGN PATENT DOCUMENTS

| JP | 10-320400 | 12/1998 |
| JP | 2000-285243 | 10/2000 |
| JP | 2000-322450 | 11/2000 |
| JP | 2001-236514 | 8/2001 |
| JP | 2002-044573 | 2/2002 |

* cited by examiner

*Primary Examiner* — Yogesh K Aggarwal
(74) *Attorney, Agent, or Firm* — Oblon, Spivak, McClelland, Maier & Neustadt, L.L.P.

(57) ABSTRACT

A picture processing apparatus is disclosed which includes: an acquiring device which, apart from a first picture sequence picked up for reproduction purposes, acquires a second picture sequence picked up in synchronism with the first picture sequence, the second picture sequence being made up of pictures wider in angle than those constituting the first picture sequence; a calculating device operable to calculate degrees of similarity between scenes each made up of a predetermined number of consecutive pictures included in the second picture sequence; and a linking device which, after appropriating the degrees of similarity calculated by the calculating device for the degrees of similarity between the corresponding scenes in the first picture sequence, links together those of the corresponding scenes which have high degrees of similarity in the first picture sequence.

16 Claims, 43 Drawing Sheets

FIG.13

|  | SCENE | | | | | | | |
|---|---|---|---|---|---|---|---|---|
|  | $S_0$ | $S_1$ | $S_2$ | $S_3$ | $S_4$ | $S_5$ | $S_6$ | ... |
| SCENE $S_0$ | | $d_{01}$ | $d_{02}$ | $d_{03}$ | $d_{04}$ | $d_{05}$ | $d_{06}$ | |
| $S_1$ | $d_{10}$ | | $d_{12}$ | $d_{13}$ | $d_{14}$ | $d_{15}$ | $d_{16}$ | |
| $S_2$ | $d_{20}$ | $d_{21}$ | | $d_{23}$ | $d_{24}$ | $d_{25}$ | $d_{26}$ | |
| $S_3$ | $d_{30}$ | $d_{31}$ | $d_{32}$ | | $d_{34}$ | $d_{35}$ | $d_{36}$ | |
| $S_4$ | $d_{40}$ | $d_{41}$ | $d_{42}$ | $d_{43}$ | | $d_{45}$ | $d_{46}$ | |
| $S_5$ | $d_{50}$ | $d_{51}$ | $d_{52}$ | $d_{53}$ | $d_{54}$ | | $d_{56}$ | |
| TIME BASE $S_6$ | $d_{60}$ | $d_{61}$ | $d_{62}$ | $d_{63}$ | $d_{64}$ | $d_{65}$ | | |

TIME BASE →

FIG.19

```
    [LinkData]
 1: Frame0_LinkNum=3
 2: Frame0_Link0=2452
 3: Frame0_Link1=5664
 4: Frame0_Link2_FileName=family.mpg
 5: Frame0_Link2=343
 6: Frame0_Next=15
 7: Frame15_LinkNum=0
 8: Frame15_Next=476
 9: Frame476_LinkNum=2
10: Frame476_Link0=66545
11: Frame476_Link1=546
12: Frame476_Next=513
13: Frame513_LinkNum=0
14: Frame513_Next=1556
15: Frame1556_LinkNum=1
16: Frame1556_Link0=33333
17: Frame1556_Next=1590
18: Frame1590_LinkNum=0
19: Last=1590
```

FIG. 33

[ClusterInfo]
1: ClusterDepthNum=3

[ClusterDepth0]
2: ClusterNum=2
3: ClusterTitle0= INSIDE THE HOUSE
4: ClusterTitle1= GARDEN

[ClusterDepth1]
5: ClusterNum=3
6: ClusterTitle0= INSIDE THE HOUSE
7: ClusterTitle1= ENTRANCE
8: ClusterTilte2= GARDEN

[ClusterDepth2]
9: ClusterNum=5
10: ClusterTitle0= INSIDE THE HOUSE
11: ClusterTitle1= CAR
12: ClusterTitle2= ENTRANCE
13: ClusterTitle3= CAFE
14: ClusterTilte4= GARDEN

FIG. 34

```
[ClusterData]
 1:     Frame0_Depth0=1
 2:     Frame0_Depth1=2
 3:     Frame0_Depth2=4
 4:     Frame0_Next_Depth0=443
 5:     Frame0_Next_Depth1=200
 6:     Frame0_Next_Depth2=200
 7:     Frame200_Depth1=1
 8:     Frame200_Depth2=2
 9:     Frame200_Next_Depth1=443
10:     Frame200_Next_Depth2=443
11:     Frame443_Depth0=0
12:     Frame443_Depth1=0
13:     Frame443_Depth2=0
14:     Last_Depth0=443
15:     Last_Depth1=443
16:     Last_Depth2=443
```

PICTURE PROCESSING APPARATUS, PICTURE PROCESSING METHOD, PICTURE TAKING APPARATUS, AND PROGRAM

CROSS REFERENCES TO RELATED APPLICATIONS

The present invention contains subject matter related to Japanese Patent Application JP 2004-234392 filed with the Japanese Patent Office on Aug. 11, 2004, the entire contents of which being incorporated herein by reference.

BACKGROUND OF THE INVENTION

The present invention relates to a picture processing apparatus, a picture processing method, a picture taking apparatus, and a program. More particularly, the invention relates to a picture processing apparatus, a picture processing method, a picture taking apparatus, and a program for having similar scenes associated with one another for easy handling.

Falling prices of video cameras in recent years have prompted these devices to become widely available. With their enclosures getting smaller than ever, the video cameras can let people take moving pictures easily wherever they are. Moving pictures are also taken casually through the use of a moving picture pickup feature incorporated in mobile phones and digital still cameras.

Japanese Patent Laid-open No. 2004-62868 discloses techniques for recording the names of recorded subjects as meta data about picked-up pictures. These and other techniques exist which allow a variety of attribute information to be added to the picked-up pictures with a view to facilitating subsequent handling of the pictures. Illustratively, some business-use video cameras are designed to add such attributes as the weather during picture taking, locations, sound volumes, and thumbnails representative of clips (each clip is composed of moving pictures acquired from a single picture-taking session) to each of the scenes that have been picked up.

SUMMARY OF THE INVENTION

Although picture taking itself has become easier than ever thanks to the improvements mentioned above, it is still tiresome and awkward to deal with the pictures taken. In the case of the DV (digital video) type video camera, for example, moving pictures recorded on a DV tape are basically reproduced only in the order in which they were taken. Users are unable to view recorded moving pictures casually.

That is, the user generally wants to view only part of all scenes recorded on the DV tape. However, the particular scenes desired to be viewed cannot be extracted readily for reproduction apart from the rest on the tape. Besides the favorite scenes, the user is obliged to watch unnecessary scenes being reproduced chronologically, which can be a boring experience.

Where a plurality of still pictures taken by a digital still camera are captured into a personal computer or like equipment, these pictures may be displayed as thumbnails on the display to let the user select only desired scenes with ease. If specific scenes alone are selected and reproduced just as easily from moving pictures, the user will not be bored having to watch uninteresting scenes.

In recent years, nonlinear editing by use of the personal computer has become commonplace. It has become popular to edit desired scenes alone through such editing processes and to write them to special media such as DVD (digital versatile disk) known for their small size and for their ease and convenience in offering immediate access to and reproduction of any of the desired pictures recorded thereon. Still, the procedures to have the personal computer capture and edit recorded moving pictures can be tortuous and complicated.

For example, suppose that tens of or hundreds of clips are captured into the personal computer from a single DV tape. In this case, the user may try to edit necessary scenes alone but end up reproducing each of the clips to determine which clips represent which scenes of moving pictures. This can amount to tremendously time-consuming editing work.

In such a case, if it is possible to select at least specific scenes easily, the burdens of editing work are expected to be alleviated appreciably.

The present invention has been made in view of the above circumstances and provides arrangements for having similar scenes associated with one another for easy handling.

According to an embodiment of the present invention, there is provided a picture processing apparatus including: an acquiring device which, apart from a first picture sequence picked up for reproduction purposes, acquires a second picture sequence picked up in synchronism with the first picture sequence, the second picture sequence being made up of pictures wider in angle than those constituting the first picture sequence; a calculating device operable to calculate degrees of similarity between scenes each made up of a predetermined number of consecutive pictures included in the second picture sequence; and a linking device which, after appropriating the degrees of similarity calculated by the calculating device for the degrees of similarity between the corresponding scenes in the first picture sequence, links together those of the corresponding scenes which have high degrees of similarity in the first picture sequence.

Preferably, the pictures constituting the second picture sequence may be arranged to have a resolution lower than that of the pictures making up the first picture sequence.

In linking the scenes of the first picture sequence, the linking device may preferably establish, as a link destination for a first scene in the first picture sequence, a second scene having a high degree of similarity to the first scene.

The linking device may preferably establish, as the link destination for the first scene, the second scene having a pickup timestamp separated from that of the first scene by a predetermined time period, the second scene being one of the scenes having high degrees of similarity to the first scene.

The linking device may preferably search the first picture sequence for scenes based on the degrees of similarity calculated by the calculating device.

The picture processing apparatus according to the invention may further include: a reproducing device operable to reproduce the first picture sequence; and a displaying device which, while the first scene is being reproduced by the reproducing device on a screen, displays the second scene established as the link destination for the first scene on the same screen but in a position different from that in which the first scene is being displayed.

The reproducing device may preferably start reproducing the second scene when the second scene being displayed by the displaying device is selected by a user.

The linking device may preferably process the scenes of the first picture sequence into clusters in accordance with the degrees of similarity.

The linking device may preferably establish a degree of cluster granularity so as to process all scenes of the first picture sequence into a number of clusters determined by the established granularity.

The linking device may preferably establish a plurality of degrees of the cluster granularity so as to process all scenes of the first picture sequence into a number of clusters determined by each of the established degrees of the granularity.

The picture processing apparatus according to the invention may further include a reproducing device operable to reproduce on a screen the scenes belonging to a particular cluster of the first picture sequence following the clustering performed by the linking device.

The picture processing apparatus according to the invention may further include a distribution displaying device operable to display a distribution of the scenes belonging to the cluster on a time base following the clustering performed by the linking device, the distribution being displayed on the same screen but in a position different from that in which the scenes reproduced by the reproducing device are displayed.

The reproducing device may preferably start reproducing a scene selected from the distribution of the scenes belonging to the cluster, the distribution being displayed by the distribution displaying device.

The calculating device may preferably calculate the degrees of similarity between the scenes of the second picture sequence by matching a feature quantity of each of the pictures constituting each of the scenes, against a hidden Markov model called HMM generated from the second picture sequence.

The picture processing apparatus according to the invention may further include a creating device operable to create meta data representative of results of the linking performed by the linking device, the created meta data being stored in conjunction with the first picture sequence.

According to another embodiment of the present invention, there is provided a picture processing method including the steps of: apart from a first picture sequence picked up for reproduction purposes, acquiring a second picture sequence picked up in synchronism with the first picture sequence, the second picture sequence being made up of pictures wider in angle than those constituting the first picture sequence; calculating degrees of similarity between scenes each made up of a predetermined number of consecutive pictures included in the second picture sequence; and after appropriating the degrees of similarity calculated in the calculating step for the degrees of similarity between the corresponding scenes in the first picture sequence, linking together those of the corresponding scenes which have high degrees of similarity in the first picture sequence.

According to a further embodiment of the present invention, there is provided a program for causing a computer to execute a process including the steps of: apart from a first picture sequence picked up for reproduction purposes, acquiring a second picture sequence picked up in synchronism with the first picture sequence, the second picture sequence being made up of pictures wider in angle than those constituting the first picture sequence; calculating degrees of similarity between scenes each made up of a predetermined number of consecutive pictures included in the second picture sequence; and after appropriating the degrees of similarity calculated in the calculating step for the degrees of similarity between the corresponding scenes in the first picture sequence, linking together those of the corresponding scenes which have high degrees of similarity in the first picture sequence.

According to an even further embodiment of the present invention, there is provided a picture taking apparatus including: a first pickup device operable to pick up a first picture sequence; a second pickup device operable to pick up a second picture sequence; an acquiring device which, apart from the first picture sequence picked up for reproduction purposes, acquires the second picture sequence picked up in synchronism with the first picture sequence, the second picture sequence being made up of pictures wider in angle than those constituting the first picture sequence; a calculating device operable to calculate degrees of similarity between scenes each made up of a predetermined number of consecutive pictures included in the second picture sequence; and a linking device which, after appropriating the degrees of similarity calculated by the calculating device for the degrees of similarity between the corresponding scenes in the first picture sequence, links together those of the corresponding scenes which have high degrees of similarity in the first picture sequence.

Where the picture processing apparatus, picture processing method, and program according to the invention are in use, apart from a first picture sequence picked up for reproduction purposes, a second picture sequence picked up in synchronism with the first picture sequence is acquired. The second picture sequence is made up of pictures wider in angle than those constituting the first picture sequence. Degrees of similarity are then calculated between scenes each made up of a predetermined number of consecutive pictures included in the second picture sequence. After the degrees of similarity thus calculated are appropriated for the degrees of similarity between the corresponding scenes in the first picture sequence, those of the corresponding scenes which have high degrees of similarity in the first picture sequence are linked together.

Where the picture taking apparatus according to the invention is in use, a first picture sequence and a second picture sequence are picked up. The second picture sequence is acquired in synchronism with the first picture sequence picked up for reproduction purposes, the second picture sequence being made up of pictures wider in angle than those constituting the first picture sequence. Degrees of similarity are calculated between scenes each made up of a predetermined number of consecutive pictures included in the second picture sequence. After the degrees of similarity thus calculated are appropriated for the degrees of similarity between the corresponding scenes in the first picture sequence, those of the corresponding scenes which have high degrees of similarity in the first picture sequence are linked together.

One advantage of this invention outlined above is that similar scenes are linked together for easy handling. Another advantage is that while a given scene is being reproduced, the user may be presented with scenes similar to the ongoing scene. A further advantage is that only similar scenes may be presented consecutively to the user.

BRIEF DESCRIPTION OF THE DRAWINGS

Further objects and advantages of this invention will become apparent upon a reading of the following description and appended drawings in which:

FIG. 13 is a schematic view showing a typical matrix representative of scene-to-scene distances;

FIG. 19 is a schematic view showing typical link data;

FIG. 33 is a schematic view showing an example of cluster data;

FIG. 34 is a schematic view showing another example of cluster data;

DESCRIPTION OF THE PREFERRED EMBODIMENTS

What is described below as the preferred embodiments of this invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of this invention but which may be added or brought about by this applicant in the future by divisional application or by amendment.

An embodiment of the present invention is a picture processing apparatus that includes: an acquiring device (e.g., coding processing unit 91 in FIG. 9) which, apart from a first picture sequence picked up for reproduction purposes (picked-up picture sequence), acquires a second picture sequence (recognition-use picture sequence) picked up in synchronism with the first picture sequence, the second picture sequence being made up of pictures wider in angle than those constituting the first picture sequence; a calculating device (e.g., matching processing unit 95 in FIG. 9) operable to calculate degrees of similarity between scenes each made up of a predetermined number of consecutive pictures included in the second picture sequence; and a linking device (e.g., link destination selection unit 96 in FIG. 9, or clustering unit 201 in FIG. 27) which, after appropriating the degrees of similarity calculated by the calculating device for the degrees of similarity between the corresponding scenes in the first picture sequence, links (or clusters) together those of the corresponding scenes which have high degrees of similarity in the first picture sequence.

In linking the scenes of the first picture sequence, the linking device (e.g., link destination selection unit 96 in FIG. 9) may establish, as a link destination for a first scene in the first picture sequence, a second scene having a high degree of similarity to the first scene.

Figure 15:
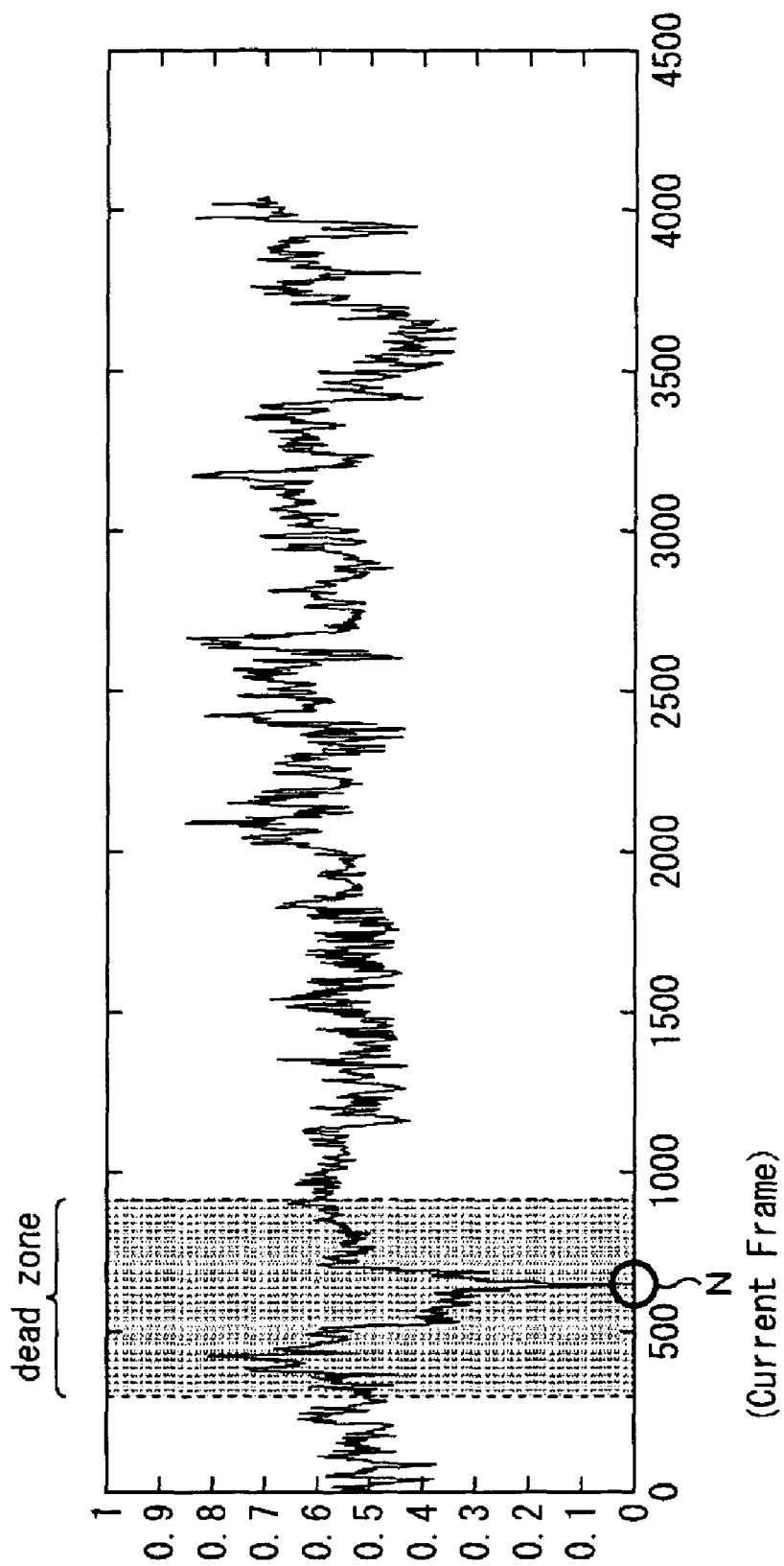
FIG. 15 is a graphic representation showing an example of a link destination being selected.

The linking device may establish, as the link destination for the first scene, the second scene having a pickup timestamp separated from that of the first scene by a predetermined time period (e.g., a dead zone is established as shown in FIG. 15), the second scene being one of the scenes having high degrees of similarity to the first scene.

The picture processing apparatus according to the invention may further include: a reproducing device (e.g., reproducing control unit 122 in FIG. 20) operable to reproduce the first picture sequence; and a displaying device (e.g., link destination display unit 123 in FIG. 20) which, while the first scene is being reproduced by the reproducing device on a screen, displays the second scene established as the link destination for the first scene on the same screen but in a position different from that in which the first scene is being displayed.

The linking device (e.g., clustering unit 201 in FIG. 27) may process the scenes of the first picture sequence into clusters in accordance with the degrees of similarity.

The picture processing apparatus according to the invention may further include a reproducing device (e.g., reproducing control unit 212 in FIG. 35) operable to reproduce on a screen the scenes belonging to a particular cluster of the first picture sequence following the clustering performed by the linking device.

The picture processing apparatus according to the invention may further include a distribution displaying device (e.g., cluster distribution display control unit 213 in FIG. 35) operable to display a distribution of the scenes belonging to the cluster on a time base following the clustering performed by the linking device, the distribution being displayed on the same screen but in a position different from that in which the scenes reproduced by the reproducing device are displayed.

The picture processing apparatus according to the invention may further include a creating device (e.g., file creation unit 321 in FIG. 42) operable to create meta data (e.g., link data) representative of results of the linking performed by the linking device, the created meta data being stored in conjunction with the first picture sequence.

Another embodiment of the present invention is a picture processing method that includes the steps of: apart from a first picture sequence picked up for reproduction purposes (picked-up picture sequence), acquiring (e.g., in step S11 of FIG. 22) a second picture sequence (recognition-use picture sequence) picked up in synchronism with the first picture sequence, the second picture sequence being made up of pictures wider in angle than those constituting the first picture sequence; calculating (e.g., in step S32 of FIG. 23) degrees of similarity between scenes each made up of a predetermined number of consecutive pictures included in the second picture sequence; and after appropriating the degrees of similarity calculated in the calculating step for the degrees of similarity between the corresponding scenes in the first picture sequence, linking (or clustering) together (e.g., in step S44 of FIG. 25, or in step S101 of FIG. 37) those of the corresponding scenes which have high degrees of similarity in the first picture sequence.

A further embodiment of the present invention is a program for causing a computer to execute a process including the same steps as those of the inventive picture processing method outlined above.

An even further embodiment of the present invention is a picture taking apparatus that includes: a first pickup device (e.g., camera unit 11 in FIG. 3 as part of a video camera unit 311 in FIG. 41) operable to pick up a first picture sequence (picked-up picture sequence); a second pickup device (e.g., recognition-use camera unit 12 in FIG. 3 as part of the video camera unit 311 in FIG. 41) operable to pick up a second picture sequence (recognition-use picture sequence); an acquiring device (e.g., coding processing unit 91 in FIG. 9) which, apart from the first picture sequence picked up for reproduction purposes, acquires the second picture sequence picked up in synchronism with the first picture sequence, the second picture sequence being made up of pictures wider in angle than those constituting the first picture sequence; a calculating device (e.g., matching processing unit 95 in FIG. 9) operable to calculate degrees of similarity between scenes each made up of a predetermined number of consecutive pictures included in the second picture sequence; and a linking device (e.g., link destination selection unit 96 in FIG. 9, or clustering unit 201 in FIG. 27) which, after appropriating the degrees of similarity calculated by the calculating device for the degrees of similarity between the corresponding scenes in the first picture sequence, links together those of the corresponding scenes which have high degrees of similarity in the first picture sequence.

Preferred embodiments of the invention will now be described with reference to the accompanying drawings.

Figure 1:
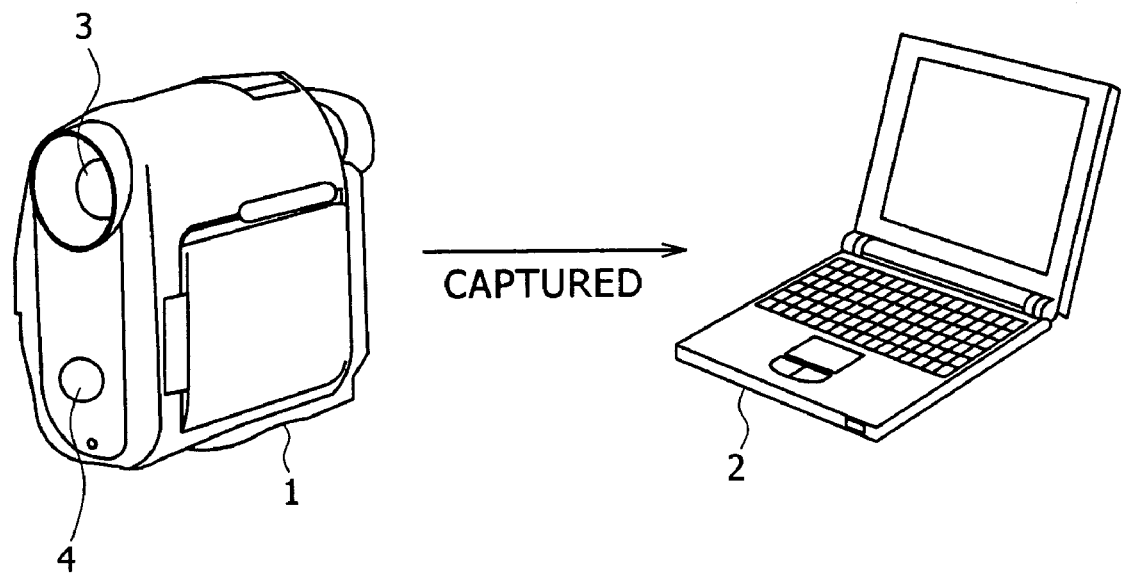
FIG. 1 is a schematic view showing a typical configuration of a picture-taking and display system to which this invention is applied.

FIG. 1 is a schematic view showing a typical configuration of a picture-taking and display system to which this invention is applied. A video camera 1 in FIG. 1 offers two functions: one for picking up a picture sequence (moving pictures) to be viewed or edited by the user, and the other for picking up a recognition-use picture sequence through which to search for similar scenes that are processed into clusters.

Illustratively, a sequence of pictures to be viewed or edited by the user is picked up through a lens 3 of the video camera 1 (the sequence is called the picked-up picture sequence). A sequence of pictures for recognition purposes (called the recognition-use picture sequence) is packed up through a wide-angle lens 4 whose optical axis is in the same direction as the lens 3.

The picked-up and recognition-use picture sequences acquired by the video camera 1 are captured in wired or wireless fashion into a personal computer 2 as indicated by a solid line arrow in FIG. 1. In turn, the personal computer 2 reproduces the picked-up picture sequence.

In addition to the scene currently displayed, the personal computer 2 presents the user with scenes similar to the ongoing scene. If any of the similar scenes is selected by the user, the personal computer 2 jumps to the selected scene for reproduction (i.e., jump reproduction function).

A scene is defined as a predetermined number of consecutive pictures taken out of an entire sequence of picked-up pictures on the time base each constituted illustratively by a single frame.

The personal computer 2 automatically presents the user with scenes similar to the currently watched scene. The user experiences a sense of déjà vu when taking a look at the scenes similar to the ongoing one.

By selecting any of the presented scenes, the user can view solely the scenes resembling the currently reproduced scene. For example, if the currently reproduced scene is what has been selected by the user through preference, then only the scenes similar to that preferred scene are presented for the user to choose for scene switchover in jumps. This is less boring than if the user is obliged to keep watching a series of moving pictures solely in chronological order in which they were picked up.

Figure 2:
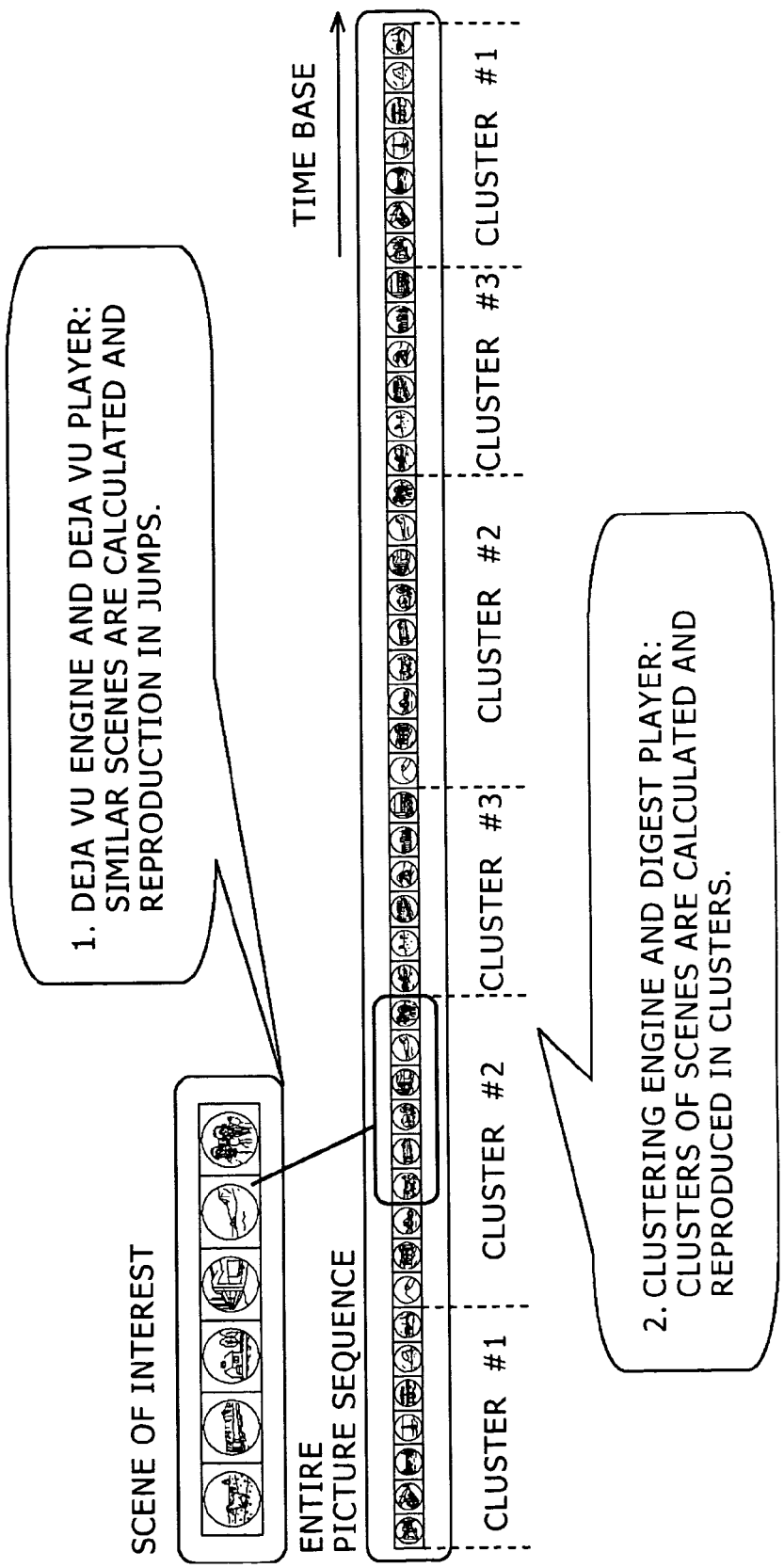
FIG. 2 is a schematic view explaining a reproducing function of a personal computer.

Such "jump reproduction" is implemented by a functional unit called a déjà vu engine mentioned in an upper balloon in FIG. 2. This functional unit links similar scenes together and carries out related processes. That is, the déjà vu engine selects a scene of interest from the entire recognition-use picture sequence, calculates degrees of similarity between the scene of interest on the one hand and the remaining scenes on the other hand, and links together scenes having high degrees of similarity therebetween (i.e., similar scenes).

A déjà vu player also mentioned in the upper balloon in FIG. 2 is designed to display a currently reproduced picture and the pictures that are linked to the currently reproduced picture by the déjà vu engine.

The personal computer 2 in FIG. 1 is also capable of processing similar scenes into clusters and reproducing the picture sequence on a cluster by cluster basis. Given that capability, the user need only to designate a desired cluster in order to watch similar scenes consecutively.

A functional unit for processing scenes into clusters for cluster-by-cluster reproduction is called a clustering engine, mentioned in a lower balloon in FIG. 2. Following the clustering by the clustering engine, clusters of scenes are reproduced by a player called a digest player.

In the example of FIG. 2, an entire picture sequence is processed into clusters #1 through #3. If cluster #1 is selected, then the pictures included in that cluster alone are reproduced.

The picture sequence subject to reproduction by the déjà vu player or by the digest player is a picked-up picture sequence, i.e., a picture sequence picked up through the lens 3. The picked-up picture sequence is different from the recognition-use picture sequence that is a picture sequence not for reproduction but for creating link-related information as well as cluster-related information, i.e., meta data necessary for reproducing the picked-up picture sequence. How the picked-up picture sequence is reproduced by the personal computer 2 will be discussed later in detail.

Figure 3:
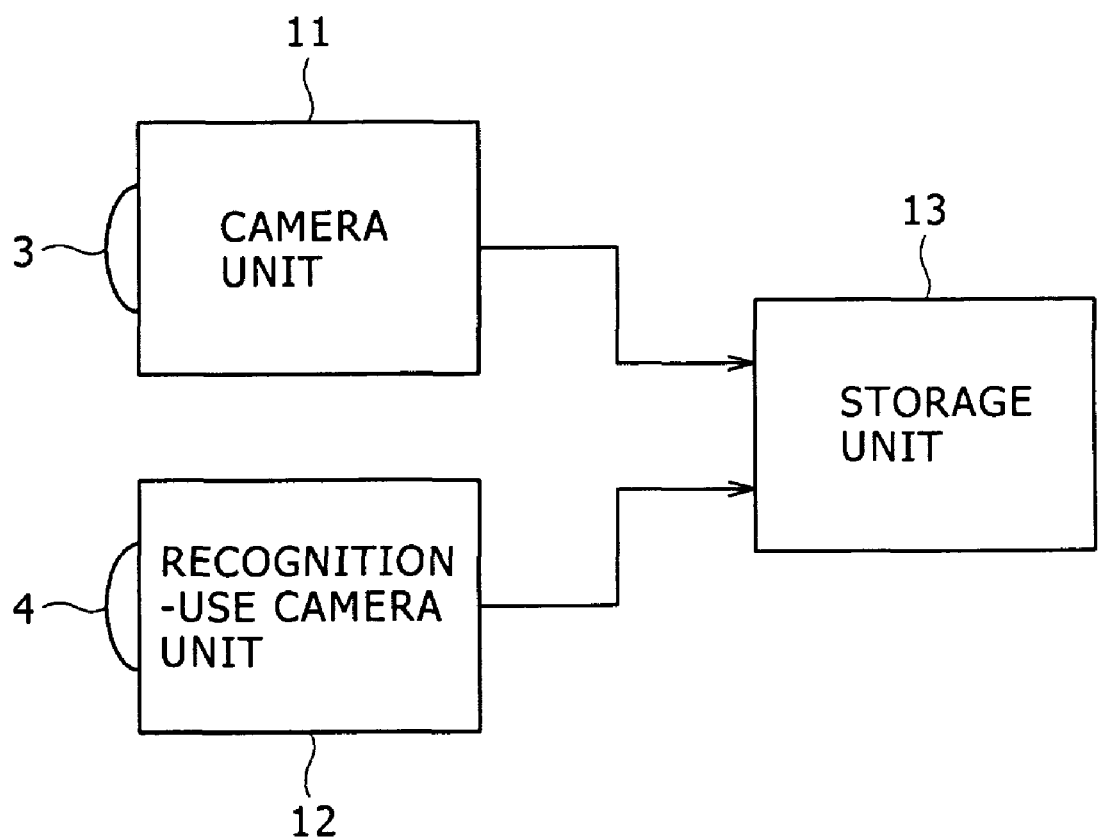
FIG. 3 is a block diagram showing a typical structure of a video camera included in FIG. 1.

FIG. 3 is a block diagram showing a typical structure of the video camera 1 in FIG. 1. The video camera 1 is basically constituted by a camera unit 11 for taking pictures through the lens 3, by a recognition-use camera unit 12 for taking pictures through the wide-angle lens 4, and by a storage unit 13 that stores picture sequences picked up by the camera unit 11 and recognition-use camera unit 12. The storage unit 13 is illustratively a hard disk drive (HDD) or a flash memory.

The camera unit 11 and recognition-use camera unit 12 take pictures in synchronism with each other upon receipt of instructions from the user to start or stop the picture taking process. The storage unit 13 stores synchronously both the picked-up picture sequence coming from the camera unit 11 and the recognition-use picture sequence from the recognition-use camera unit 12.

As will be discussed later in detail, the personal computer 2 calculates degrees of similarity between scenes illustratively by checking changes over time in the values of the pixels making up the pictures that constitute the recognition-use picture sequence. Since their chronological changes need only be referenced, the recognition-use pictures are not required to have high resolution. The pictures taken by the recognition-use camera unit 12 are converted to pictures with a low resolution of, say, 32×24 pixels before they are stored into the storage unit 13.

Large changes in the values of the pixels of interest, compared with relatively small changes, lead to low precision in determining the similarity between scenes. Such swings in precision are reduced by use of the wide-angle lens 4 such as a fish-eye lens. If the resolution per picture is assumed to be the same (e.g., 32×24 pixels), the pictures taken through a wider-angle lens while the video camera 1 is being panned entail smaller changes in pixels (i.e., scene changes) than the pictures picked up by a narrower-angle lens. That is, wider-angle lenses provide higher levels of precision in determining the similarity between scenes.

Figure 4:
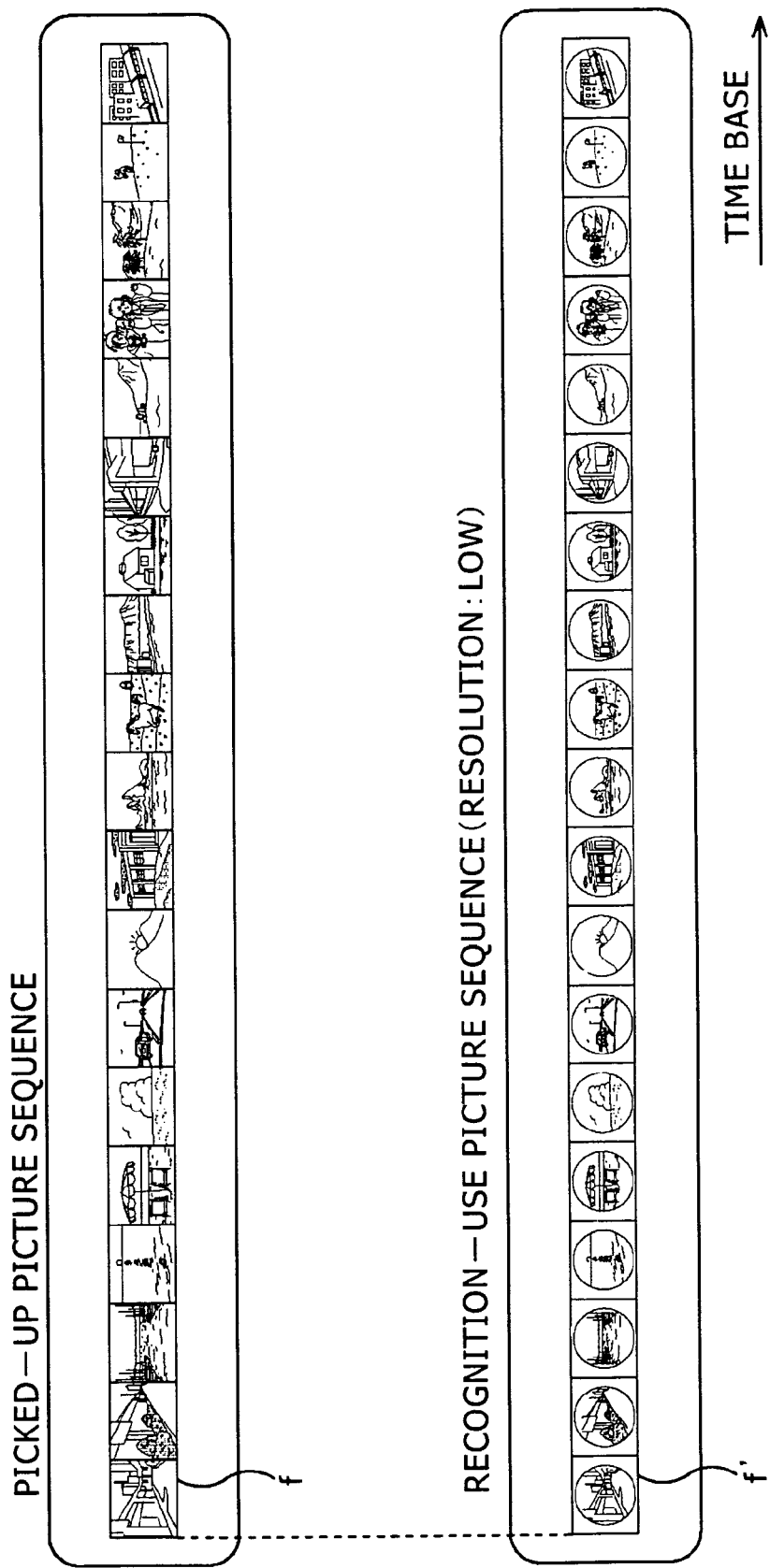
FIG. 4 is a schematic view showing typical picture sequences.

In FIG. 4, as described above, the leftmost picture "f" in a picked-up picture sequence and the leftmost picture "f'" in a recognition-use picture sequence are shown acquired in synchronism with each other. The picture "f'" has lower resolution and a wider angle of vision than the picture "f."

In the description that follows, the position of each of the pictures making up the picture sequence on the time base, as shown in FIG. 4, will be indicated by a frame number. If the pictures constituting the picture sequence are a single-field picture each, then their positions may be represented by field numbers.

Figure 5:
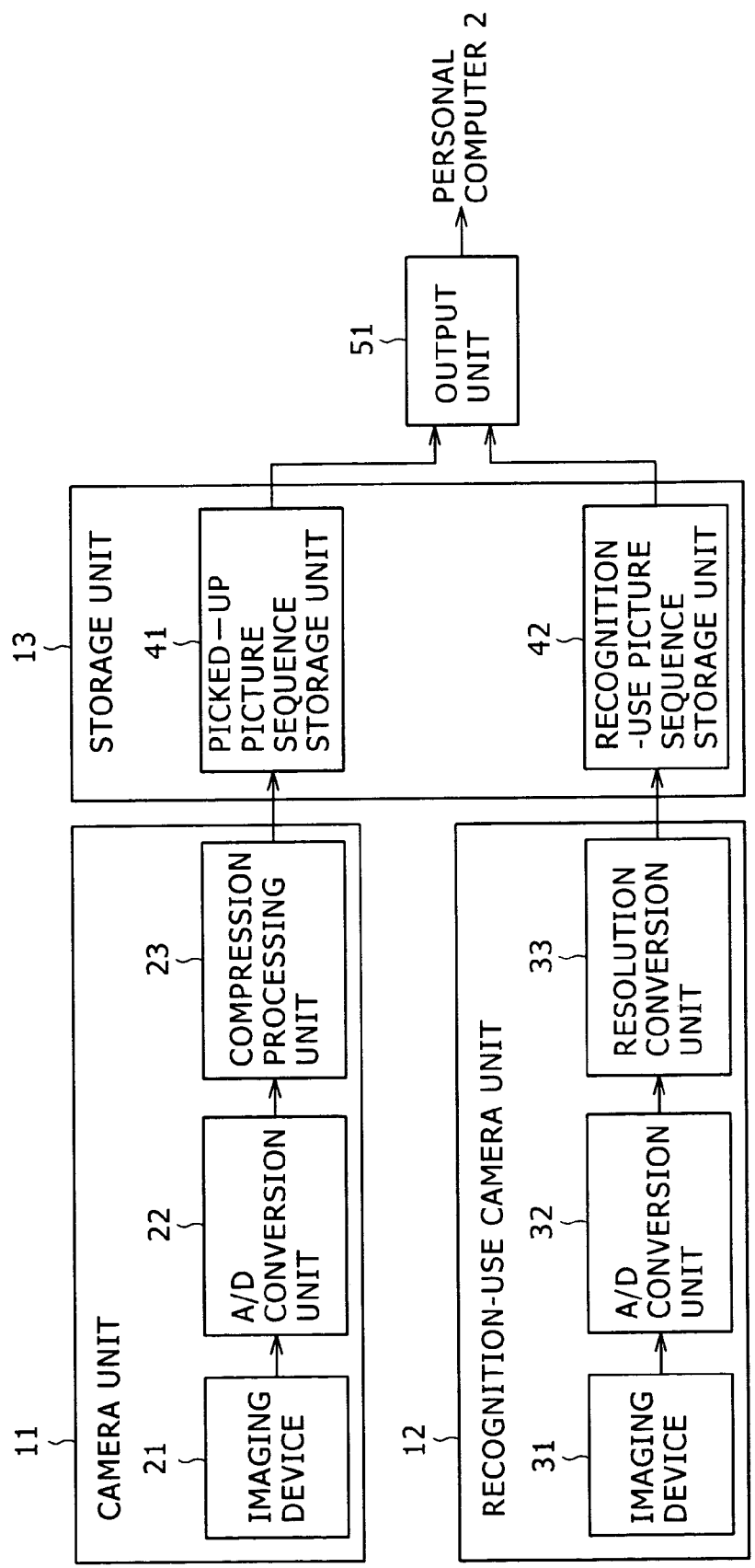
FIG. 5 is a block diagram showing a detailed structure of the video camera.

FIG. 5 is a block diagram showing a detailed structure of the video camera 1. An imaging device 21 is illustratively composed of a charge-coupled device (CCD) or the like. The imaging device 21 outputs signals corresponding to the light received through the lens 3 to an A/D (analog-to-digital) conversion unit 22.

The A/D conversion unit 22 converts to digital form the signals sent from the imaging device 21. The acquired pictures are thus output consecutively to a compression processing unit 23.

The compression processing unit 23 compresses the pictures (in a sequence) coming from the A/D conversion unit 22 using a predetermined compression method such as MPEG-2 (Moving Picture Experts Group Phase 2). Picture sequence data derived from the compression is output to a picked-up picture sequence storage unit 41 in the storage unit 13.

An imaging device 31 and an A/D conversion unit 32 in the recognition-use camera unit 12 are equivalent to the imaging device 21 and A/C conversion unit 22 in the camera unit 11, respectively. That is, the imaging device 31 outputs signals corresponding to the light received through the wide-angle lens 4 to the A/D conversion unit 32. In turn, the A/D conversion unit 32 acquires pictures based on the output from the imaging device 31, and outputs the acquired pictures successively to a resolution conversion unit 33.

The resolution conversion unit 33 converts the pictures coming from the A/D conversion unit 32 into pictures of low resolution. The low-resolution pictures obtained through the conversion are output to a recognition-use picture sequence storage unit 42 in the storage unit 13. The resolution conversion unit 33 may also compress the sequence of low-resolution pictures as needed.

The storage unit 13 is made up of the picked-up picture sequence storage unit 41 and recognition-use picture sequence storage unit 42. The picked-up picture sequence storage unit 41 stores the pictures coming from the compression processing unit 23 of the camera unit 11, and the recognition-use picture sequence storage unit 42 accommodates the pictures supplied from the resolution conversion unit 33 of the recognition-use camera unit 12. The picked-up picture sequence storage unit 41 and recognition-use picture sequence storage unit 42 hold data representative of the picked-up picture sequence and recognition-use picture sequence shown in FIG. 4.

An output unit 51 conducts wired or wireless communications with the personal computer 2. Wired communications are made through an IEEE (Institute of Electrical and Electronics Engineers) 1394 cable or a USB (Universal Serial Bus) cable, and wireless communications are effected in accordance with IEEE 802.11/a/b/g or like standards. The communications provide the personal computer 2 with the picked-up picture sequence read from the picked-up picture storage unit 41 and with the recognition-use picture sequence retrieved from the recognition-use picture sequence storage unit 42.

In FIG. 5, the recognition-use camera unit 12 is shown equipped with the imaging device 31 such as a CCD. Alternatively, the imaging device 31 may be replaced by an optical sensor array in the recognition-use camera unit 12 because recognition-use pictures need not be high in resolution.

For example, where an array of 5 by 5 optical sensors replaces the imaging device 31, the similarity between scenes may be calculated by checking changes over time in the output of each of the optical sensors configured. Depending on the number of arrayed optical sensors, the consumption of power is made lower than if a comparable CCD were driven. In addition to optical information obtained by the CCD, the pictures taken by the recognition-use camera unit 12 may carry optical information acquired through each of the optical sensors furnished.

Figure 6:
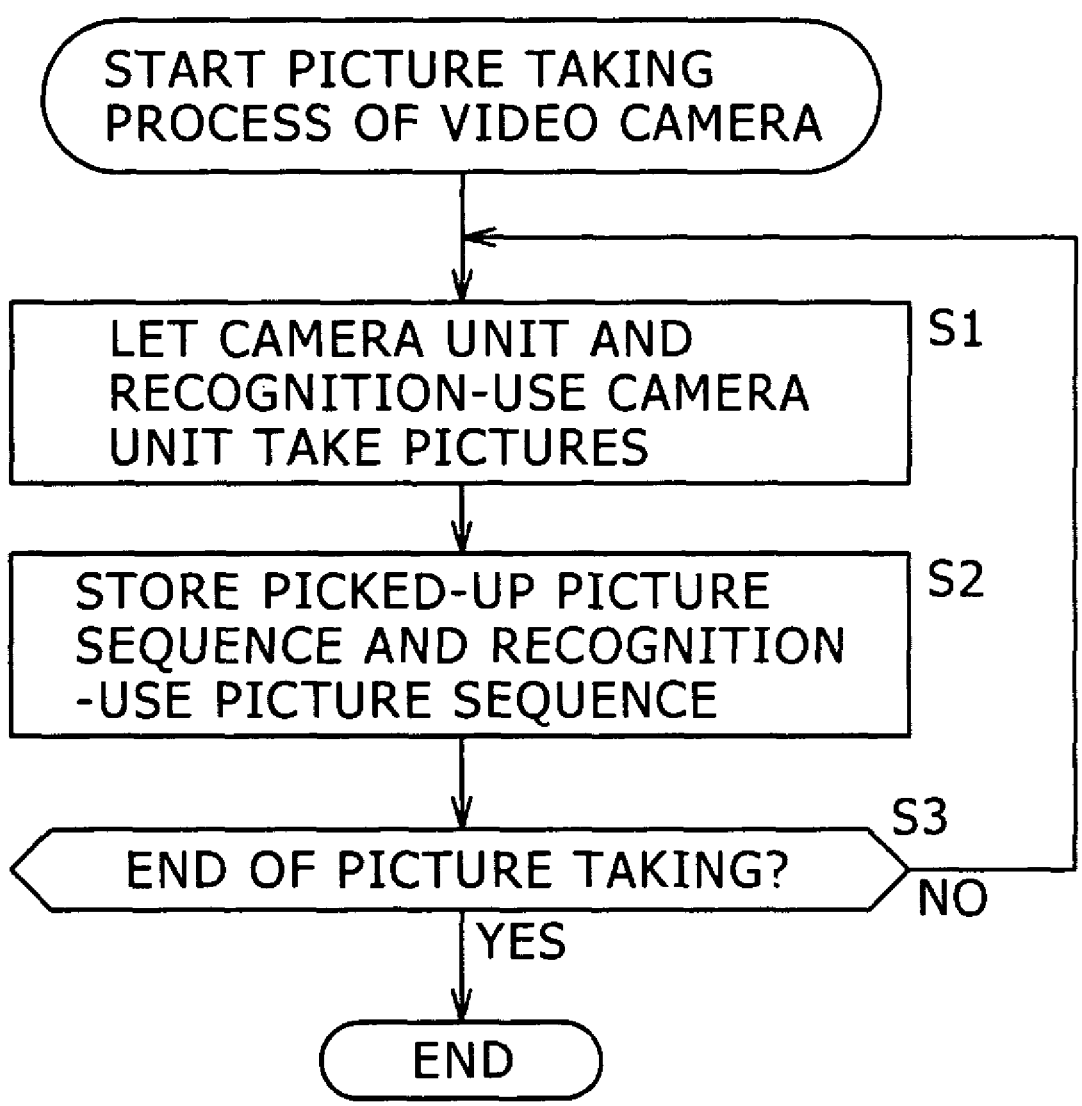
FIG. 6 is a flowchart of steps constituting a picture-taking process of the video camera.

How the video camera 1 of the above-described structure performs a picture-taking process will now be described by referring to the flowchart of FIG. 6. When the user gives an instruction to start the picture-taking process, step S1 is reached first. In step S1, the camera unit 11 and recognition-use camera unit 12 start taking pictures.

More specifically, the A/D conversion unit 22 acquires pictures based on signals fed from the imaging device 21, and outputs the acquired pictures consecutively to the compression processing unit 23. The compression processing unit 23 compresses the picture sequence from the A/D conversion unit 22 using a predetermined compression method, and outputs the compressed picture sequence to the picked-up picture sequence storage unit 41.

Meanwhile, the A/D conversion unit 32 of the recognition-use camera unit 12 acquires pictures based on signals supplied from the imaging device 31, and outputs the acquired pictures successively to the resolution conversion unit 33. In turn, the resolution conversion unit 33 converts the pictures coming from the A/D conversion unit 32 into pictures of low resolution, and outputs the sequence of low-resolution pictures to the recognition-use picture sequence storage unit 42.

In step S2, the picked-up picture sequence storage unit 41 and recognition-use picture sequence storage unit 42 in the storage unit 13 store the picture sequences from the camera unit 11 and recognition-use camera unit 12, respectively.

In step S3, a check is made to determine whether an instruction to end the picture-taking process is given by the user. Steps S1 and subsequent steps are repeated until the instruction is found to be given. If in step S3 the user is found to have issued the instruction to end the process, the picture-taking process is terminated.

The steps above are repeated in response to the user's operations. The process causes the storage unit 13 to accommodate the sequence of pictures picked up from various locations along with the recognition-use picture sequence.

Figure 7:
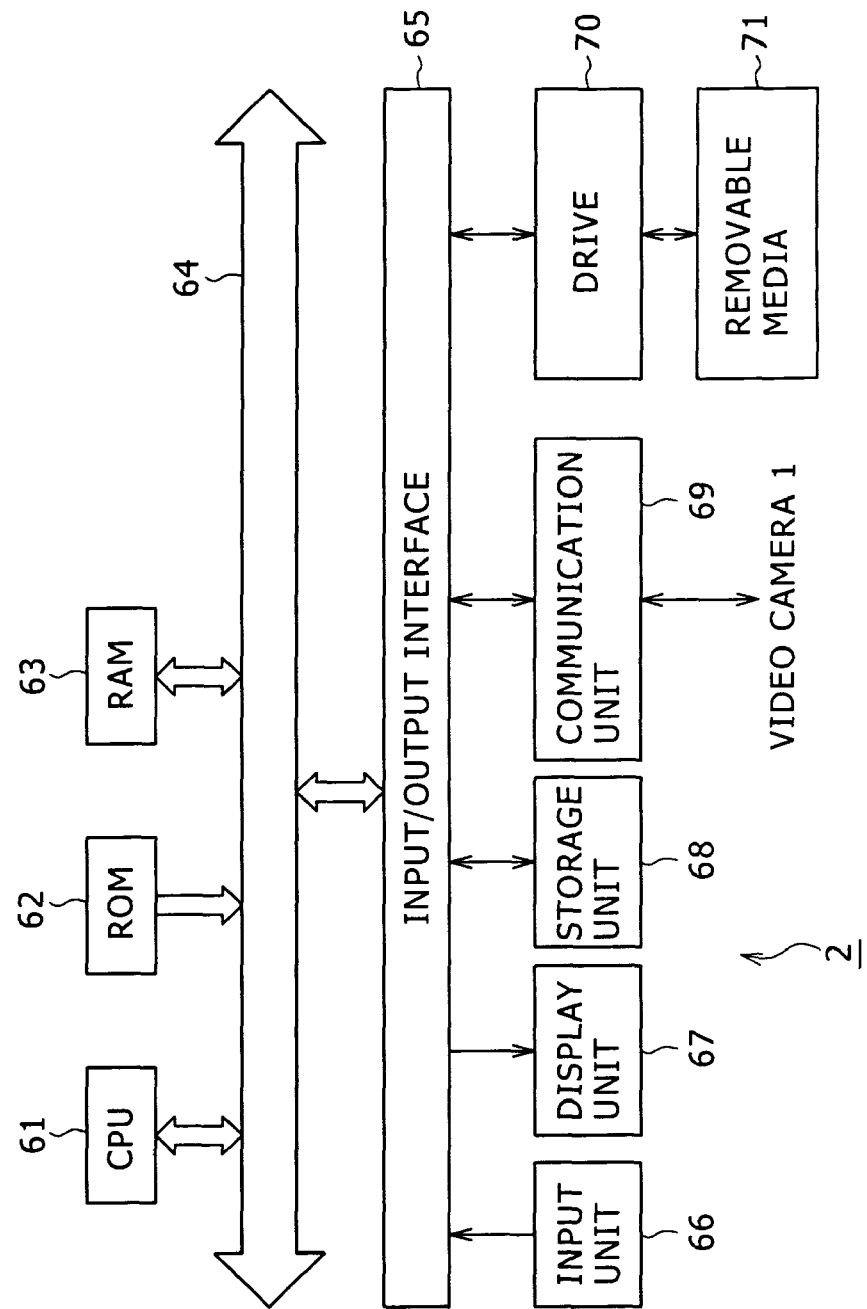
FIG. 7 is a block diagram showing a typical structure of a personal computer included in FIG. 1.

FIG. 7 is a block diagram showing a typical structure of the personal computer 2 included in FIG. 1. A CPU (central processing unit) 61 performs various processes in keeping with programs held in a ROM (read only memory) 62 or with programs loaded into a RAM (random access memory) 63 from the storage unit 68. The RAM 63 also accommodates data that may be needed by the CPU 61 in carrying out its diverse processes.

The CPU 61, ROM 62, and RAM 63 are interconnected via a bus 64. An input/output interface 65 is also connected to the bus 64.

The input/output interface 65 is connected to an input unit 66 made of a keyboard and a mouse, a display unit 67 composed of an LCD (liquid crystal display) or the like, a storage unit 68 such as a hard disk drive, and a communication unit 69 that conducts wired or wireless communications with the video camera 1. The storage unit 68 holds illustratively the picked-up picture sequence and recognition-use picture sequence acquired by the video camera 1 and sent through the communication unit 69.

A drive 70 is connected as needed to the input/output interface 65. Removable media 71 such as a magnetic disk, an optical disk, a magneto-optical disk, or a semiconductor memory may be loaded into the drive 70. Computer programs retrieved from the loaded removable medium are installed as needed into the storage unit 68. If the video camera 1 is designed to store acquired pictures onto the removable medium such as the optical disk or flash memory, then the picked-up picture sequence and recognition-use picture sequence acquired by the video camera 1 may be carried by the medium before being placed into the personal computer 2.

Figure 8:
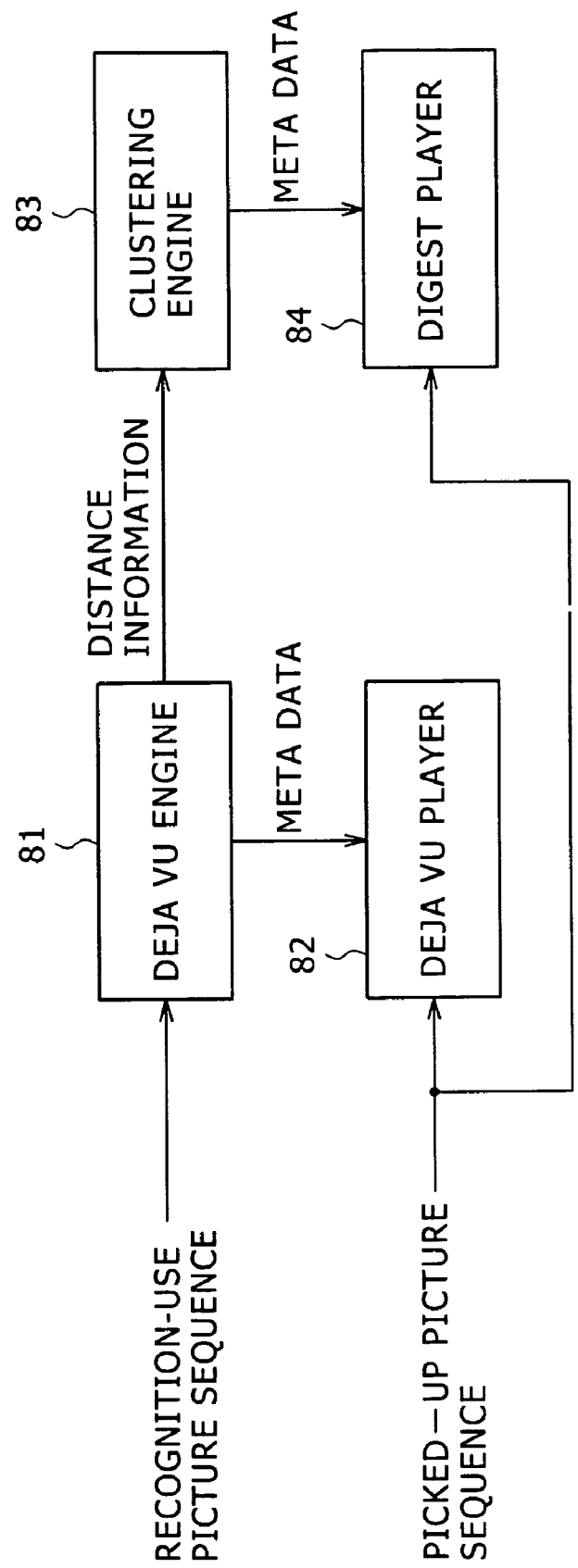
FIG. 8 is a block diagram showing a typical functional structure of the personal computer.

FIG. 8 is a block diagram showing a typical functional structure of the personal computer 2. At least part of the functional blocks in FIG. 8 may be implemented by the CPU 61 executing suitable programs.

A déjà vu engine 81 acquires a sequence of recognition-use pictures captured from the video camera 1, and calculates degrees of similarity (i.e., distances) between scenes in the acquired recognition-use picture sequence. Based on the calculated distances between the scenes, the déjà vu engine 81 links close (i.e., similar) scenes together. Calculated-distance information is output from the déjà vu engine 81 to a clustering engine 83, while linking-related information is output to a déjà vu player 82 as meta data.

In accordance with the metal data from the déjà vu engine 81, the déjà vu player 82 reproduces the picked-up picture sequence held in the storage unit 68. A screen displayed by the déjà vu player 82 on the display unit 67 shows, along with the currently reproduced scene, the scenes selected on the basis of the meta data for their high similarity to the ongoing scene.

The picked-up picture sequence and recognition-use picture sequence were picked up synchronously, so that the degrees of similarity between scenes in the recognition-use picture sequence correspond substantially to the degrees of similarity between the corresponding scenes (i.e., scenes picked up at the same times of day) in the picked-up picture sequence. For that reason, the déjà vu player 82 appropriates the degrees of similarity between scenes in the recognition-use picture sequence for the degrees of similarity between scenes in the picked-up picture sequence which, then, will be reproduced and displayed as desired.

A digest player 84, to be discussed later, also appropriates the result of the recognition-use picture sequence being clustered by the clustering engine 83 for the result of the picked-up picture sequence being clustered. The picked-up picture sequence thus clustered will then be reproduced and displayed as desired.

The clustering engine 83 processes scenes into clusters in accordance with the distance information supplied from the déjà vu engine 81. The result of the clustering, i.e., information about which scenes belong to which clusters, is output to the digest player 84 as meta data.

In keeping with the meta data coming from the clustering engine 83, the digest player 84 reproduces the picked-up picture sequence in clusters, i.e., in groups of similar scenes. A screen displayed by the digest player 84 on the display unit 67 shows, besides the currently displayed scene which belongs to a particular cluster, a distribution of the scenes belonging to the clusters prepared on the time base.

Figure 9:
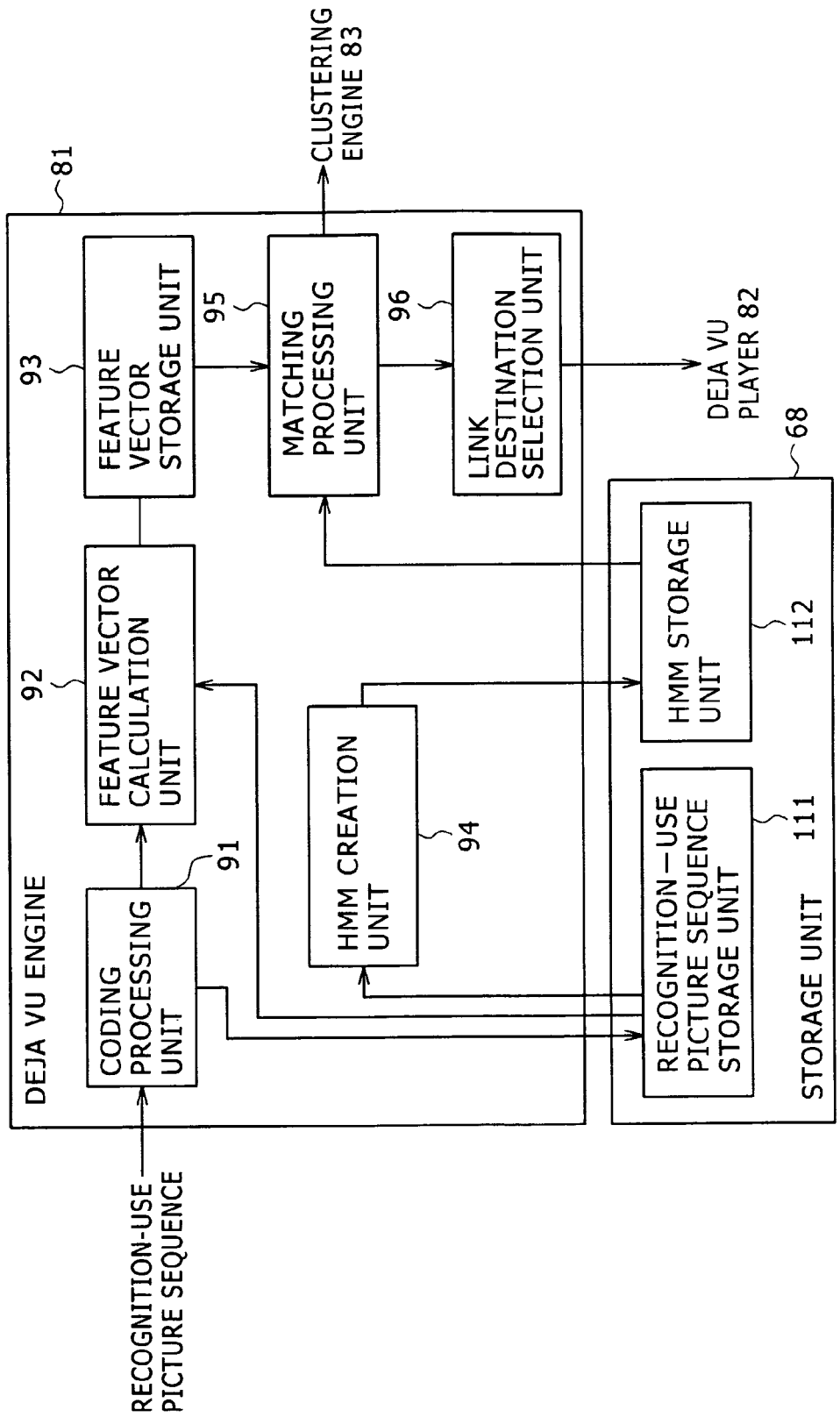
FIG. 9 is a block diagram showing a typical functional structure of a déjà vu engine.

FIG. 9 is a block diagram showing a typical functional structure of the déjà vu engine 81 in FIG. 8. FIG. 9 also shows part of a functional structure of the storage unit 68 in FIG. 7.

The déjà vu engine 81 is made up of a coding processing unit 91, a feature vector calculation unit 92, a feature vector storage unit 93, an HMM (hidden Markov model) creation unit 94, a matching processing unit 95, and a link destination selection unit 96. The storage unit 68 is constituted by a recognition-use picture sequence storage unit 111 and an HMM storage unit 112.

The coding processing unit 91 performs a coding process for eliminating the pictures deemed unnecessary from those making up the recognition-use picture sequence captured from the video camera 1. This process is carried out by chronologically checking for necessity the pictures one after another from the beginning of the recognition-use picture sequence such as one shown in FIG. 4. Only those pictures deemed necessary by the coding process are selected as recognition-use pictures that are output to the feature vector calculation unit 92 and recognition-use picture sequence storage unit 111.

Illustratively, the coding processing unit 91 compares the currently acquired picture Z with the most recently selected picture $x_i$ deemed necessary, by use of the expression (1) below. If there is found between the two pictures a difference greater than a predetermined threshold of dissimilarity or time interval, then the coding processing unit 91 selects the currently acquired picture Z as a recognition-use picture. The expression (1) is given as follows:

$$\frac{D(x_{i-1}, z)}{D_{max}} < \rho e^{-\beta|t_{i-1}-t_z|} \quad (1)$$

$$\beta = \frac{\ln 2}{\Delta \tau}$$

where, $D_{max}$ denotes a maximum value of $D(x_{i-1}, Z)$. The function D is defined by the expression (3) below, to be discussed later. Reference character $\rho$ stands for a change in percentage necessary for accepting the picture $x_{i-1}$ and picture Z, and reference character $\beta$ represents a factor for adjusting adaptive speed. Predetermined values are established as the factors $\rho$ and $\beta$. Reference character $t_{i-1}$ stands for the time of day at which the picture $x_{i-1}$ was acquired, and $t_z$ for the time of day at which the picture Z was acquired.

When each necessary picture is selected on the basis of dissimilarity or time interval between two pictures, it is possible to prevent the consecutive selection of pictures that are substantially or approximately the same. The process thus makes it possible to compress the recognition-use picture sequence without losing useful picture information.

As will be discussed later, a hidden Markov model (HMM) is created on the basis of the picture sequence selected by the coding processing unit 91. If the unnecessary pictures are removed, it is possible to create a larger HMM containing greater quantities of information that may be used in a matching process.

The feature vector calculation unit 92 calculates a feature vector (i.e., feature quantity) representative of each of the pictures supplied from the coding processing unit 91. The calculated feature vectors are stored into the feature vector storage unit 93.

For example, the feature vector calculation unit 92 obtains distances between the picture $x_i$ sent from the coding processing unit 91 and the pictures $\{x_1, \ldots, x_M\}$ stored in the recognition-use picture sequence storage unit 111, the stored pictures having been selected previously by the coding processing unit 91. The feature vector calculation unit 92 then acquires feature vectors of which the elements are the acquired distances. Specifically, the feature vectors of M dimensions given by the expression (2) below are acquired:

$$d_i = \begin{bmatrix} D(x_i, x_1) \\ M \\ D(x_i, x_M) \end{bmatrix} \quad (2)$$

Whereas the function $D(x, y)$ is given illustratively by the expression (3) below, any other suitable function may be utilized instead provided the difference between the two pictures "x" and "y" is expressed. In the expression (3), reference characters H and W respectively stand for a maximum height and a maximum width of the configured sensors in terms of their sensor numbers. Reference numeral 1 denotes the pixel position and reference character "c" represents a color channel number (generally, numerals 1, 2 and 3 stand for red, green and blue, respectively).

$$D(x, y) = \sum_{l}^{HW} \sum_{c}^{3} |x(l, c) - y(l, c)| \quad (3)$$

The feature vector storage unit 93 is formed illustratively by a circular buffer. Into that buffer, a predetermined number of feature vectors are stored in the order in which they were sent from the feature vector calculation unit 92. The order of the feature vectors placed into the feature vector storage unit 93 corresponds to the chronological order in which recognition-use pictures were taken.

More specifically, the content of the feature vector storage unit 93 is made up of feature vectors arranged in chronological order. As such, what is retained in the feature vector storage unit 93 represents chronological state transitions leading up to the present, i.e., the most recent feature vector. These state transitions expressed by the predetermined number of feature vectors are matched against the "past" state transitions represented by the pictures stored in the recognition-use picture sequence storage unit 111.

The HMM creation unit 94 creates the HMM based on the recognition-use picture sequence held in the recognition-use picture sequence storage unit 111, and stores the created HMM into the HMM storage unit 112. In addition, the HMM creation unit 94 reconstitutes the HMM in the HMM storage unit 112 every time a recognition-use picture selected by the coding processing unit 91 is placed into the recognition-use picture sequence storage unit 111.

Figure 10:
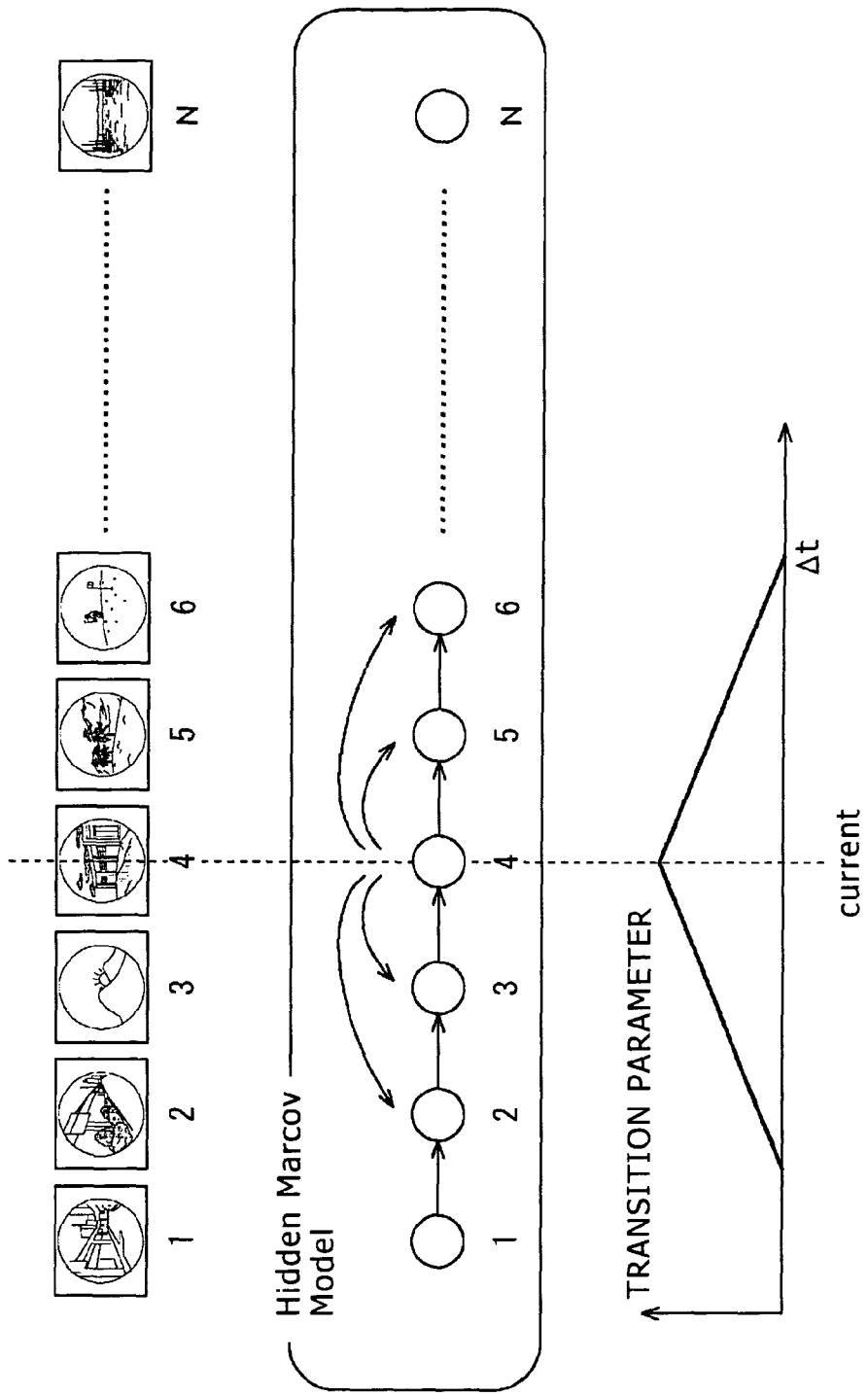
FIG. 10 is a schematic view showing a typical hidden Markov model (HMM)

FIG. 10 is a schematic view showing a typical HMM (hidden Markov model) held in the HMM storage unit 112. As shown in FIG. 10, the HMM storage unit 112 accommodates a hidden Markov model structured with N recognition-use pictures corresponding to the relevant states. That is, the model for use by the déjà vu engine 81 is constituted not by parameters estimated using the expectation-maximization method or the like based on partially labeled data, but by the states of the HMM arranged to correspond directly to the pictures stored in the recognition-use picture sequence storage unit 111.

Predetermined values such as those plotted by a graphic representation in the lower part of FIG. 10 are established as transition parameters. In this graphic representation, the vertical axis denotes transition probabilities and the horizontal axis stands for chronological distances between pictures (i.e., between states). Illustratively, as shown in FIG. 10, the parameters are calculated based on Gaussian distribution and established in such a manner that the probabilities of transition approach zero the longer the distance. This eliminates the need for optimizing the transition parameters, which translates into a reduced load on processing.

As described, predetermined transition parameters are used without recourse to the usual learning process. That is because the pictures corresponding to the states of HMM were acquired chronologically, with little or no possibility that transition would take place from a given state (e.g., state 4 in FIG. 10) to a chronologically distant state.

Returning to the explanation of FIG. 9, the matching processing unit 95 performs Viterbi sequential matching based on the HMM held in the HMM storage unit 112. In so doing, the matching processing unit 95 calculates degrees of match between the chronologically ordered feature vectors in the feature vector storage unit 93 on the one hand, and the states of HMM on the other hand. The chronological order of the feature vectors is representative of a time series of the recognition-use pictures over a particular time interval, and the states of HMM correspond to the recognition-use picture sequence (stored in the recognition-use picture sequence storage unit 111). For these reasons, the distance between a particular scene expressed by a specific feature vector over a given time interval in the recognition-use picture sequence on the one hand and the HMM state coinciding with that scene on the other hand is represented by the reciprocal of the degree of match obtained therebetween.

Figure 11:
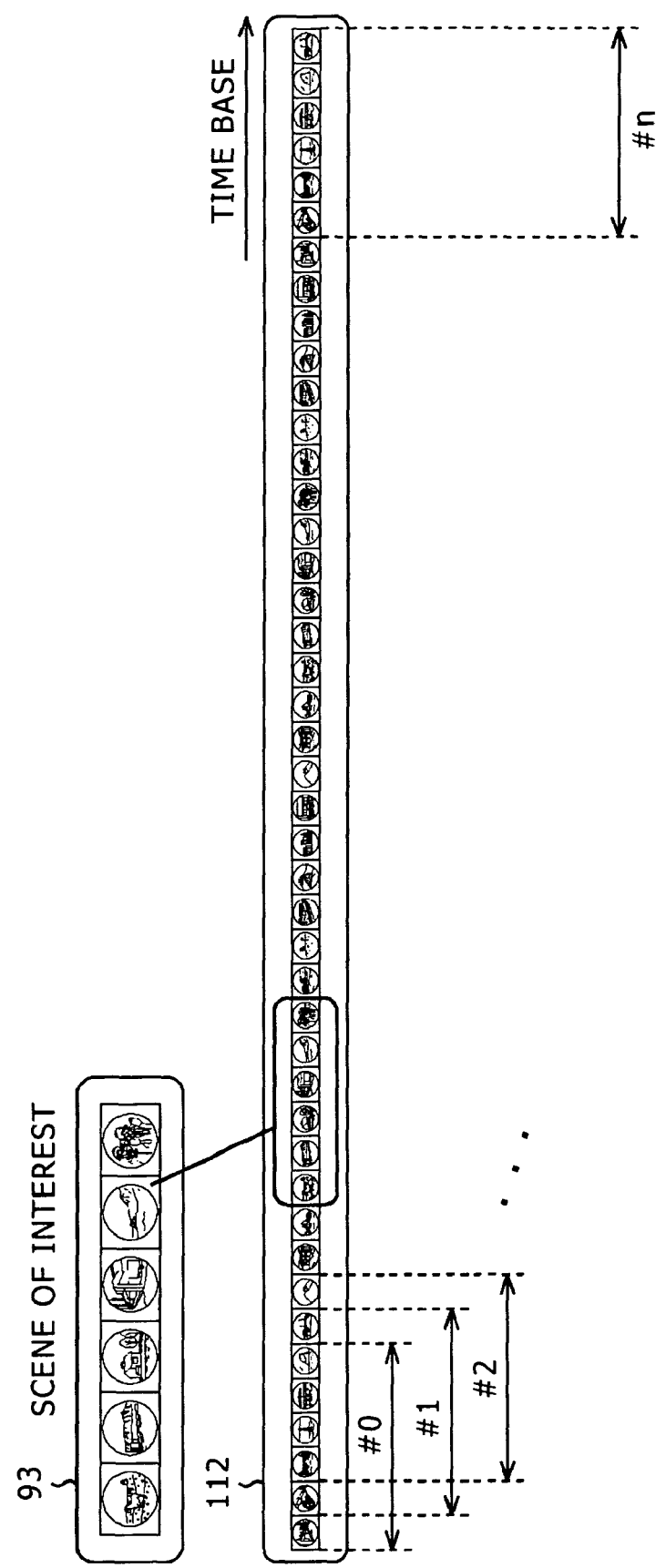
FIG. 11 is a schematic view illustrating the concept of matching.

FIG. 11 is a schematic view illustrating the concept of matching performed by the matching processing unit 95. In FIG. 11, the sequences of feature vectors stored in the feature vector storage unit 93 are indicated as picture sequences (i.e., scenes) represented by these vectors for purpose of simplification and illustration.

As shown in FIG. 11, the matching processing unit 95 chronologically matches the scene of interest expressed by a feature vector in the feature vector storage unit 93, against a scene over a particular time interval in the recognition-use picture sequence (corresponding to the states of HMM) held in the HMM storage unit 112. The scene to be matched against is shifted one picture at a time, until the distance between a single scene of interest and each of all scenes constituting the recognition-use picture sequence is obtained.

In FIG. 11, the distance between the scene of interest and the scene over a time interval #0 as part of the entire recognition-use picture sequence is first acquired, followed by the distance between the scene of interest and the scene over a time interval #1 (which is shifted from the interval #0 by one picture). That distance acquiring process is repeated until the scene over a time interval #n is reached for comparison. The process provides the distances between one scene of interest and all the scenes making up the recognition-use picture sequence.

Figure 12:
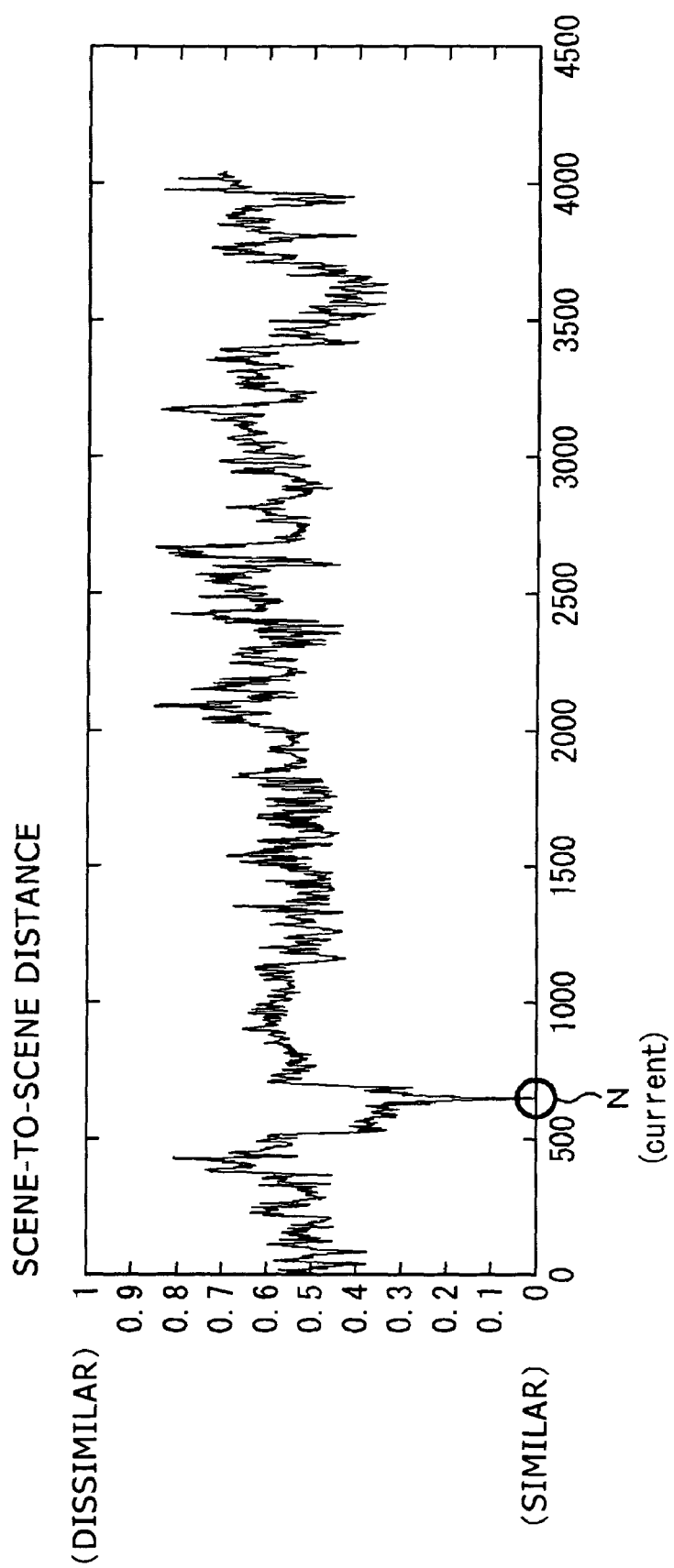
FIG. 12 is a graphic representation of scene-to-scene distances.

FIG. 12 is a graphic representation of the distances between a single scene of interest and all scenes constituting the recognition-use picture sequence. The vertical axis represents scene-to-scene distances and the horizontal axis denotes scene positions (i.e., frame numbers). In the description that follows, the position of each scene (e.g., the scene of interest and the scene to be compared with that scene) will be indicated by the frame number of the most recent of the pictures constituting the scene in question.

The scene of interest may be located anywhere in the entire recognition-use picture sequence. That means the scene of interest might coincide with the corresponding scene in the picture sequence being compared. In that case, the distance between the two scenes is zero. In FIG. 12, an encircled frame number N indicates the position of the scene of interest with which this graph is obtained.

Furthermore, the matching processing unit 95 shifts the picture sequence making up the scene of interest one picture at a time. The matching processing unit 95 then acquires the distances between the newly selected scene of interest and the other scenes constituting the recognition-use picture sequence through Viterbi sequential matching.

In FIG. 11, for example, the picture sequence over the time interval #0 is first regarded as the scene of interest. After the distances between that scene of interest and the remaining scenes making up the recognition-use picture sequence are obtained, the picture sequence over the time interval #1 is regarded as the next scene of interest. The distances between that scene of interest and the remaining scenes are then acquired. The procedure is repeated until the distances between the scene of interest over the time interval #n and the other scenes are obtained. In this manner, the distances between each of all scenes constituting the recognition-use picture sequence and the remaining scenes are acquired.

When each of the picture sequences over the time intervals #0 through #n is taken as the scene of interest and its distance to the other scenes constituting the recognition-use picture sequence is obtained, as many as "n" graphs, one of which is shown in FIG. 12, are provided.

Suppose that a distance $d_{ij}$ denotes the distance between a scene $S_i$ and a scene $S_j$ and that N is the number of all pictures constituting the recognition-use picture sequence. On that assumption, the scene-to-scene distance is expressed by an N×N matrix as shown in FIG. 13. It should be noted that if i=j, then the distance $d_{ij}$ is zero.

The matching processing unit 95 outputs distance information (i.e., distance matrix) representative of the distances acquired as described between all scenes, to the link destination selection unit 96 and clustering engine 83. The link destination selection unit 96 links scenes together based on the distances between all scenes, and the clustering engine 83 processes the scenes into clusters in accordance with the distance information.

The Viterbi sequential matching (Viterbi algorithm) performed by the matching processing unit 95 will now be described. The Viterbi algorithm provides solutions to maximization problems such as one defined by the expression (4) below:

$$\{s_1^*, \cdots, s_N^*\} = \underset{\{s_1,\cdots,s_N\}}{\arg\max} P(s_1, \cdots, s_N \mid H, \lambda) \qquad (4)$$

$$= \underset{\{s_1,\cdots,s_N\}}{\arg\max} P(x_i \mid s_1)P(s_1)\prod_{j=2}^{N} P(x_{i-j} \mid s_j)P(x_j \mid s_{j-1})$$

where, reference character $s_i$ stands for the state corresponding to an i-th picture $x_i$, and $s^*_i$ denotes an optimized state.

Figure 14:
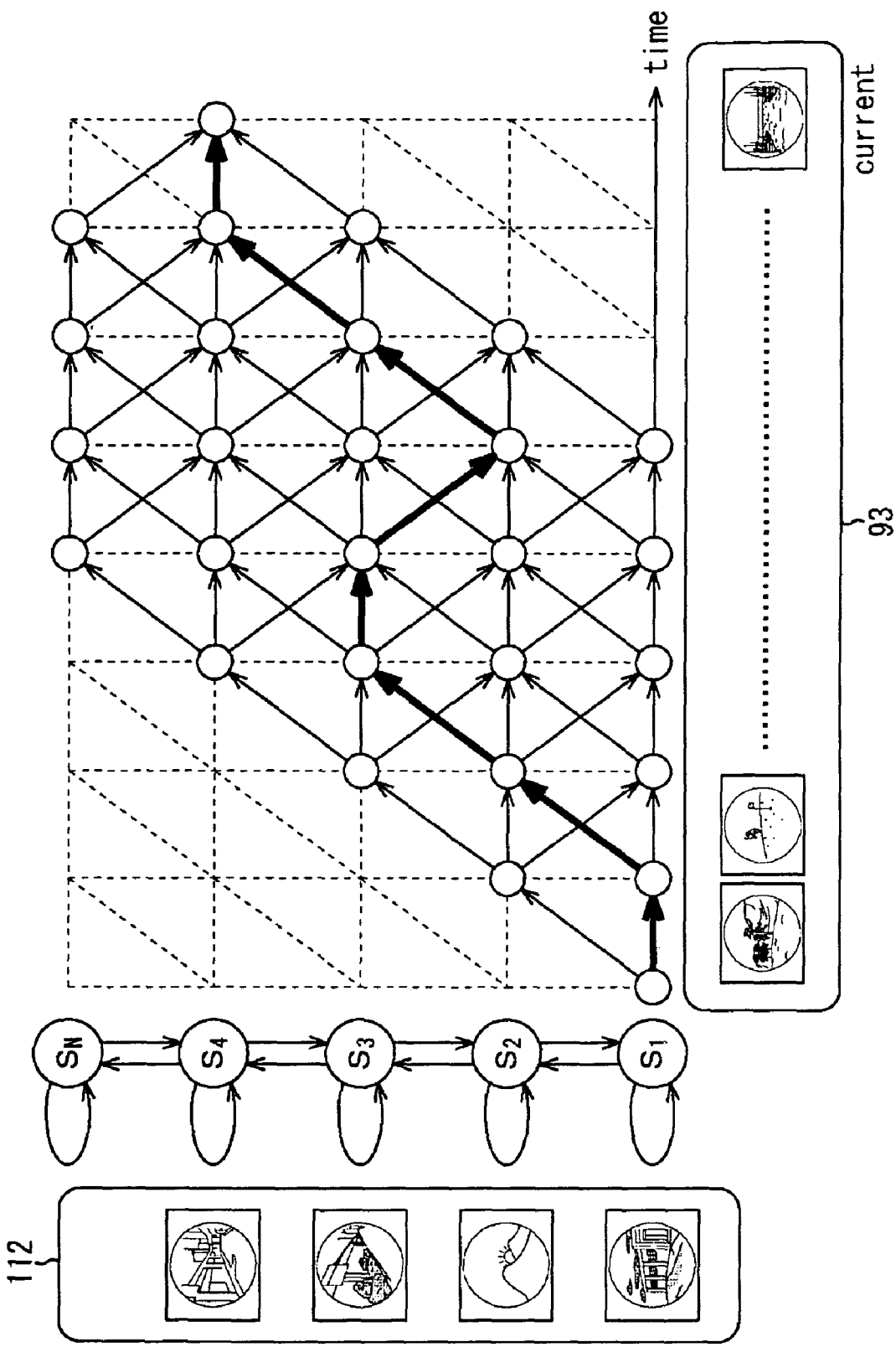
FIG. 14 is a schematic view showing an example of Viterbi sequential matching.

Viterbi algorithm is used, as shown in FIG. 14, to determine an optimum state series that matches the scene of interest made of N pictures represented by a feature vector matrix H in the feature vector storage unit 93, against the recognition-use picture sequence (HMM) in the HMM storage unit 112. The probabilities obtained along the optimum state series are acquired as scene-to-scene distances. In the example of FIG. 14, the series $\{S_1, S_1, S_2, S_3, S_3, S_2, S_3, S_4, S_4\}$ indicated by thick-line arrows is determined as the optimum state series.

In the foregoing description, the scene-to-scene distances are shown calculated through Viterbi sequential matching. Alternatively, other suitable methods may be used to calculate the distances between the scenes. The above-outlined techniques for calculating scene-to-scene distances and for executing Viterbi sequential matching are disclosed in more detail in Japanese Patent Application No. 2004-191308 submitted by this applicant.

The link destination selection unit 96 links similar scenes together based on the distance information sent from the matching processing unit 95. The linking performed by the link destination selection unit 96 involves three processes: a process for establishing a dead zone, i.e., a range of scenes to which the scene of interest is not linked; a process for selecting link destination candidates; and a process for selecting the link destination from among the candidates.

FIG. 15 graphically shows the process for establishing the dead zone. The graphic representation in FIG. 15 is the same as that in FIG. 12. What follows is a description of how the scene including the picture having the frame number N as the most recent picture is regarded as the scene of interest (with reference to which the graphs in FIGS. 12 and 15 are acquired) and how the link destination for that scene of interest is selected.

In that case, the scenes with nearby frame numbers, i.e., scenes with timestamps close to the time of day at which the scene of interest was picked up, are grouped into the dead zone of a predetermined range centering on the frame number N. The setting of the dead zone is aimed at preventing the scenes that are necessarily similar due to their chronological proximity to the scene of interest, from getting selected as link destinations. In FIG. 5, the dead zone is shown shaded.

Figure 16:
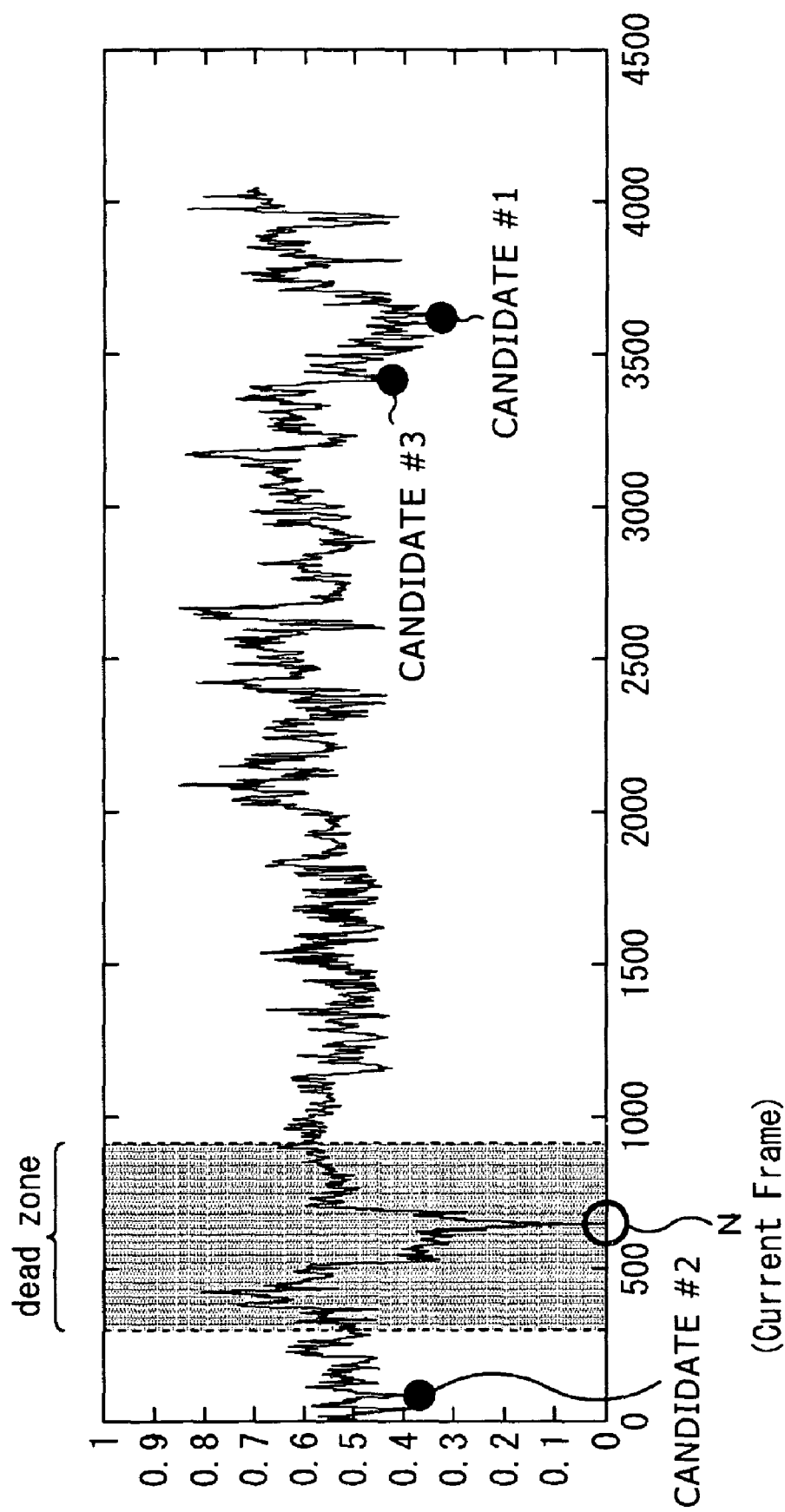
FIG. 16 is a graphic representation showing another example of the link destination being selected.

FIG. 16 graphically shows how link destination candidates are selected. After the dead zone is established, a predetermined number of scenes close to the scene of interest are selected as illustrated. In the example of FIG. 16, three candidates #1 through #3 are selected. Each of the selected candidates is found outside the dead zone.

Figure 17:
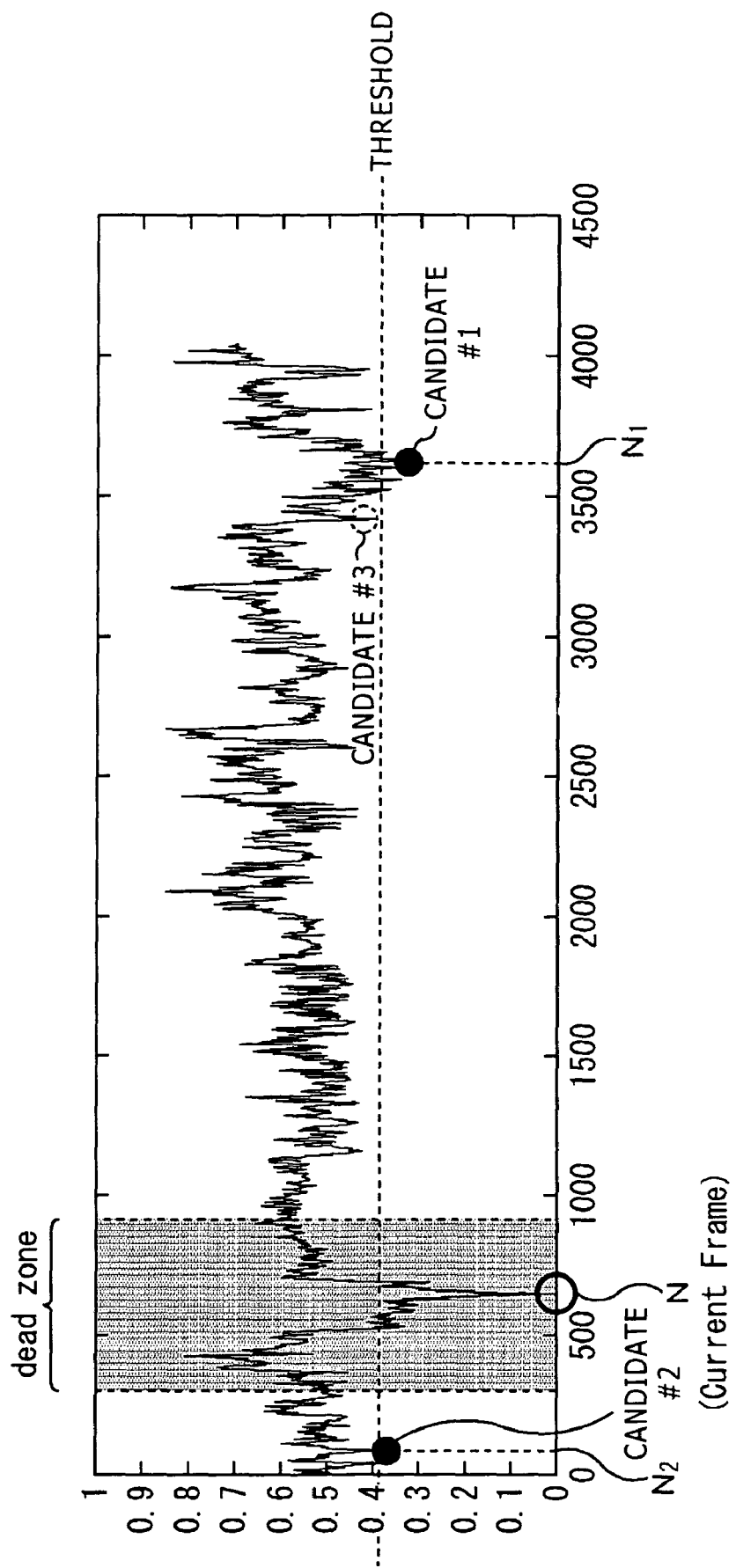
FIG. 17 is a graphic representation showing a further example of the link destination being selected.

FIG. 17 graphically shows how the link destination (i.e., scene) is selected from among the candidates. In the example of FIG. 17, a threshold is set near a distance of 0.4. With reference to this threshold, only two candidates are selected as possible link destinations: candidate #1 indicated by the frame number $N_1$, and candidate #2 identified by the frame number $N_2$. (The candidate #3 that has not been selected as a link destination is indicated by broken line.)

In that case, as will be discussed later with reference to the relevant drawings, the scene having the frame number N is the frame subject to reproduction. While this scene is being displayed, the scenes having the frame numbers $N_1$ and $N_2$ are displayed as scenes similar to the currently reproduced scene.

Figure 18:
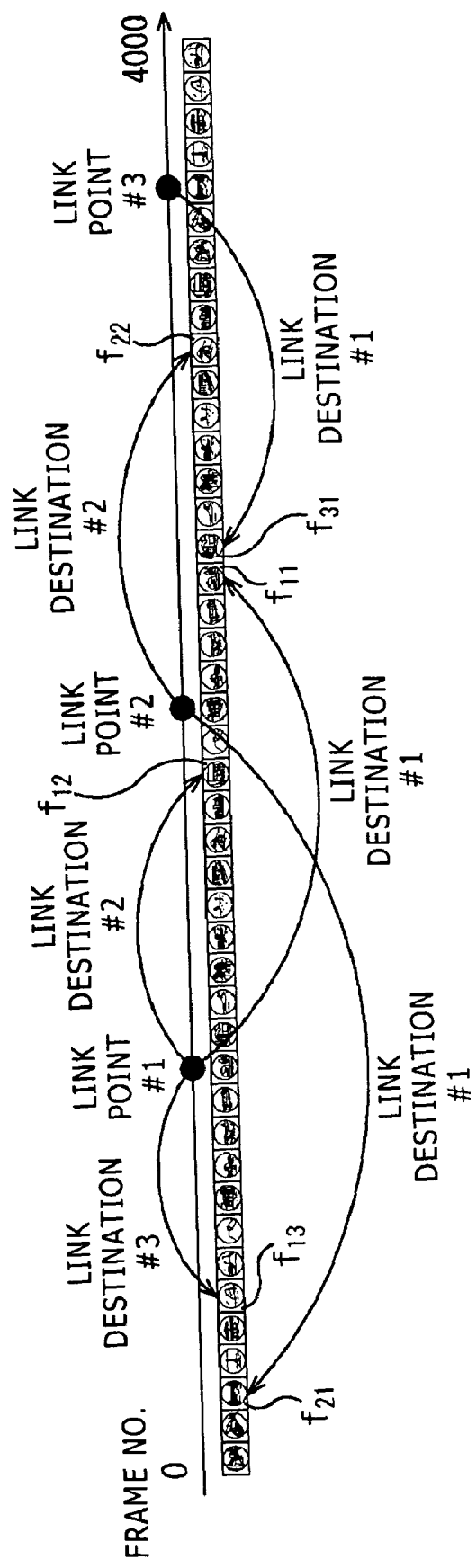
FIG. 18 is a schematic view showing typical link destinations.

When the above process for link destination selection is carried out on each of the scenes involved, the scenes are linked illustratively as shown in FIG. 18.

In the foregoing description made in reference to the graphic representations in FIGS. 15 through 17, the scenes were shown linked together based on the distances therebetween. In practice, however, the most recent pictures of the selected scenes are linked together.

In the example of FIG. 18, the picture at a link point #1 has three link destinations selected as indicated by three arrows: picture $f_{11}$ as a link destination #1, picture $f_{12}$ as a link destination #2, and picture $f_{13}$ as a link destination #3. The order of the link destinations #1, #2 and #3 is determined illustratively by the distances between the scenes.

Likewise, the picture at a link point #2 has two link destinations selected as indicated by two arrows: picture $f_{21}$ as a link destination #1, and picture $f_{22}$ as a link destination #2. The picture at a link point #3 has a picture $f_{31}$ selected as a link destination #1 indicated by a single arrow.

The link destination selection unit 96 selects link destinations as described above. In so doing, the unit 96 creates link data indicating which pictures are linked to which pictures.

FIG. 19 is a schematic view showing typical link data. In FIG. 19, the numeral with a colon (:) in the leftmost position of each line is furnished only for explanation purposes and does not constitute any part of the link data. It should also be noted that the link data in FIG. 19 does not represent the links in FIG. 18.

Line 1, "Frame0_LinkNum=3," indicates that the picture with the frame number 0 is given three link destinations (Link 0, 1, 2).

Line 2, "Frame0_Link0=2452," indicates that one of the link destinations (Link 0) for the picture with the frame number 0 has the frame number 2452. Likewise, line 3, "Frame0_Link1=5664," indicates that another link destination (Link 1) for the picture with the frame number 0 has the frame number 5664.

Line 4, "Frame0_Link2_FileName=family.mpg," indicates that another link destination (Link 2) for the picture with the frame number 0 is a picture held in a file named "family.mpg."

Line 5, "Frame0_Link2=343," indicates that the picture with the frame number 343 in the file named "family.mpg" is a link destination (Link 2) for the picture with the frame number 0.

As described, when all picture sequences held in the personal computer 2 are subject to the calculation of scene-to-scene distances and to the selection of link destinations, links may be established across files.

Line 6, "Frame0_Next=15," indicates that the picture which comes next to the picture with the frame number 0 and for which link destination information is set has the frame number 15. Line 7, "Frame15_LinkNum=0," indicates that the picture with the frame number 15 has no link destination. If any picture with no link destination is selected as the picture subject to reproduction, the ongoing display of link destinations will be erased.

For example, if reproduction starts from the picture with the frame number 0 in the picked-up picture sequence based on the link data in FIG. 19, the picture with the frame number 0 is displayed simultaneously with the pictures having the frame numbers 2452 and 5664 as part of similar scenes, and with the picture having the file number 343 in the file named "family.mpg." This state continues until the picture with the frame number 15 is selected as the picture subject to reproduction.

If the picture with the frame number 15 has become subject to ongoing reproduction, the pictures with the frame numbers 2452 and 5664 as well as the picture with the file number 343 in the file named "family.mpg" are erased from the display.

Line 8, "Frame15_Next=476," indicates that the picture which comes next to the picture with the frame number 15 and for which link destination information is set has the frame number 476. Similar descriptions are continued in the link data.

The link data including such descriptions outlined above is output as meta data from the déjà vu engine 81 to the déjà vu player 82. The workings of the déjà vu engine 81 structured as described above will be discussed later with reference to relevant flowcharts.

Figure 20:
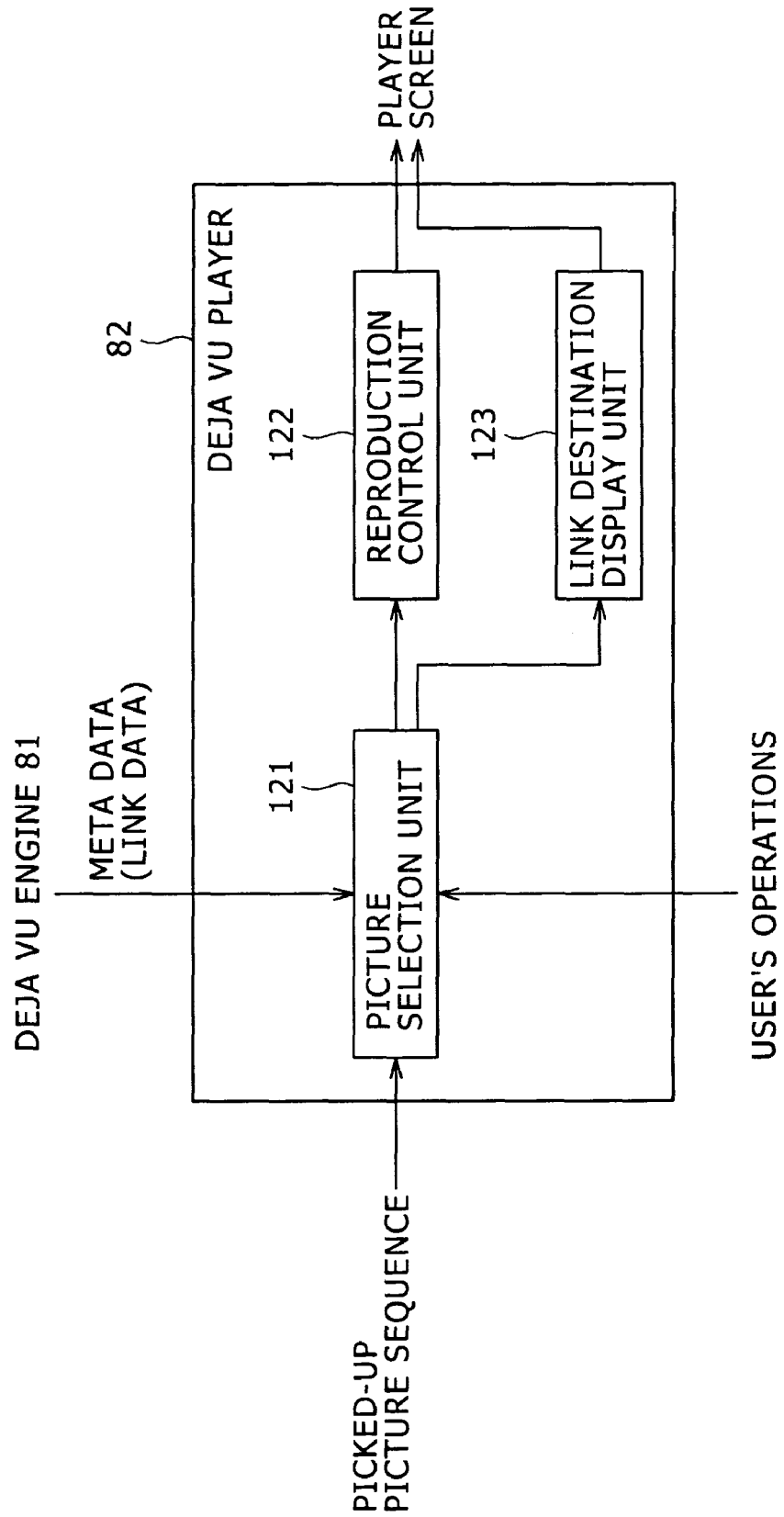
FIG. 20 is a block diagram showing a typical functional structure of a déjà vu player.

FIG. 20 is a block diagram showing a typical functional structure of the déjà vu player 82. The déjà vu player 82 is constituted by a picture selection unit 121, a reproduction control unit 122, and a link destination display unit 123.

The picture selection unit 121 reads the picked-up picture sequence from the storage unit 68 (FIG. 7) and, based on the link data sent from the déjà vu engine 81 and in response to the user's operations, selects a desired picture from the retrieved picture sequence. The picture selection unit 121 outputs the picture selected from the picked-up picture sequence to the reproduction control unit 122 for reproduction, selects the link destinations applicable to the picture being reproduced by the reproduction control unit 122, and outputs the selected link destinations to the link destination display unit 123.

For example, suppose that the link data in FIG. 19 is being supplied and that the picture with the frame number 0 is being reproduced by the reproduction control unit 122. In that case, the picture selection unit 121 selects from the picked-up picture sequence the pictures with the frame numbers 2452, 5564, and 343 (the last picture from the file named "family.mpg") as the link destinations, and outputs the selected pictures to the link destination display unit 123.

The reproduction control unit 122 reproduces the picture supplied from the picture selection unit 121, and causes the reproduced picture to appear in a predetermined position on the display unit 67.

The link destination display unit 123 causes the link destinations sent from the picture selection unit 121 to appear in positions different from where the picture reproduced by the reproduction control unit 122 is being displayed.

Figure 21:
FIG. 21 is a schematic view showing a typical screen displayed by the déjà vu player.

FIG. 21 is a schematic view showing a typical screen displayed by the déjà vu player 82. In FIG. 21, a moving picture display area 131 in an upper center position on the screen displays the picture (i.e., moving picture selected by the user) reproduced by the reproduction control unit 122. Link destination display areas 133-1 through 133-3 in the lower half of the screen display the link destinations applicable to the picture being displayed in the moving picture display area 131. When the ongoing moving picture is changed, so are its link destinations. That is, what is displayed in the link destination display areas 133-1 through 133-3 varies with the current display in the moving picture display area 131.

Apart from the currently reproduced scene, it is possible to present the user with scenes which are similar to the ongoing scene and which must have been witnessed by the user in the past. This feature gives the user a sense of déjà vu.

Illustratively, suppose that a moving picture taken during the user's recent trip to a ski resort is being reproduced (i.e., displayed in the moving picture display area 131) and that a moving picture taken during the user's trip to the ski resort last year is stored in the personal computer 2 apart from the currently reproduced moving picture. In that case, scenes from the last year's trip to the ski resort are automatically presented to the user. The user is thus reminded of what took place at the ski resort last year.

On the screen of FIG. 21, any one of the pictures displayed in the link destination display areas 133-1 through 133-3 is selected so that reproduction may be started from the position of the selected picture in the picked-up picture sequence. By simply selecting one of the automatically presented pictures, the user is able to switch to a similar scene for reproduction.

The link destination display areas 133-1 through 133-3 may display either still pictures or moving pictures of the link destinations. If moving pictures are to be displayed, the scenes are reproduced over predetermined time intervals following the timestamps of the pictures established as link destinations.

In FIG. 21, a slide bar 132 located between the moving picture display area 131 and the link destination display areas 133-1 through 133-3 represents the current reproducing position in the entire moving picture file selected by the user for reproduction. The user may change the reproducing position by manipulating the slide bar 132.

Figure 22:
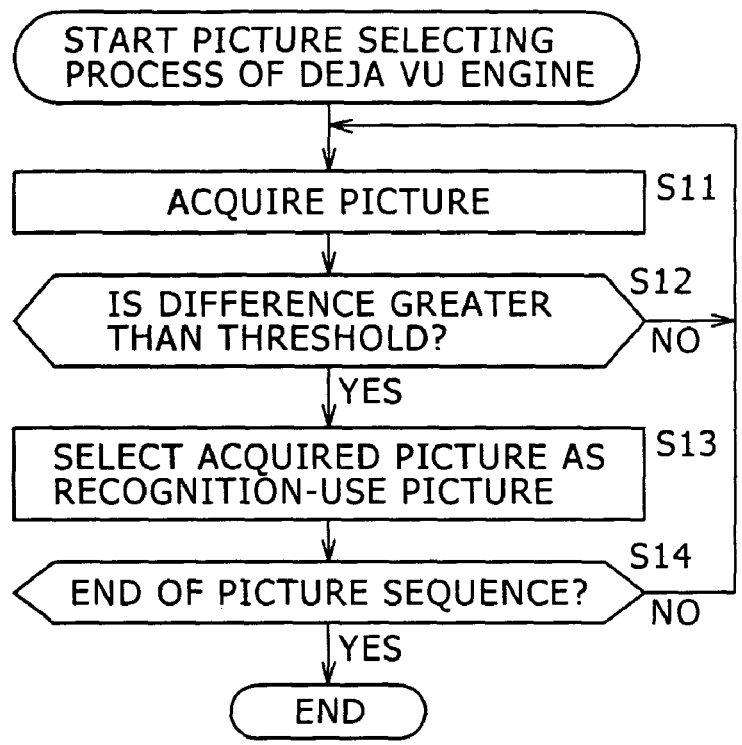
FIG. 22 is a flowchart of steps constituting a picture-selecting process of the déjà vu engine.

What follows is a description of how the déjà vu engine 81 and déjà vu player 82 operate to bring about the displays in FIG. 21. Described below with reference to the flowchart of FIG. 22 is a picture selecting process performed by the déjà vu engine 81.

In step S11, the coding processing unit 91 (FIG. 9) of the déjà vu engine 81 acquires one of the pictures constituting the recognition-use picture sequence captured from the video camera 1. In step S12, the coding processing unit 91 compares the currently acquired picture with the last-selected picture (i.e., what was selected most recently as the necessary picture), and checks to determine whether the difference between the two pictures in terms of dissimilarity or time interval is greater than a predetermined threshold. As discussed earlier, the check is made by use of the expression (1) indicated above.

If in step S12 the coding processing unit 91 determines that the difference between the two pictures does not exceed the threshold, then step S11 is reached again. In step S11, the coding processing unit 91 acquires the next picture and repeats the subsequent steps.

If in step S12 the coding processing unit 91 determines that the difference between the two pictures is greater than the threshold, then step S13 is reached. In step S13, the coding processing unit 91 selects the currently selected picture as a recognition-use picture. The picture thus selected by the coding processing unit 91 is stored into the recognition-use picture sequence storage unit 111 of the storage unit 68 and output to the feature vector calculation unit 92.

In step S14, the coding processing unit 91 checks to determine whether what has been acquired is the last picture of the recognition-use picture sequence captured from the video camera 1. If the acquired picture is not found to be the last picture, step S11 is reached again and the subsequent steps are repeated. If in step S14 the last picture is found acquired, the coding processing unit 91 terminates the picture selecting process.

Figure 23:
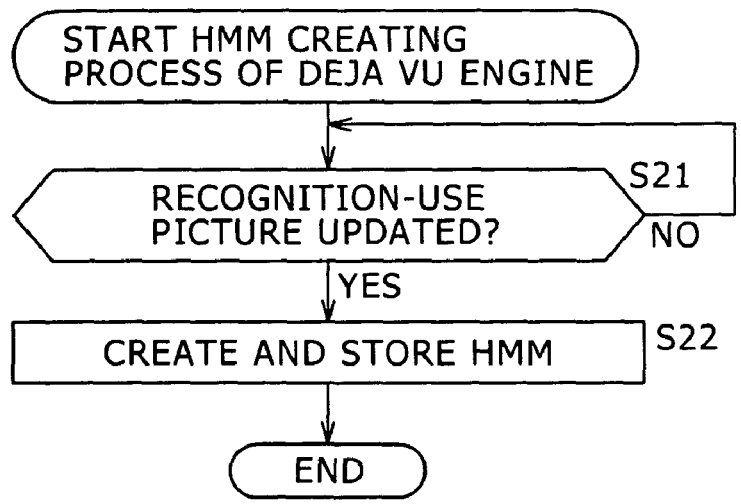
FIG. 23 is a flowchart of steps constituting an HMM creating process of the déjà vu engine.

An HMM creating process performed by the déjà vu engine 81 will now be described with reference to the flowchart of FIG. 23. In step S21, the HMM creation unit 94 of the déjà vu engine 81 checks to determine whether a new recognition-use picture is selected by the coding processing unit 91 and stored into the recognition-use picture sequence storage unit 111, i.e., whether the recognition-use picture sequence held in the recognition-use picture sequence storage unit 111 is updated. This step is repeated until an update is detected.

If in step S21 the HMM creation unit 94 detects an update in the recognition-use picture sequence, step S22 is reached. In step S22, the HMM creation unit 94 generates a hidden Markov model based on the recognition-use picture sequence retained in the recognition-use picture sequence storage unit 111, and stores the generated HMM into the HMM storage unit 112. The HMM creating process is then brought to an end.

The HMM storage unit 112 then holds the HMM structured in such a manner that N recognition-use pictures such as those shown in FIG. 11 correspond to the HMM states involved. If the HMM is already stored in the HMM storage unit 112, the HMM creation unit 94 reconstitutes the HMM in the unit 112 in accordance with the updated recognition-use pictures.

Figure 24:
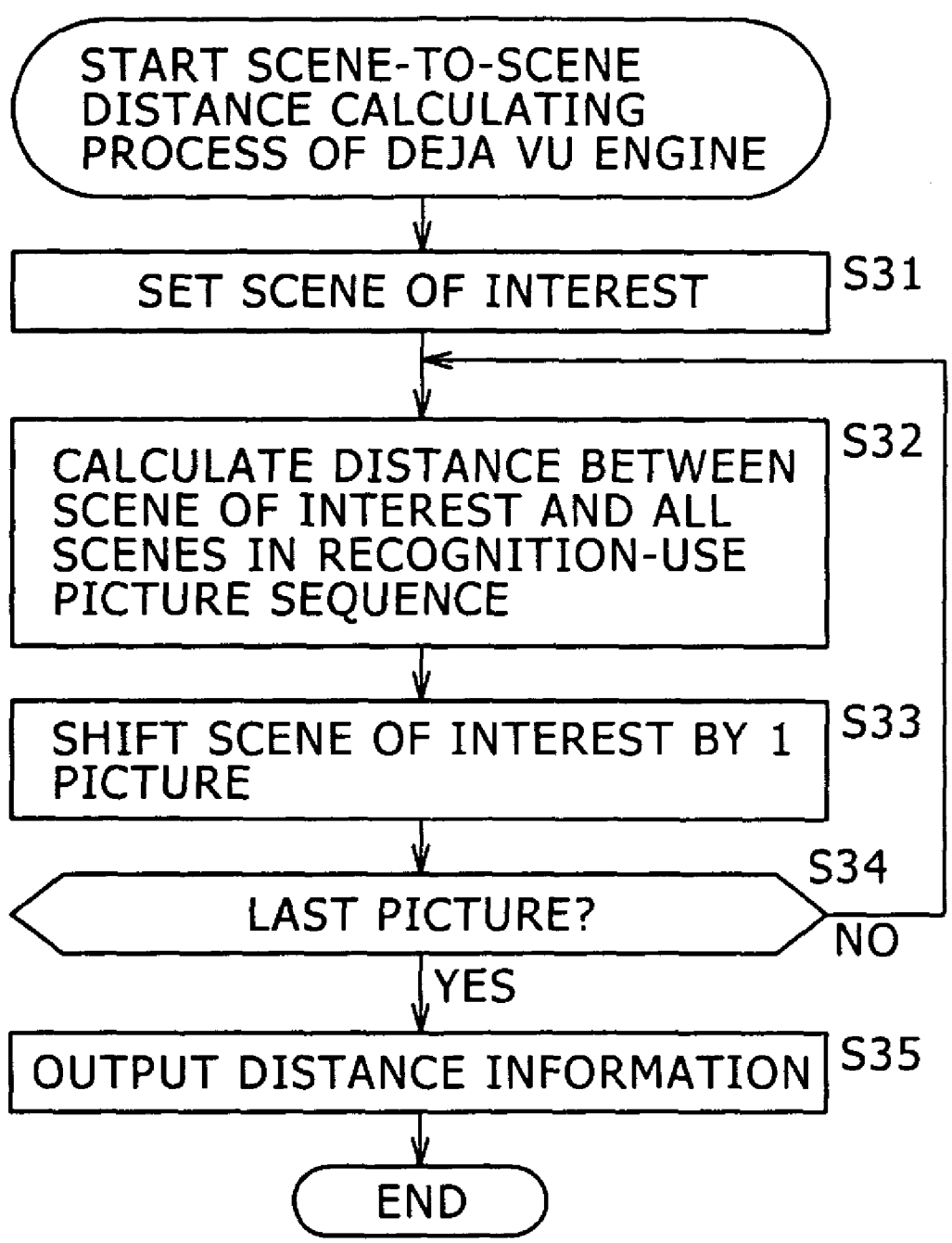
FIG. 24 is a flowchart of steps constituting a scene-to-scene distance calculating process of the déjà vu engine.

Described below with reference to the flowchart of FIG. 24 is a scene-to-scene distance calculating process performed by the déjà vu engine 81. In step S31, the feature vector calculation unit 92 establishes a scene of interest for matching against the recognition-use picture sequence corresponding to each of the states of HMM. More specifically, the feature vector calculation unit 92 calculates the feature vector of each of the pictures established as the scene of interest, and stores the calculated feature vectors into the feature vector storage unit 93.

In step S32, the matching processing unit 95 calculates the distance between the scene of interest established in step S31 on the one hand, and the scene corresponding to the HMM state held in the HMM storage unit 112 on the other hand. The matching processing unit 95 repeats calculation of the distances between the scene of interest and the scene for comparison which is shifted one picture at a time, until the distances between one scene of interest and all scenes making up the recognition-use picture sequence are calculated.

After the distances between a given scene of interest and all scenes of the recognition-use picture sequence are calculated, step S33 is reached. In step S33, the scene of interest is shifted by one picture. That is, the feature vector calculation unit 92 calculates the feature vector of one picture to be added to the scene of interest, and stores the calculated feature vector into the feature vector storage unit 93. At this point, the feature vector of the oldest picture is deleted from the feature vector storage unit 93.

If, say, the scene over the time interval #0 in FIG. 11 has been established as the scene of interest in the recognition-use picture sequence, that scene of interest is shifted by one picture in step S33. The scene over the time interval #1 is then established as the new scene of interest.

In step S34, the feature vector calculation unit 92 checks to determine whether the scene containing the last picture of the recognition-use picture sequence is used as the scene of interest for distance calculation. If the scene with the last picture is not found reached yet, control is returned to step S32 and the subsequent steps are carried out. That is, the distances with regard to the scene of interest established in step S33 are calculated repeatedly.

If in step S34 the feature vector calculation unit 92 determines that the distances are calculated with regard to the scene of interest containing the last picture of the recognition-use picture sequence, then step S35 is reached.

In step S35, the matching processing unit 95 outputs distance information including the matrix of distances between all scenes to the link destination selection unit 96 as well as to the clustering engine 83. The scene-to-scene distance calculating process is then brought to and end.

Figure 25:
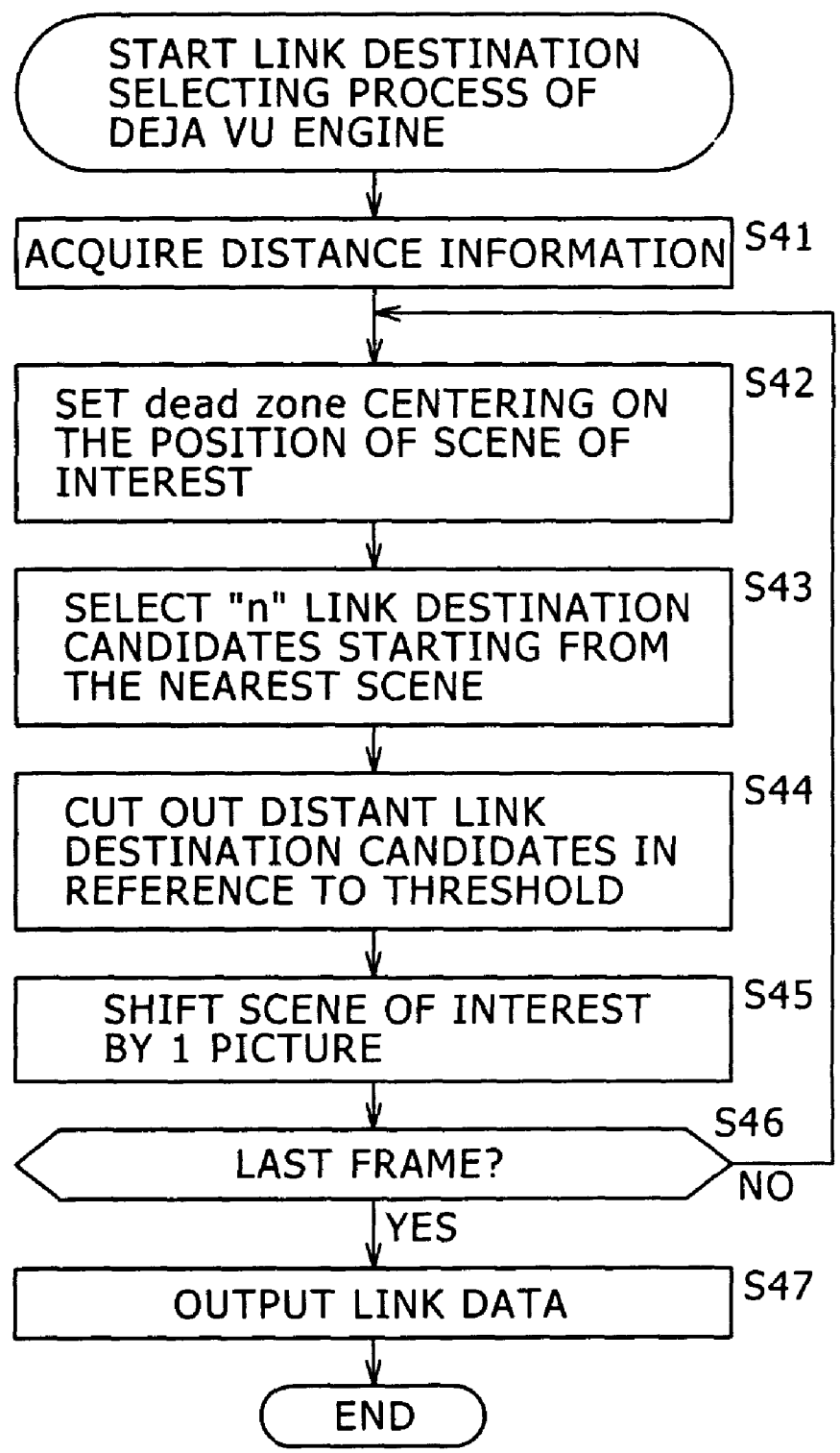
FIG. 25 is a flowchart of steps constituting a link destination selecting process of the déjà vu engine.

Described below with reference to the flowchart of FIG. 25 is how a link destination selecting process is carried out by the déjà vu engine 81. This process is started illustratively when the process in FIG. 24 is completed, with distance information sent from the matching processing unit 95 to the link destination selection unit 96.

In step S41, the link destination selection unit 96 acquires the distance information coming from the matching processing unit 95, and selects distance information about a given scene of interest. The distance information selected at this point is either information representative of the distances shown in FIG. 12, or distance information about one row (or one column) in the matrix of FIG. 13. For example, the distance information is first selected regarding the scene of interest including the first picture of the entire recognition-use picture sequence, and the subsequent steps are then carried out.

In step S42, the link destination selection unit 96 establishes a dead zone (FIG. 15) denoting the range of scenes to which the scene of interest is not linked.

In step S43, the link destination selection unit 96 selects a predetermined number of scenes close to the scene of interest as link destination scenes (FIG. 16). In step S44, the link destination selection unit 96 selects suitable link destination scenes from among the selected candidates in reference to a threshold (FIG. 17).

In step S45, the link destination selection unit 96 shifts the scene of interest by one picture, and acquires the distance information about the newly selected scene of interest.

In step S46, the link destination selection unit 96 checks to determine whether link destination candidates are selected with regard to the scene of interest containing the last picture of the recognition-use picture sequence. If the scene including the last picture is not found reached yet, control is returned to step S42 and the subsequent steps are carried out. That is, link destination candidates are selected repeatedly with regard to the scene of interest established anew in step S45.

If in step S46 the link destination selection unit 96 determines that link destination candidates are selected with regard to the scene of interest containing the last picture of the recognition-use picture sequence, then step S47 is reached.

In step S47, the link destination selection unit 96 creates link data describing information about the link destinations selected so far, and outputs the created link data to the déjà vu player 82. The link destination selecting process is then terminated.

Figure 26:
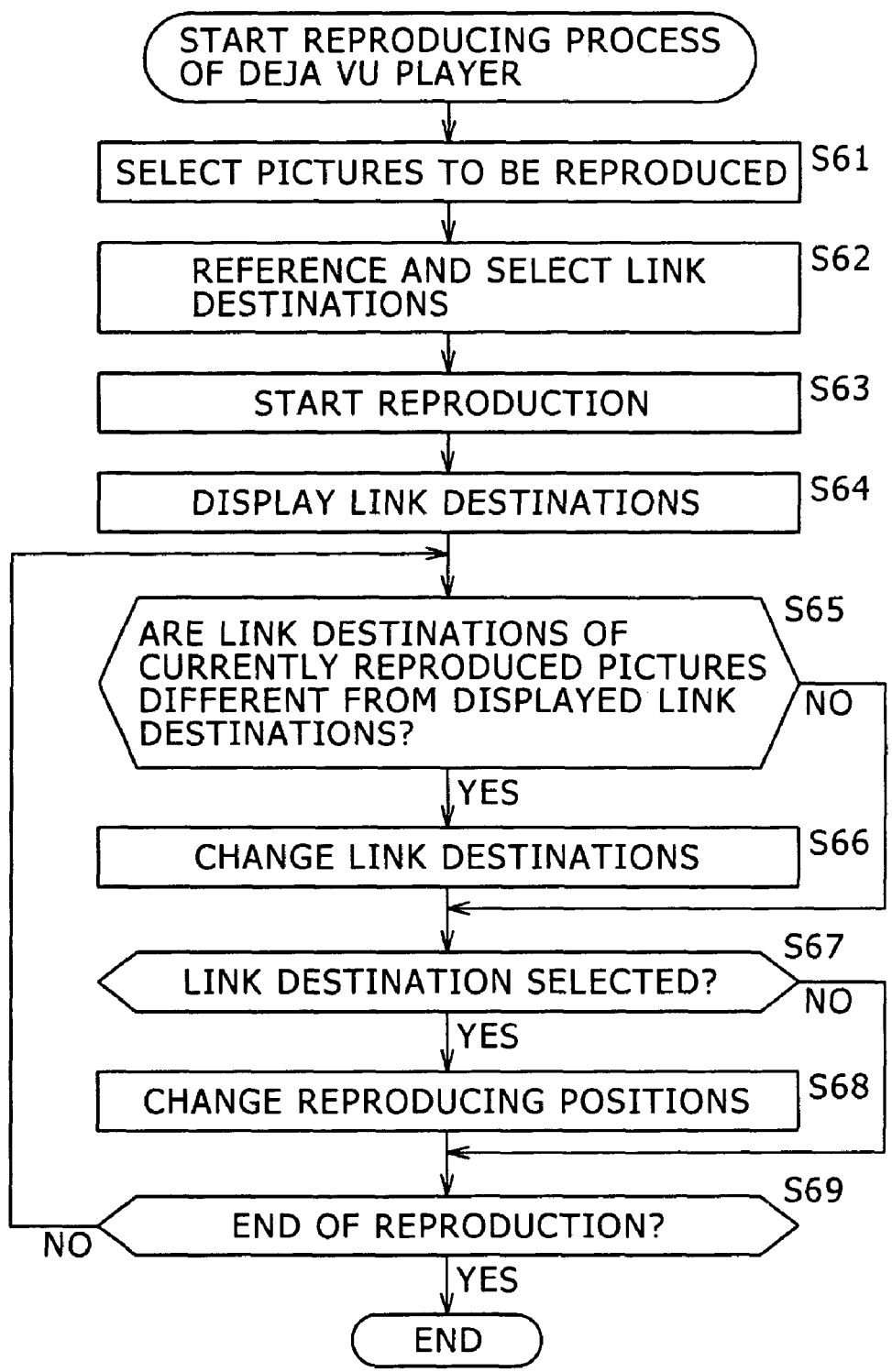
FIG. 26 is a flowchart of steps constituting a reproducing process of the déjà vu player.

A reproducing process performed by the déjà vu player 82 is described below with reference to the flowchart of FIG. 26. In step S61, the picture selection unit 121 (FIG. 20) of the déjà vu player 82 reads the picked-up picture sequence from the storage unit 68 in response to the user's operations, and selects the picture to be reproduced out of the retrieved picture sequence. For example, suppose that a particular moving picture file is selected from the storage unit 68. In that case, the picture selection unit 121 sequentially selects the pictures (i.e., starting from the first picture) making up the picked-up picture sequence held in the file, and outputs the selected pictures to the reproduction control unit 122.

In step S62, the picture selection unit 121 references the link data sent from the déjà vu engine 81, and selects link destinations applicable to the currently reproduced picture from the picked-up picture sequence. The link destinations selected by the picture selection unit 121 are output to the link destination display unit 123. If the currently reproduced picture has no link destinations, then no link destination is output to the link destination display unit 123.

In step S63, the reproduction control unit 122 starts reproducing the picture supplied from the picture selection unit 121, and causes the reproduced picture to appear in a predetermined position on the display unit 67.

In step S64, the link destination display unit 123 causes the link destinations sent from the picture selection unit 121 to be displayed in predetermined positions on the display unit 67. As a result, the display unit 67 displays the screen such as one shown in FIG. 21.

In step S65, the picture selection unit 121 checks to determine whether the link destinations applicable to the picture currently reproduced by the reproduction control unit 122 are different from those displayed in the link destination display areas 133-1 through 133-3. Once picture reproduction is started in step S63, the currently reproduced picture keeps changing over time. For that reason, the picture selection unit 121 checks in step S65 to see whether the link destinations applicable to the currently reproduced picture are being displayed correctly in the link destination display areas 133-1 through 133-3.

If in step S65 the picture selection unit 121 determines that the link destinations applicable to the picture being reproduced by the reproduction control unit 122 have become different from those displayed in the link destination display areas 133-1 through 133-3, then step S66 is reached.

In step S66, the picture selection unit 121 supplies the link destination display unit 123 with the pictures to be displayed as new link destinations. In turn, the link destination display unit 123 switches the link destination displays in keeping with the currently reproduced picture.

If in step S65 the picture selection unit 121 determines that the link destinations applicable to the currently reproduced picture are not different from those displayed in the link destination display areas 133-1 through 133-3, then step S66 is skipped.

In step S67, the picture selection unit 121 checks to determine whether any of the link destinations being displayed in the link destination display areas 133-1 through 133-3 is selected as the new picture to be reproduced in response to the user's operations. If any such link destination is found selected for reproduction, then step S68 is reached.

In step S68, with the link destination selected by the user, the picture selection unit 121 supplies the reproduction control unit 122 with the pictures following the timestamp of the selected link destination, and causes the unit 122 to start reproducing the pictures. This step terminates reproduction of the currently selected scene and starts reproducing the scene subsequent to the newly selected link destination.

If in step S67 no link destination is found selected, then step S68 is skipped.

In step S69, the picture selection unit 121 determines whether the reproducing process is to be terminated. If the reproducing process is not to be terminated, step S65 is reached again and the subsequent steps are repeated. If an instruction to stop the reproducing process is given illustratively by the user, or if the picked-up picture sequence selected by the user has been reproduced to the last picture, then the picture selection unit 121 determines in step S69 that the reproducing process is to be terminated, and brings the process to an end.

The processes discussed above allow the user to view the scene selected by preference and to verify scenes similar to that scene on the same screen. By selecting any one of the similar scenes thus presented, the user is able to jump easily to the newly selected similar scene for reproduction (as explained in the upper balloon in FIG. 2).

Figure 27:
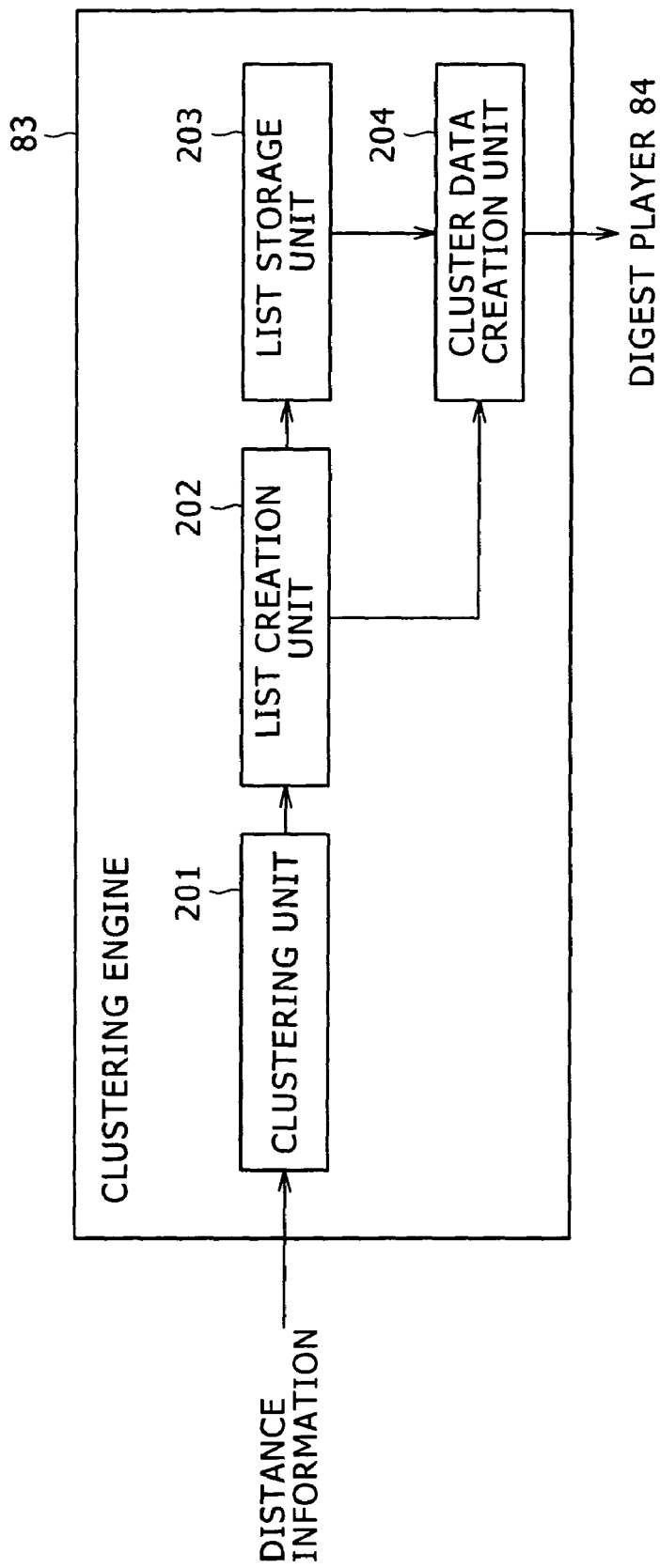
FIG. 27 is a block diagram showing a typical functional structure of a clustering engine.

What follows is a description of a reproducing method by which to reproduce similar scenes in clusters as outlined in the lower balloon in FIG. 2. FIG. 27 is a block diagram showing a typical functional structure of the clustering engine 83 in FIG. 8.

The clustering engine 83 is made up of a clustering unit 201, a list creation unit 202, a list storage unit 203, and a cluster data creation unit 204. The clustering unit 201 processes scenes into clusters based on the distance information (i.e., distance matrix in FIG. 13) sent from the déjà vu engine 81.

Figure 28:
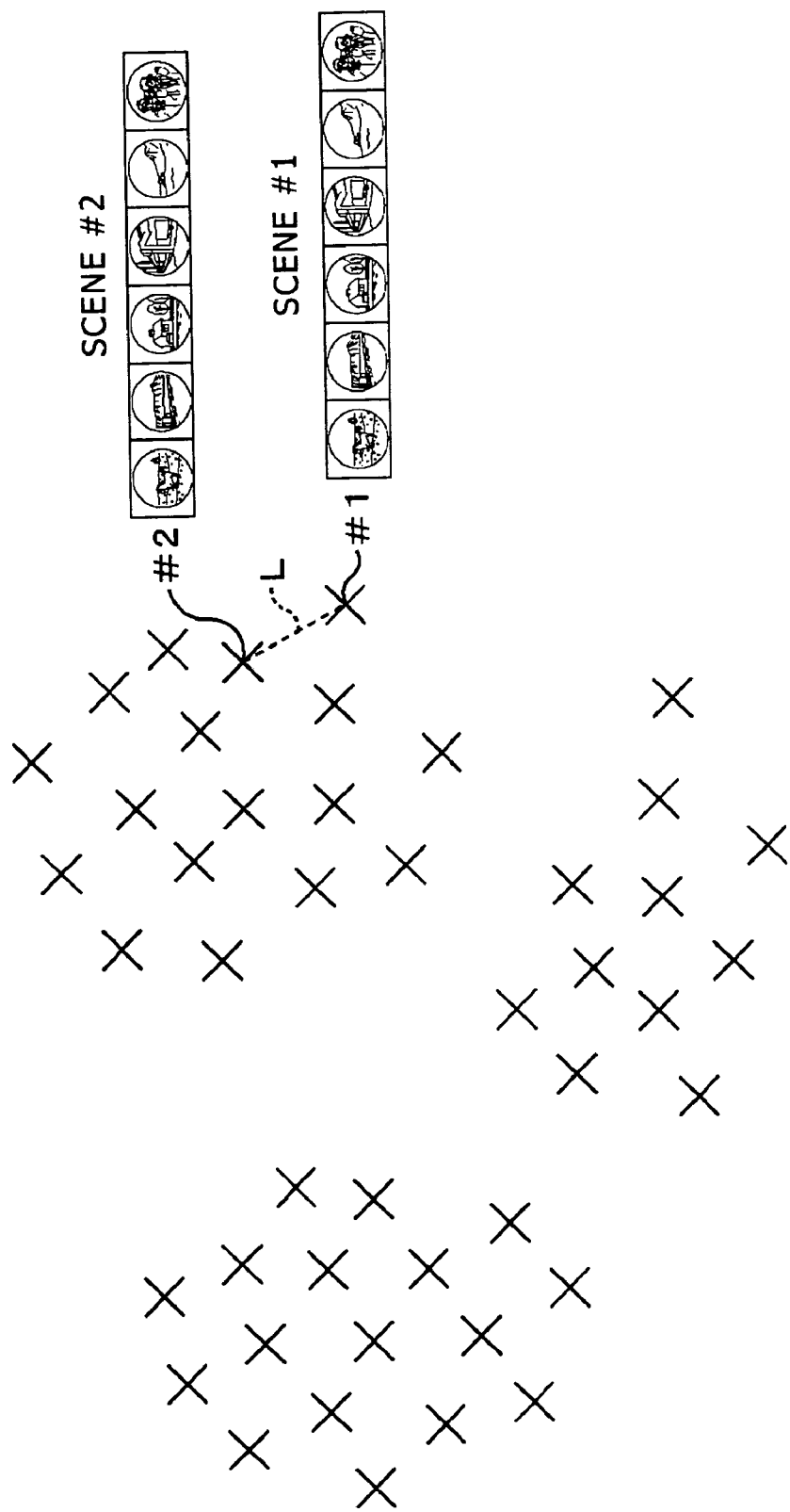
FIG. 28 is a schematic view showing an example of clustering.

FIG. 28 is a schematic view showing an example of clustering performed by the clustering unit 201. The clustering unit 201 plots scenes in accordance with the distance information supplied from the déjà vu engine 81, as indicated by crosses in FIG. 28. In FIG. 28, each element (i.e., a cross) represents one scene, and the distances between the elements denote the distances between the scenes represented by these elements.

In the example of FIG. 28, elements #1 and #2 plotted on the right-hand side stand for scenes #1 and #2 respectively. A distance L between the elements #1 and #2 represents the distance between the scenes #1 and #2. The distance L is acquired from distance information.

Figure 29:
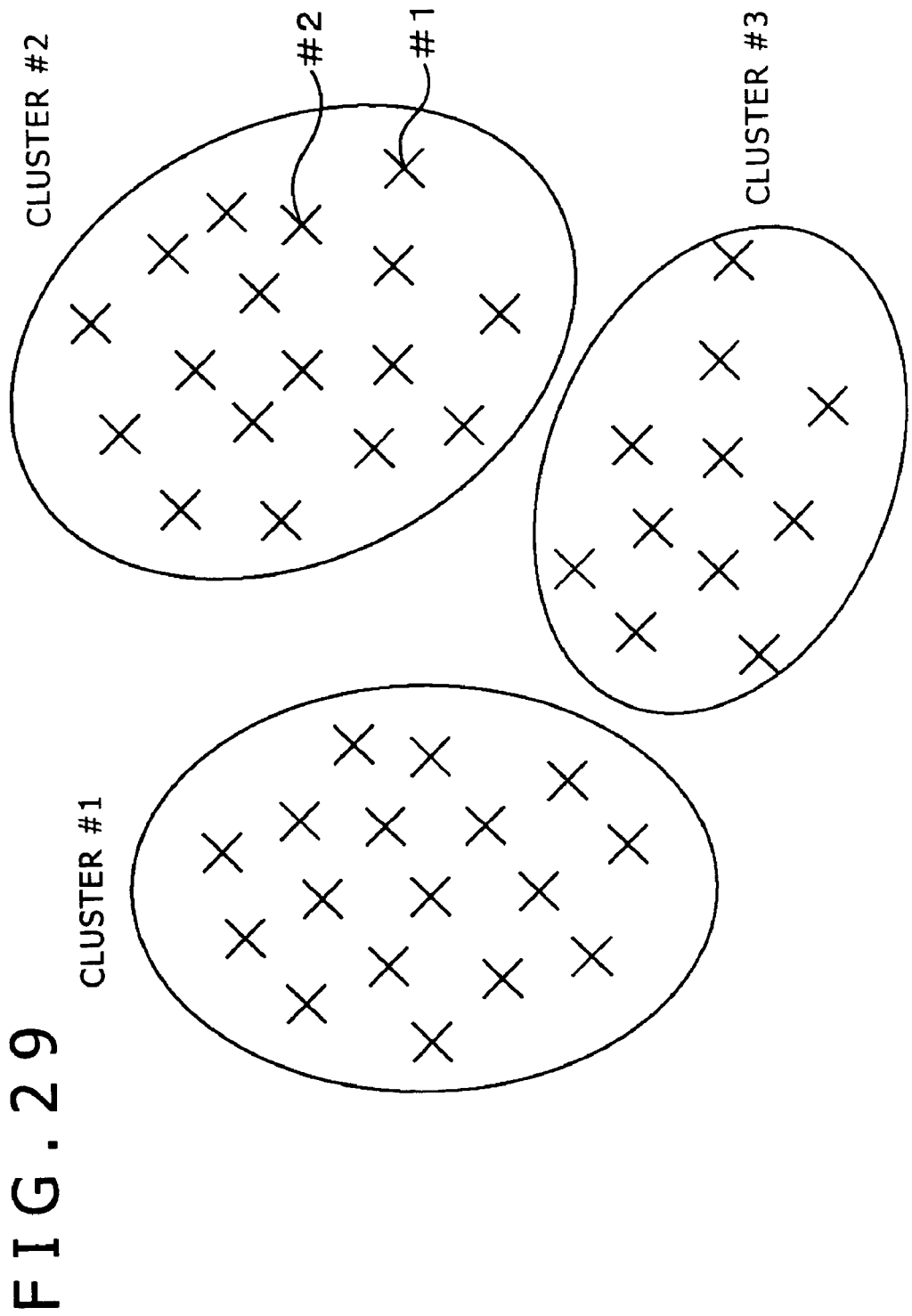
FIG. 29 is a schematic view showing another example of clustering.

After plotting elements as shown in FIG. 28, the clustering unit 201 processes the elements into clusters in such a manner that the elements close to one another will belong to the same cluster, as illustrated in FIG. 29. In the example of FIG. 29, all elements are processed into clusters #1 through #3.

Figure 30:
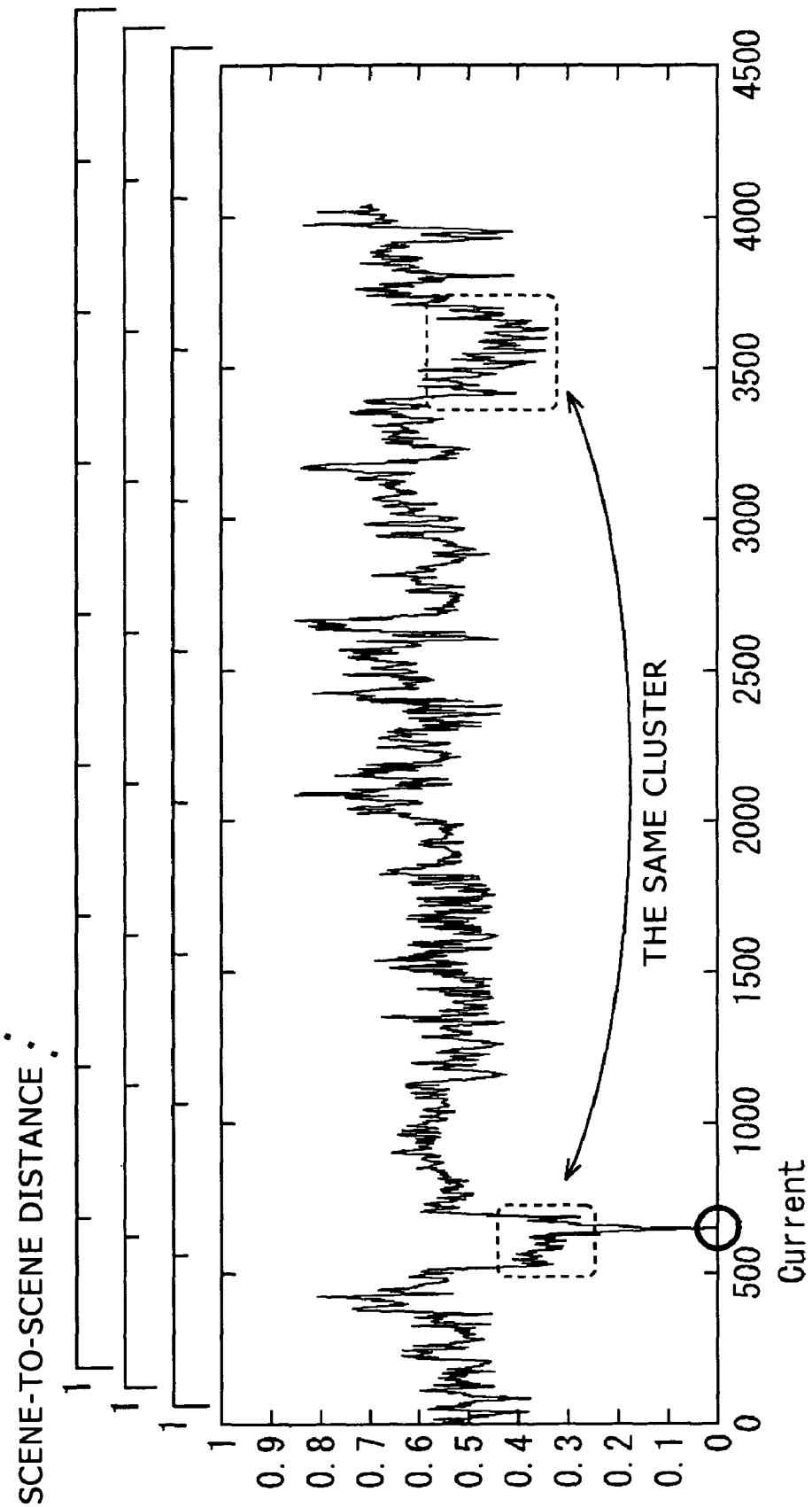
FIG. 30 is a schematic view showing a further example of clustering.

FIG. 30 is a schematic view graphically showing how clustering is done. The graphic representation in FIG. 30 is the same as that in FIG. 12. As shown in FIG. 30, the scenes enclosed by broken lines belong to the same cluster. These clusters have relatively short distances to the scene of interest.

In another graph representative of the distances calculated with respect to another scene taken as the scene of interest, the nearby scenes are likewise processed into the same cluster.

The number of clusters used in the clustering process is defined by so-called granularity. The granularity of a cluster basically corresponds to the number of elements belonging to that cluster. The finer the degree of granularity for the clusters, the smaller the number of elements belonging to each of the clusters. When all elements are grouped into the smallest possible number of clusters, that state signifies the coarsest degree of granularity.

Figure 31:
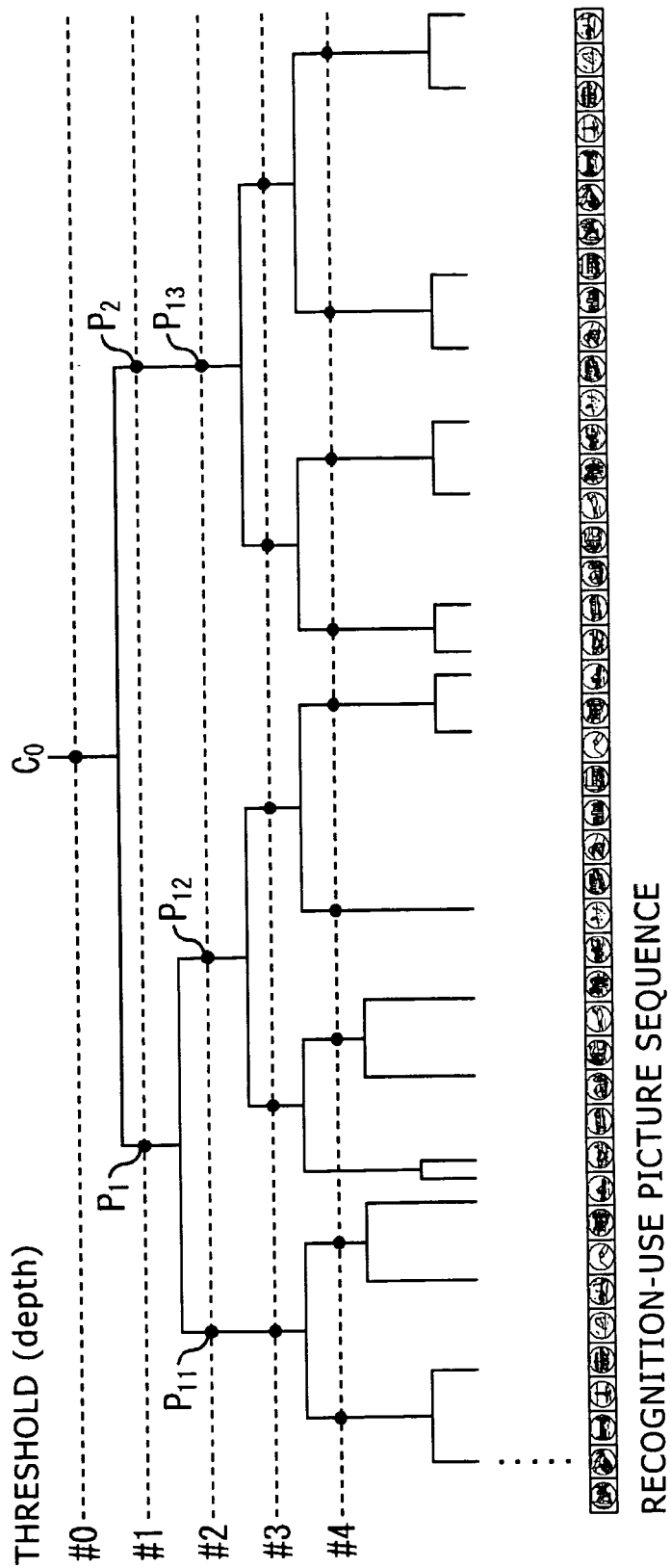
FIG. 31 is a schematic view showing a typical cluster tree.

FIG. 31 is a schematic view of a typical cluster tree showing how clustering is carried out. The granularity for clustering is explained below with reference to FIG. 31.

As mentioned above, elements are clustered according to their proximity to one another by use of a predetermined algorithm based on the distance information sent from the déjà vu engine 81. The scenes making up the recognition-use picture sequence in each of the bottom nodes in FIG. 31 converge ultimately on one cluster $C_0$. In FIG. 31, the position of a given scene is represented by the position of the most recent of the pictures constituting the scene in question.

When an appropriate threshold (i.e., depth of hierarchy) is set for the cluster tree indicating the process of clustering, the points of intersection between the threshold line on the one hand and the cluster tree branches on the other hand define the clusters involved. That is, the number of intersection points determines the number of clusters needed to cover all scenes. Because the cluster count determines the number of scenes belonging to each of the clusters, the granularity of the clusters is determined accordingly.

For example, if a threshold #0 is set, then the number of intersection points is one, as shown in FIG. 31. That means all scenes belong to a single cluster. If a threshold #1 is set, then the number of intersection points is 2, which means all scenes on the tree branches under the intersection points belong to two clusters. If a threshold #2 is set, the number of intersection points is 3, which means all scenes on the tree branches under the intersection points belong to three clusters.

As described, the lower the threshold (i.e., the greater the depth) for the cluster tree, the larger the number of clusters created and the finer their granularity. If follows that by designating a desired degree of granularity, the user can designate the number of clusters to be created. This in turn makes it possible to change the number of scenes belonging to any one cluster, i.e., the time interval over which the scenes are reproduced consecutively as one cluster.

The representative clustering methods include nearest neighbor method, farthest neighbor method, and centroid method. Any suitable method may be used for the clustering process.

Returning to the explanation of FIG. 27, the clustering unit 201 performs such clustering based on scene-to-scene distances at varying degrees of cluster granularity. The results of the clustering process at the different degrees of granularity are output to the list creation unit 202.

Given the results of clustering from the clustering unit 201, the list creation unit 202 creates lists that include the frame numbers of the pictures belonging to each of the clusters involved (i.e., frame numbers of the most recent of the pictures making up each scene). The lists thus created are stored into the list storage unit 203.

The results of clustering at the varying degrees of cluster granularity are sent from the clustering unit 201 to the list creation unit 202. In this manner, the list storage unit 203 accommodates the lists of frame numbers at the different degrees of cluster granularity, such as a list of the frame numbers of the pictures belonging to each of two clusters, a list of the frame numbers of the pictures belonging to each of three clusters, and so on.

The cluster data creation unit 204 reads one of the lists held in the list storage unit 203, and arranges the pictures in the retrieved list on the time base (i.e., along the frame number axis) to create cluster data about the clusters of the pictures involved.

Figure 32:
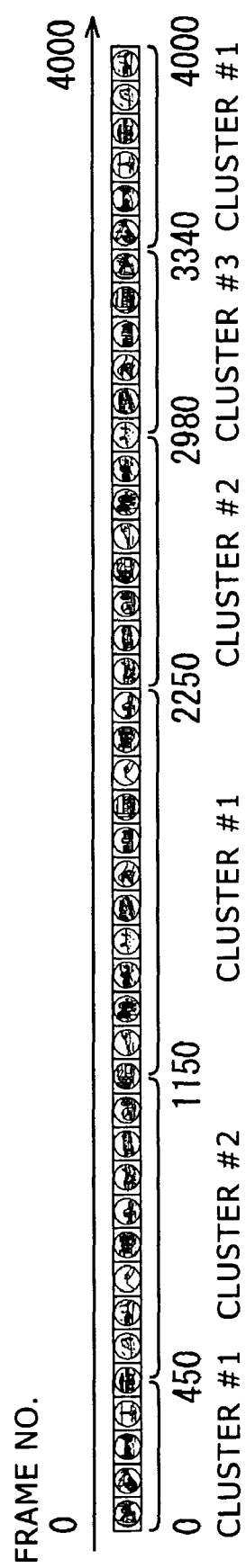
FIG. 32 is a schematic view showing a typical outcome of clustering.

FIG. 32 is a schematic view showing a typical outcome of clustering. FIG. 32 indicates the pictures having the frame numbers 0 through 4000. The pictures with the frame numbers 0 through 449 are grouped into a cluster #1, the pictures with the frame numbers 450 through 1149 into a cluster #2, the pictures with the frame numbers 1150 through 2249 into the cluster #1, the pictures with the frame numbers 2250 through 2979 into the cluster #2, the pictures with the frame numbers 2980 through 3339 into a cluster #3, and the pictures with the frame numbers 3340 through 4000 into the cluster #1.

With the pictures clustered as described above, suppose that the user selects the cluster #1 for reproduction. In this case, reproduction starts from the picture with the frame number 0 in the cluster #1. At the end of reproduction of the picture with the frame number 449, reproduction starts from the picture with the frame number 1150. After the picture with the frame number 2249 has been reproduced, reproduction starts from the picture with the frame number 3340 and continues up to the picture with the frame number 4000.

FIGS. 33 and 34 show examples of cluster data. In these figures, as in FIG. 19, the numeral with a colon (:) in the leftmost position of each line is furnished only for explanation purposes. It should also be noted that the link data in FIGS. 33 and 34 does not represent the result of clustering in FIG. 32.

Line 1, "ClusterDepthNum=3" under the heading "Cluster Info" indicates that there are three degrees of cluster granularity in the cluster data description of FIGS. 33 and 34. That is, the line indicates that the clusters are given "coarse," "medium," or "fine" granularity and that information about the clusters at these degrees of granularity is described in the data.

In FIGS. 33 and 34, "ClusterDepth0" denotes information about the clusters of "coarse" granularity; "ClusterDepth1" represents information about the clusters of "medium" granularity; and "ClusterDepth2" gives information about the clusters of "fine" granularity. During reproduction of the picked-up picture sequence, the description designated by the user about cluster granularity is referenced.

Lines 2 through 4 in FIG. 33 describe information about the clusters at "ClusterDepth0" ("coarse" granularity); lines 5 through 8 describe information about the clusters at "ClusterDepth1" ("medium" granularity); and lines 9 through 14 describe information about the clusters at "ClusterDepth2" ("fine" granularity).

With "ClusterDepth0" in effect, line 2, "ClusterNum=2" indicates that there are two clusters. Line 3, "ClusterTitle0=INSIDE THE HOUSE" indicates that the first of the two clusters has the title "INSIDE THE HOUSE," and Line 4, "ClusterTitle1=GARDEN" indicates that the second cluster has the title "GARDEN." Clusters are given suitable titles illustratively by the user having viewed the scenes of each of the clusters.

Likewise, lines 5 through 8 describe the number of clusters formed and the titles of the clusters when "ClusterDepth1" is in effect. Lines 9 through 14 describe the number of clusters formed and the titles of the clusters when "ClusterDepth2" is in effect.

The heading "ClusterData" in FIG. 34 denotes information about the pictures belonging to the clusters involved. Line 1, "Frame0_Depth0=1" indicates that when "ClusterDepth0" is in effect, the cluster represented by the picture with the frame number 0 (i.e., the cluster ranging from the picture with the frame number 0 to the first picture of the next cluster) is a cluster 1 (i.e., cluster with the title "ClusterTitle1=GARDEN" on line 4 in FIG. 33).

Line 2, "Frame0_Depth1=2" indicates that when "ClusterDepth1" is in effect, the cluster represented by the picture with the frame number 0 (i.e., the cluster ranging from the picture with the frame number 0 to the first picture of the next cluster) is a cluster 2 (i.e., cluster with the title "ClusterTitle2=GARDEN" on line 8 in FIG. 33).

Line 3, "Frame0_Depth2=4" indicates that when "ClusterDepth2" is in effect, the cluster represented by the picture with the frame number 0 (i.e., the cluster ranging from the picture with the frame number 0 to the first picture of the next cluster) is a cluster 4 (i.e., cluster with the title "ClusterTitle4=GARDEN" on line 14 in FIG. 33).

Line 4, "Frame0_Next_Depth0=443" indicates that when "ClusterDepth0" is in effect, the picture at the head of the cluster and next to the picture with the frame number 0 has the frame number 443.

Line 5, "Frame0_Next_Depth1=200" indicates that when "ClusterDept1" is in effect, the picture at the head of the cluster and next to the picture with the frame number 0 has the frame number 200.

Line 6, "Frame0_Next_Depth2=200" indicates that when "ClusterDepth2" is in effect, the picture at the head of the cluster and next to the picture with the frame number 0 has the frame number 200.

Line 7, "Frame200_Depth1=1" indicates that when "ClusterDepth1" is in effect, the cluster represented by the picture with the frame number 200 (i.e., the cluster ranging from the picture with the frame number 200 to the first picture of the next cluster) is the cluster 1 (i.e., cluster with the title "ClusterTitle1=ENTRANCE" on line 7 in FIG. 33).

Line 8, "Frame200_Depth2=2" indicates that when "ClusterDepth2" is in effect, the cluster represented by the picture with the frame number 200 (i.e., the cluster ranging from the picture with the frame number 200 to the first picture of the next cluster) is the cluster 2 (i.e., cluster with the title "ClusterTitle2=ENTRANCE" on line 12 in FIG. 33).

Line 9, "Frame200_Next_Depth1=443" indicates that when "ClusterDepth1" is in effect, the picture at the head of the cluster and next to the picture with the frame number 200 has the frame number 443.

Line 10, "Frame200_Next_Depth2=443" indicates that when "ClusterDepth2" is in effect, the picture at the head of the cluster and next to the picture with the frame number 200 has the frame number 443.

Line 11, "Frame443_Depth0=0" indicates that when "ClusterDepth0" is in effect, the cluster represented by the picture with the frame number 443 (i.e., the cluster ranging from the picture with the frame number 443 to the last picture) is a cluster 0 (i.e., cluster with the title "ClusterTitle0=INSIDE THE HOUSE" on line 3 in FIG. 33).

Line 12, "Frame443_Depth1=0" indicates that when "ClusterDepth1" is in effect, the cluster represented by the picture with the frame number 443 (i.e., the cluster ranging from the picture with the frame number 443 to the last picture) is the cluster 0 (i.e., cluster with the title "ClusterTitle0=INSIDE THE HOUSE" on line 6 in FIG. 33).

Line 13, "Frame443_Depth2=0" indicates that when "ClusterDepth2" is in effect, the cluster represented by the picture with the frame number 443 is the cluster 0 (i.e., cluster with the title "ClusterTitle0=INSIDE THE HOUSE" on line 10 in FIG. 33).

Lines 14 through 16 each indicate the frame number of the last picture heading the cluster at each of the cluster depths involved.

The cluster data outlined above, including "ClusterInfo," "ClusterDepth" and "ClusterData," is output as meta data from the clustering engine 83 to the digest player 84.

The workings of the clustering engine 83 structured as described above will be discussed later with reference to relevant flowcharts.

Figure 35:
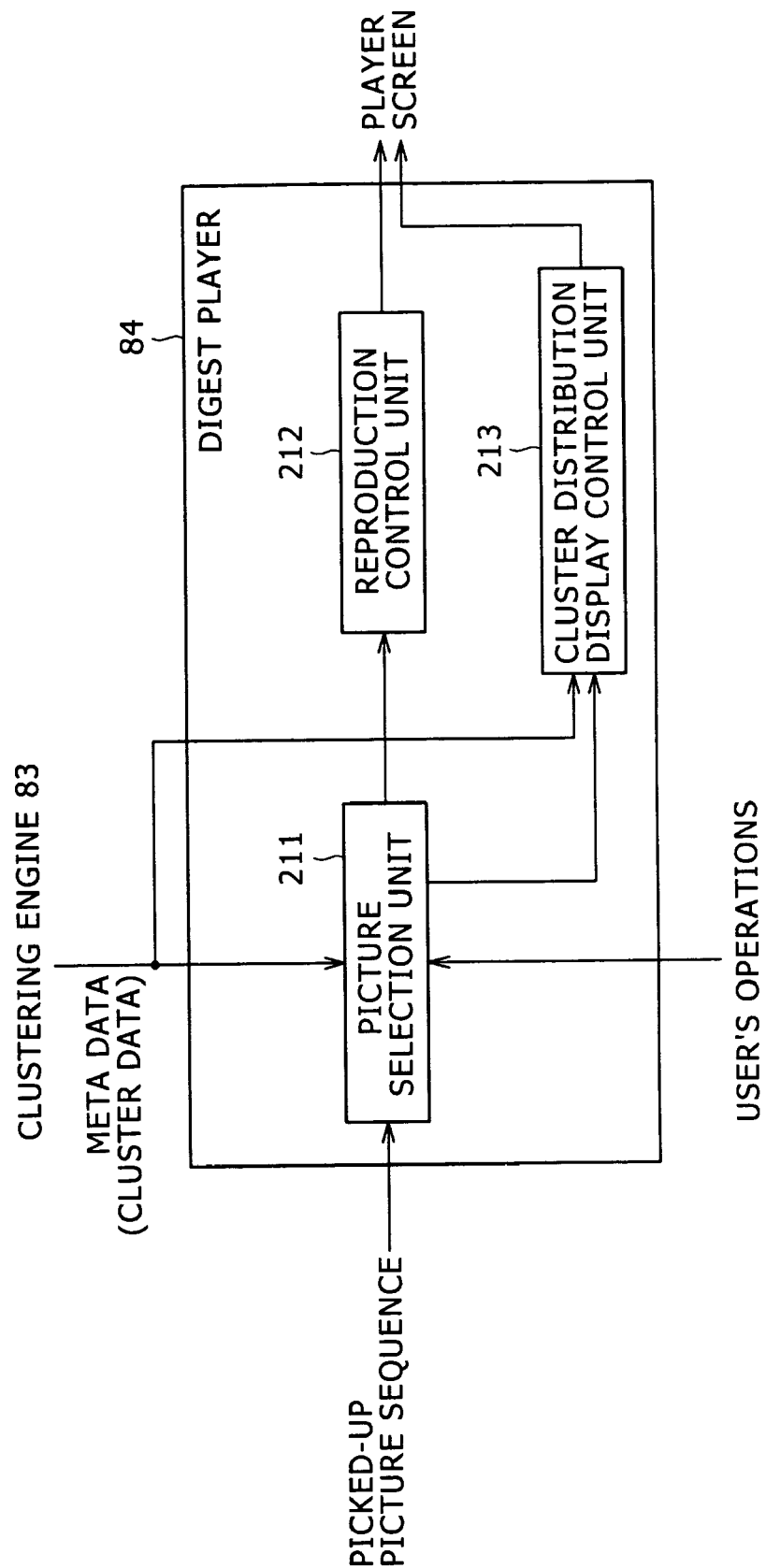
FIG. 35 is a block diagram showing a typical functional structure of a digest player.

FIG. 35 is a block diagram showing a typical functional structure of the digest player 84 in FIG. 8. The digest player 84 is constituted by a picture selection unit 211, a reproduction control unit 212, and a cluster distribution display control unit 213.

The picture selection unit 211 reads the picked-up picture sequence from the storage unit 68 and, based on the cluster data from the clustering engine 83 and in response to the user's operations, selects desired pictures from the retrieved picture sequence. When a cluster is designated by the user, the picture selection unit 211 selects only the pictures belonging to the designated cluster from the picked-up picture sequence and outputs the selected pictures to the reproduction control unit 212 as the pictures to be reproduced.

Illustratively, suppose that the cluster data shown in FIGS. 33 and 34 is being supplied, that "ClusterDepth0" is selected, and that the cluster with the title "ClusterTitle0=INSIDE THE HOUSE" is selected as the cluster to be reproduced. In that case, the picture selection unit 211 supplies the reproduction control unit 212 with the selected pictures starting from the picture with the frame number 0 belonging to the selected cluster, for reproduction purposes.

The picture selection unit 211 keeps supplying the pictures up to the frame number 443 identifying the first picture of a different cluster (i.e., the picture with the frame number 443 is not included), in order to reproduce the cluster which has the pictures ranging from the frame number 0 to the frame number 442 and which has the title "ClusterTitle0" with "ClusterDepth0" in effect.

The reproduction control unit 212 reproduces the pictures coming from the picture selection unit 211, and causes the display unit 67 to display the reproduced pictures in suitable positions on the screen.

The cluster distribution display control unit 213 causes the display unit 67 to display a cluster distribution on the time base in accordance with the cluster data supplied by the clustering engine 83.

Figure 36:
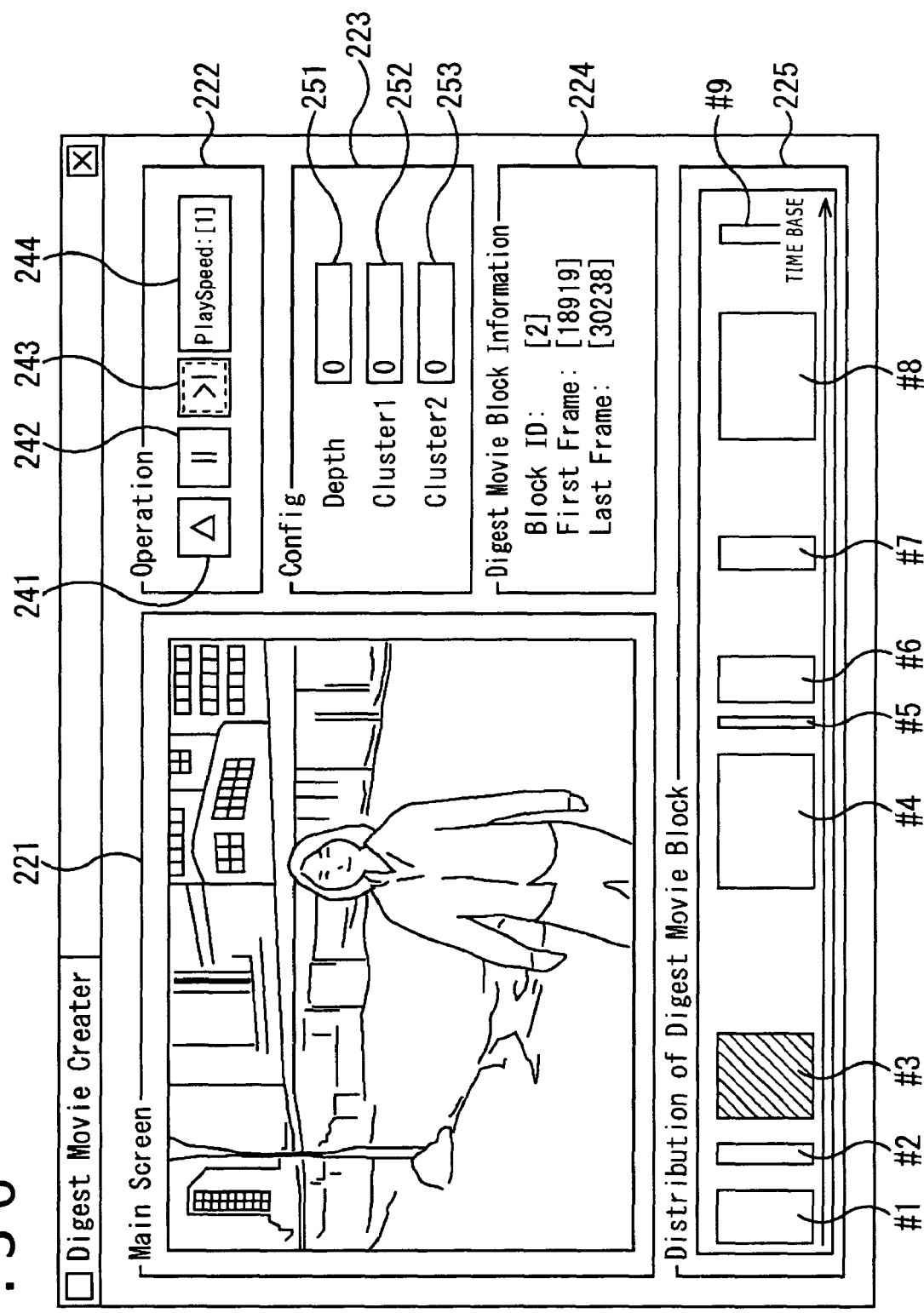
FIG. 36 is a schematic view showing a typical screen displayed by the digest player.

FIG. 36 is a schematic view showing a typical screen displayed by the digest player 84. A moving picture display area 221 in the top left position of the screen displays pictures being reproduced by the reproduction control unit 212. A cluster distribution display area 225 at the bottom of the screen displays a chronological distribution of the clusters selected by the user. The distribution of the scenes belonging to the clusters is indicated in terms of movie blocks each representative of grouped pictures.

In the example of FIG. 36, movie blocks #1 through #9 belonging to the same cluster are displayed in the cluster distribution display area 225. Of these blocks, the movie block #3 shown shaded is currently reproduced. That is, the picture being displayed in the moving picture display area 221 is part of the movie block #3.

For example, when reproduction of the last picture of the currently reproduced movie block #3 is finished, reproduction starts from the first picture of the movie block #4. In this manner, the user can view in blocks only those scenes similar to the one initially selected by preference.

In the cluster distribution display area 225, the user may select a movie block different from the currently reproduced movie block. The selected movie block starts getting reproduced then and there.

Where the user has designated display of clusters different from the cluster made up of the movie blocks #1 through #9, the cluster distribution display area 225 also displays a distribution of the scenes belonging to these clusters. For example, the movie blocks displayed in the cluster distribution display area 225 are grouped by color so that the user may know which movie block will be reproduced next.

The screen in FIG. 36 also indicates an operation button display area 222 that displays various operation buttons, a cluster selection area 223 in which to select a desired degree of cluster granularity and the cluster to be reproduced, and a movie block information display area 224 that displays information about the currently reproduced movie block.

A file selection button 241 shown in the operation button display area 222 is operated by the user to select a desired moving picture file. A play/pause button 242 is operated by the user to start or pause reproduction. A move button 243 is operated to move from the currently reproduced movie block to the next movie block. A speed selection button 244 is operated to select the speed at which to reproduce movie blocks.

A granularity selection area 251 shown in the cluster selection area 223 is operated by the user to designate a desired degree of cluster granularity. Cluster selection areas 252 and 253 are operated to designate the clusters to be reproduced.

What follows is a description of how the clustering engine 83 and digest player 84 work so as to bring about the display shown in FIG. 36.

Figure 37:
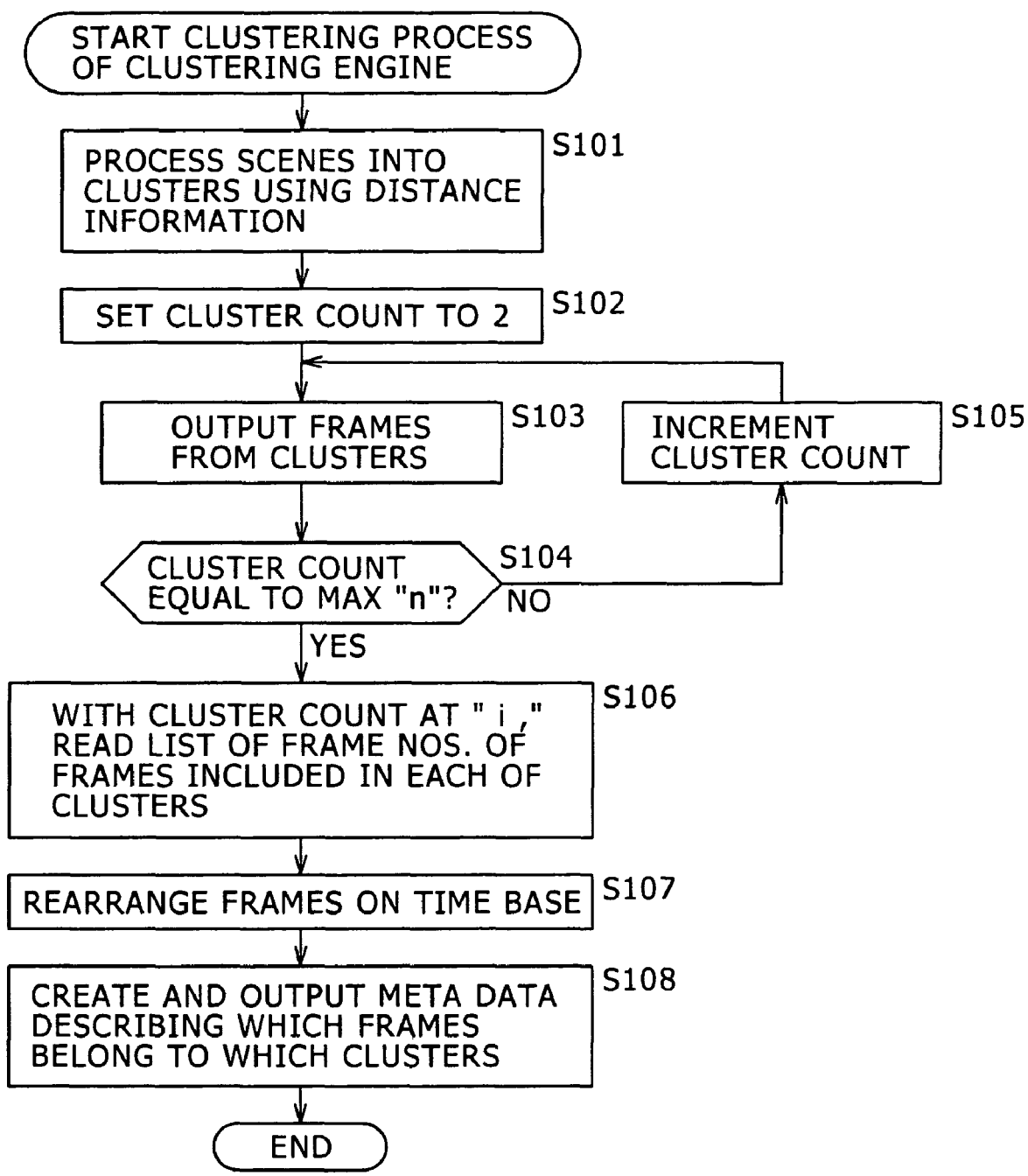
FIG. 37 is a flowchart of steps constituting a clustering process of the clustering engine.

Described first with reference to the flowchart of FIG. 37 is a clustering process performed by the clustering engine 83. This process is started illustratively when the déjà vu engine 81, upon completion of the process in FIG. 24, has provided distance information.

In step S101, the clustering unit 201 processes scenes into clusters using the distance information supplied by the déjà vu engine 81. The clustering in this step results illustratively in the clustering tree of FIG. 31. This outcome of the clustering is sent from the clustering unit 201 to the list creation unit 202.

In step S102, the list creation unit 202 sets the number of clusters to 2. In step S103, the list creation unit 202 outputs to the list storage unit 203 a list of the frame numbers identifying the pictures belonging to the clusters (i.e., frame numbers identifying the most recent of the pictures constituting the scenes belonging to each of the clusters). The list storage unit 203 accommodates lists each formed by the frame numbers indicating which pictures are included in which clusters.

For example, the list creation unit 202 may set the threshold #1 for the clustering tree in FIG. 31, and output to the list storage unit 203 a list of the frame numbers identifying the pictures belonging to the two clusters defined in reference to the threshold #1. The list placed into the list storage unit 203 at this point describes the frame numbers of the scenes on the branches under intersection points $P_1$ and $P_2$.

In step S104, the list creation unit 202 checks to determine whether the cluster count has reached a maximum "n." If the maximum cluster count is not reached yet, control is passed on to step S105. More specifically, there exist a predetermined maximum number of clusters that may be displayed by the digest player 84. The check in step S104 determines whether that maximum number has been attained.

In step S105, the list creation unit 202 increments the cluster count illustratively by 1, and performs step S103 and subsequent steps. For example, if the cluster count is 3, the list creation unit 202 sets the threshold #2 for the clustering tree in FIG. 31, and outputs to the list storage unit 203 a list of the frame numbers identifying the scenes belonging to the three clusters defined in reference to the threshold #2. The list placed into the list storage unit 203 at this point describes the frame numbers of the scenes on the branches under intersection points $P_{11}$, $P_{12}$, and $P_{13}$.

If in step S104 the list creation unit 202 determines that the cluster count has reached the maximum "n," then control is passed on to step S106. The list creation unit 202 notifies the cluster data creation unit 204 that the cluster count has attained the maximum "n."

In step S106, the cluster data creation unit 204 reads, from the frame number lists in the list storage unit 203, a list of the frame numbers identifying the pictures belonging to each of the clusters when the cluster count is "i" ($i \leq n$). In step S107, these pictures are rearranged chronologically by the cluster data creation unit 204.

In step S108, the cluster data creation unit 204 creates cluster data describing which pictures belong to which clusters, and outputs the created cluster data as meta data to the digest player 84.

Figure 38:
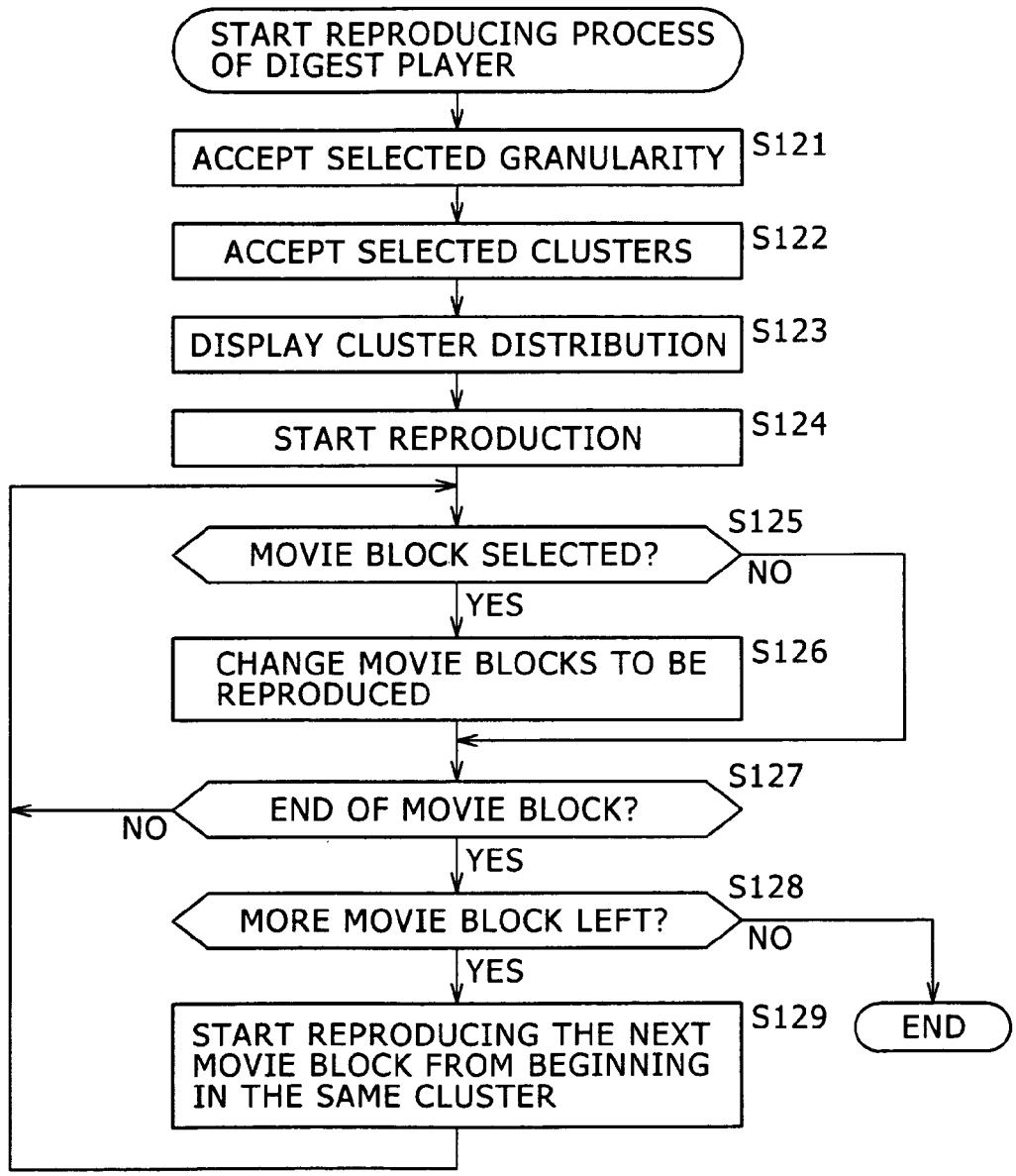
FIG. 38 is a flowchart of steps constituting a reproducing process of the digest player.

A reproducing process performed by the digest player 84 will now be described with reference to the flowchart of FIG. 38. This process is carried out illustratively when, with cluster data supplied from the clustering engine 83, the player screen of FIG. 36 is displayed in response to the user's operations.

In step S121, the picture selection unit 211 accepts the degree of cluster granularity selected by the user. In step S122, the picture selection unit 211 accepts the clusters selected for reproduction.

Illustratively, when the user enters appropriate values into the granularity selection area 251 as well as into the cluster selection areas 252 and 253, the picture selection unit 211 accepts the entered cluster granularity and the selected clusters. Information about the user-selected clusters is sent from the picture selection unit 211 to the cluster distribution display control unit 213.

In step S123, the cluster distribution display control unit 213 references the cluster data coming from the clustering engine 83, and causes the cluster distribution display area 225 to display a chronological distribution of the clusters in effect at the selected degree of granularity. The display allows the user to verify the distribution of the scenes belonging to the clusters in effect and to select the movie block to be reproduced.

In step S124, the picture selection unit 211 outputs the pictures of the selected movie block to the reproduction control unit 212 for reproduction, in response to the user's operations.

In step S125, the picture selection unit 211 checks to determine whether any movie block different from the currently reproduced movie block is selected by the user from among the movie blocks displayed in the cluster distribution display area 225. If any such movie block is found selected, step S126 is reached.

In step S126, the picture selection unit 211 changes the currently reproduced movie block, by supplying the reproduction control unit 212 with the movie block newly selected by the user starting from the first picture of the block.

If in step S125 any movie block different from the currently reproduced movie block is not found selected by the user, then step S126 is skipped.

In step S127, the picture selection unit 211 checks to determine whether reproduction of the ongoing movie block is completed up to its last picture. If reproduction of the last picture is not found complete, then step S125 is reached again and the subsequent steps are repeated.

If in step S127 the picture selection unit 211 determines that reproduction of the ongoing movie block is completed up to its last picture, step S128 is reached. In step S128, the picture selection unit 211 checks to determine whether there still exist any movie blocks belonging to the same cluster as that of the just-completed movie block.

If in step S128 the picture selection unit 211 determines that there still exists a movie block belonging to the same cluster, step S129 is reached. In step S129, the picture selection unit 211 starts reproduction from the first picture of the movie block subsequent to the just-completed movie block. In this manner, the clusters of the similar scenes are reproduced consecutively.

If in step S128 the picture selection unit 211 determines that there exists no more movie block belonging to the same cluster as that of the just-completed movie block, the reproducing process is terminated. In the manner described, the user is allowed to select only the scenes similar to the scene selected initially by preference.

Whereas the user is able to verify the distribution of the scenes belonging to the selected clusters on the screen of FIG. 36 in the above-described steps, this is not limitative of the invention. Alternatively, the user may also ascertain scene distributions on some other screen such as the one shown in FIG. 39.

Figure 39:
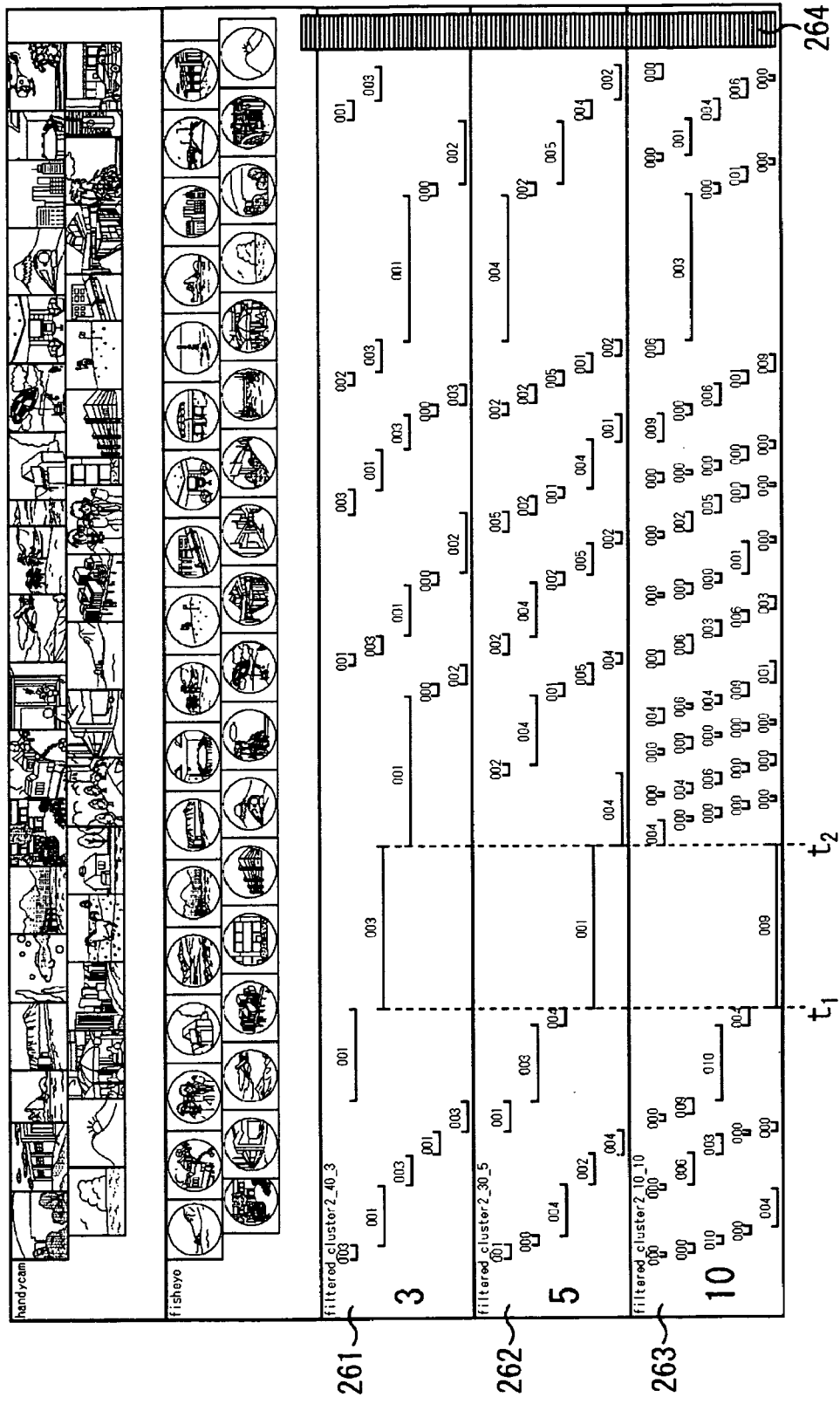
FIG. 39 is a schematic view showing a typical display of results from clustering.

Display areas 261 through 263 in FIG. 39 each indicate scenes over varying time intervals belonging to a different number of clusters (i.e., at a different degree of granularity) in the entire picture sequence shown in each area. Solid lines in the horizontal direction (on the time base) in the display areas represent the scenes, and the vertical locations of these lines distinguish the clusters the scenes belong to.

In the example of FIG. 39, the display in the display area 261 denotes a distribution of the scenes belonging to three clusters; the display in the display area 262 shows a distribution of the scenes belonging to five clusters; and the display in the display area 263 indicates a distribution of the scenes belonging to 10 clusters.

Illustratively, over the time interval between time $t_1$ and time $t_2$, the scenes are shown belonging to a cluster 003 in the display area 261 where there are three clusters; the clusters are shown belonging to a cluster 001 in the display area 262 where there are five clusters; or the clusters are shown belonging to a cluster 009 in the display area 263 where there exist 10 clusters.

In the example of FIG. 39, the user may change the number of clusters by manipulating a slide bar 264 in the rightmost position of the screen. Illustratively, if the slide bar 264 is moved downward in the state of FIG. 39, the display areas 261 through 263 may each be made to display a distribution of the scenes belonging to more than 10 clusters. In other words, the user is allowed to change the threshold for the cluster tree in FIG. 31 by manipulating the slide bar 264. Utilizing the screen of FIG. 39 enables the user to determine easily the degree of cluster granularity to be set and the clusters to be reproduced on the screen of FIG. 36.

For the foregoing description, it has been assumed that the video camera 1 only acquires pictures (i.e., picked-up picture sequence and recognition-use picture sequence) while the personal computer 2 creates meta data based on the recognition-use picture sequence and reproduces the picked-up picture sequence in accordance with the created meta data. Alternatively, the video camera 1 may also take on the creation of meta data.

Figure 40:
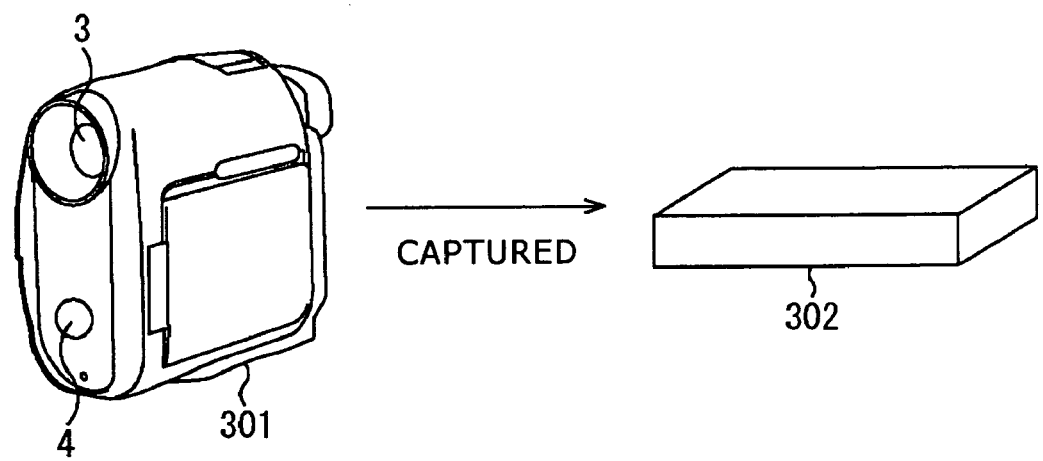
FIG. 40 is a schematic view showing another typical configuration of the picture-taking and display system to which this invention is applied.

FIG. 40 is a schematic view showing another typical configuration of the picture-taking and display system to which this invention is applied. In FIG. 40, a video camera 301 acquires both a picked-up picture sequence and a recognition-use picture sequence. Using the recognition-use picture sequence thus obtained, the video camera 301 creates the above-described meta data including link data (FIG. 19) and cluster data (FIGS. 33 and 34) and stores the created meta data into a built-in storage device along with the picked-up picture sequence.

As indicated by an arrowed solid line in FIG. 40, a player 302 captures the picked-up picture sequence and meta data from the video camera 301. In keeping with the meta data, the player 302 carries out jump reproduction of the picked-up picture sequence based on the link data, or cluster-by-cluster reproduction of the picked-up picture sequence based on the cluster data.

Figure 41:
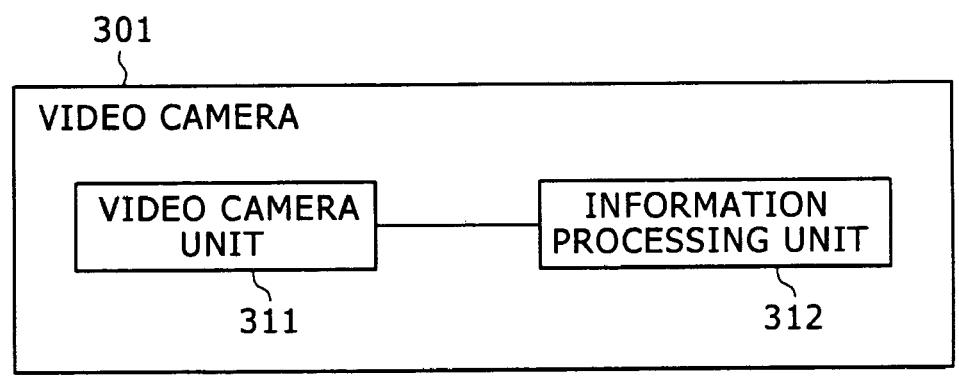
FIG. 41 is a block diagram showing a typical structure of a video camera included in FIG. 40.

FIG. 41 is a block diagram showing a typical structure of the video camera 301 in FIG. 40. The video camera 301 is constituted by a video camera unit 311 and an information processing unit 312. The video camera unit 311 has the same structure as that shown in FIG. 3 (FIG. 5). That is, the video camera unit 311 stores into the storage unit 13 the picked-up picture sequence acquired through the lens 3 together with the recognition-use picture sequence obtained through the lens 4 in synchronism with the picked-up picture sequence.

Figure 42:
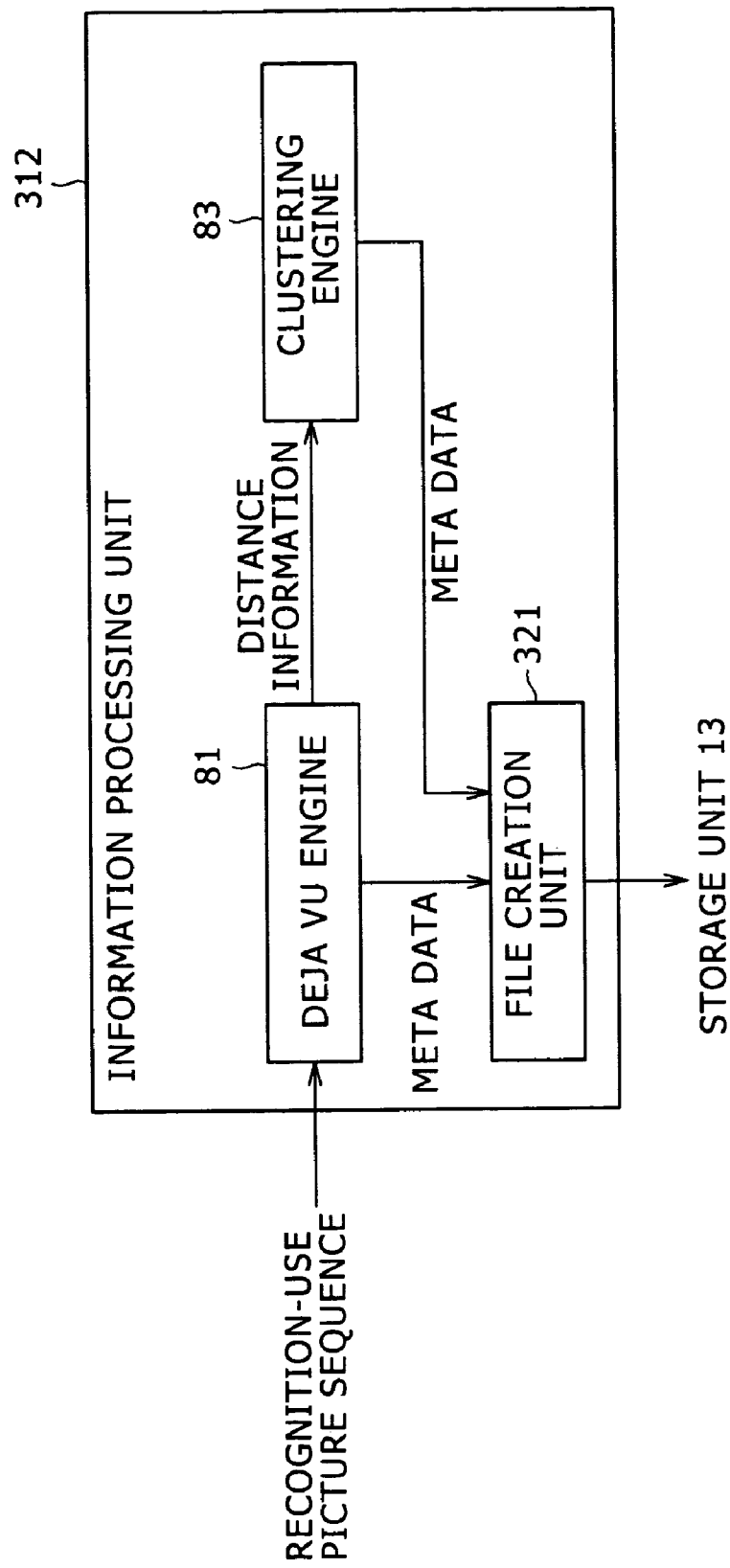
FIG. 42 is a block diagram showing a typical functional structure of an information processing unit included in FIG. 40.

FIG. 42 is a block diagram showing a typical functional structure of the information processing unit 312. In FIG. 42, the same components already mentioned are designated by similar numerals.

The information processing unit 312 is made up of a déjà vu engine 81, a clustering engine 83, and a file creation unit 321. As shown in FIG. 42, the information processing unit 312 includes components other than the déjà vu player 82 and digest player 84 indicated in FIG. 8.

Although not explained in detail, the déjà vu engine 81 calculates scene-to-scene distances using the recognition-use picture sequence held in the storage unit 13 of the video camera unit 311, and outputs the distance information containing a matrix of the calculated distances to the clustering engine 83. The déjà vu engine 81 further creates link data based on the calculated scene-to-scene distances, and outputs the created link data to the file creation unit 321 as meta data. That is, the déjà vu engine 81 in FIG. 42 has the same structure as that shown in FIG. 9.

Meanwhile, the clustering engine 83 in FIG. 42 processes the scenes into clusters based on the distance information sent from the déjà vu engine 81, and outputs cluster data derived from the clustering to the file creation unit 321 as meta data. That means the clustering engine 83 in FIG. 42 has the same structure as that shown in FIG. 27.

The file creation unit 321 integrates the meta data coming from the déjà vu engine 81 with the meta data fed from the clustering engine 83 into a single meta data file. The meta data file thus created includes the link data described as shown in FIG. 19 and the cluster data described as indicated in FIGS. 33 and 34. The meta data file created by the file creation unit 321 is output to the storage unit 13 of the video camera unit 311 for storage along with the picked-up picture sequence. From the storage unit 13, the picked-up picture sequence and meta data file are captured in wired or wireless fashion into the player 302 in a suitably timed manner.

Figure 43:
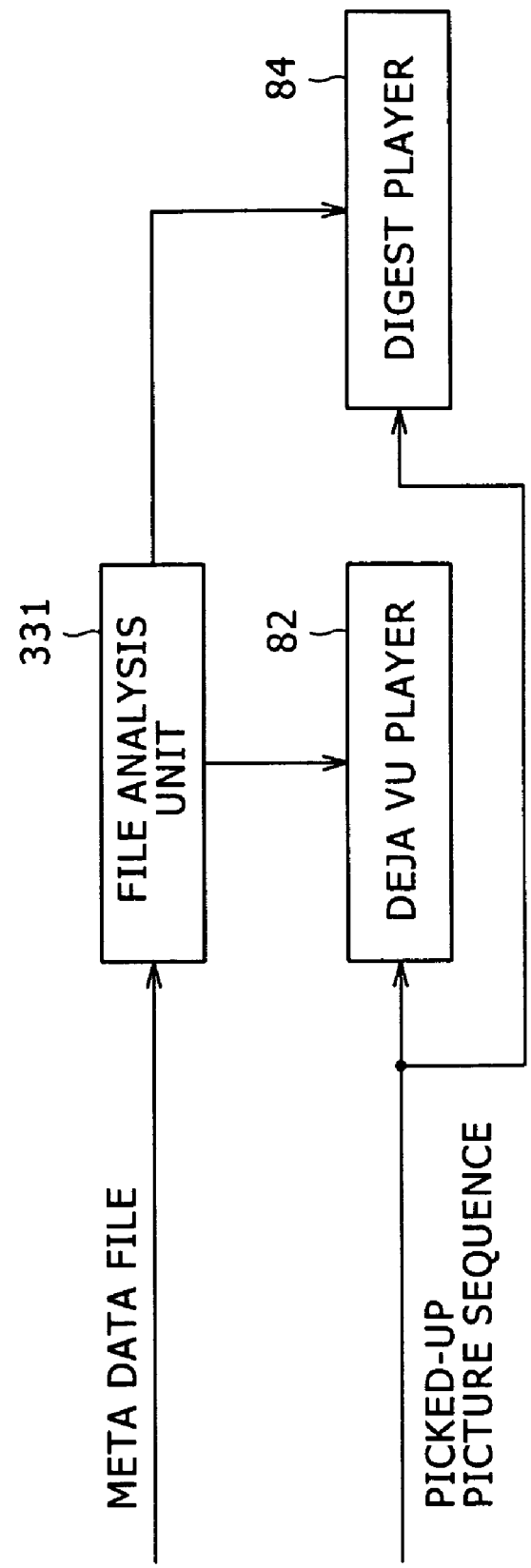
FIG. 43 is a block diagram showing a typical functional structure of a player included in FIG. 40.

FIG. 43 is a block diagram showing a typical functional structure of the player 302 in FIG. 40. The player 302 has the same structure as that of the personal computer 2 in FIG. 7. The CPU of the player 302 implements at least part of the components in FIG. 43 by carrying out appropriate programs.

As shown in FIG. 43, the player 302 includes something other than the déjà vu engine 81 and clustering engine 83 in FIG. 8 for creating meta data. A file analysis unit 331 analyses the meta data captured from the video camera 301 and held in a storage unit, not shown. Following the analysis, the file analysis unit 331 outputs the link data and cluster data described in the meta data file to the déjà vu player 82 and digest player 84, respectively.

In accordance with the link data sent from the file analysis unit 331, the déjà vu player 82 reproduces and displays the picked-up picture sequence. In other words, the déjà vu player 82 has the same structure as that shown in FIG. 20. An external display device that may be attached to the player 302 displays the screen such as the one shown in FIG. 21.

Meanwhile, given the cluster data from the file analysis unit 331, the digest player 84 reproduces and displays the picked-up picture sequence accordingly. That means the digest player 84 has the same structure as that shown in FIG. 35. The external display device attached to the player 302 shows the screen such as the one indicated in FIG. 36.

Where the meta data is created on the camera side as described above, the user need only get a suitable reproducing apparatus to capture the created meta data along with the picked-up picture sequence from the camera. The picked-up picture sequence is then reproduced on the basis of the meta data.

As described, of the components shown in FIG. 8, some may be configured on the image pickup side and the others on the reproducing side in a manner as deemed appropriate.

Figure 44:
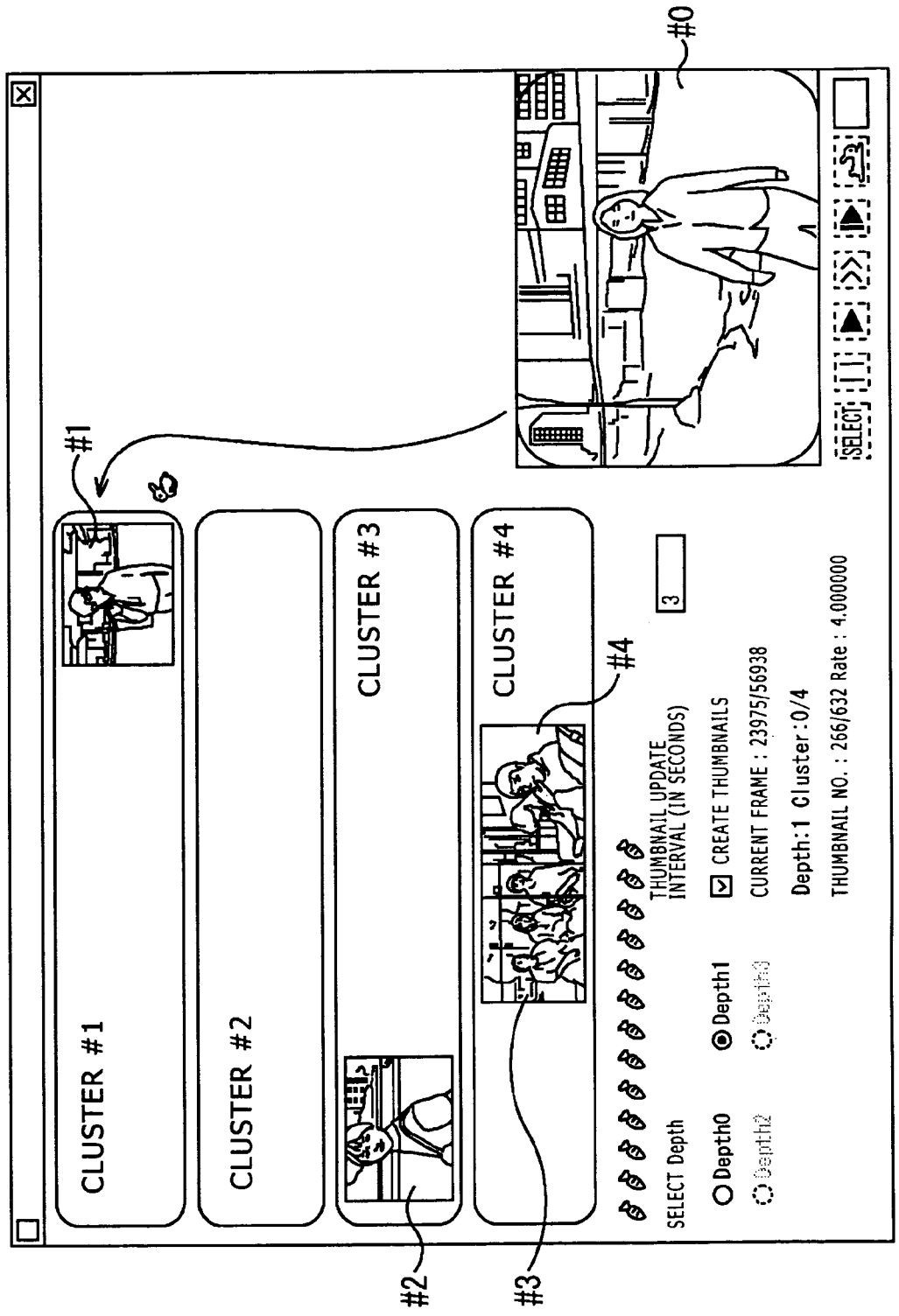
FIG. 44 is a schematic view showing another typical display of results from clustering.

When meta data is created by the camera, the screen such as the one shown in FIG. 44 may be displayed by the reproducing apparatus. The screen of FIG. 44 is displayed illustratively when the meta data created on the image pickup side is being captured along with the picked-up picture sequence.

In FIG. 44, a picture #0 displayed in the bottom right area of the screen is currently subject to capture. The picture is shown moved to cluster areas on the left-hand half of the screen, in keeping with the description of the meta data.

For example, if the picture #0 belongs to a cluster #1, the picture is moved into the area for the cluster #1 as indicated by an arrowed solid line. The moved picture is displayed in the form of a thumbnail together with any other pictures that may have been placed previously in the area of the cluster #1. In the example of FIG. 44, a picture #1 is shown displayed already in the area for the cluster #1. Likewise, a previously captured picture #2 is shown in the area for a cluster #3, and captured pictures #3 and #4 are shown in the area for a cluster #4.

These displays enable the user to ascertain which scenes belong to which clusters while the picked-up picture sequence is being captured. This makes it easy for the user to check out the scenes that the user may wish to view later on.

In the description above, as shown in FIG. 1, the optical axes of the lens 3 and wide-angle lens 4 are shown to be substantially in the same direction. Alternatively, the wide-angle lens 4 may be mounted on a different camera enclosure side from that for the lens 3 in such a manner that their optical axes are different. It has been assumed that the degrees of similarity between the scenes making up the recognition-use picture sequence correspond to the degrees of similarity between the scenes constituting the picked-up picture sequence. Given that assumption, the optical axis of the recognition-use picture sequence need not be in the same direction as that of the picked-up picture sequence when the user takes pictures of different places distinguished by obviously different scenes making up the recognition-use picture sequence.

Figure 45A:
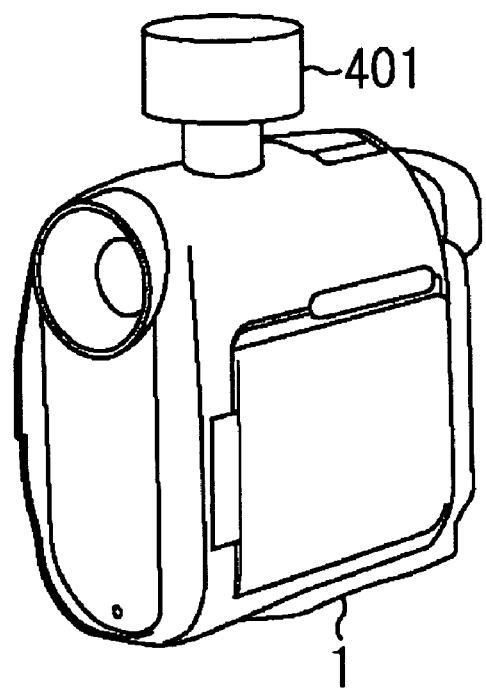
FIGS. 45A and 45B are external views of the video camera.

For example, as shown in FIG. 45A, a panorama camera 401 may be mounted on the top of the video camera 1. By use of the pictures taken by the panorama camera 401, it is possible to calculate scene-to-scene distances just as effectively.

Figure 45B:
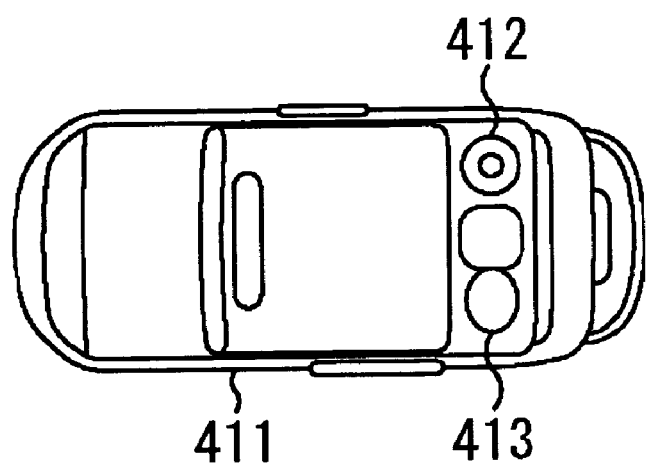

Furthermore, as shown in FIG. 45B, a recognition-use camera unit 413 may be mounted near a camera unit 412 of a mobile phone 411. That is, the inventive structure may be applied to diverse devices other than the video camera as long as they have image pickup capabilities.

In the foregoing description, it was shown that the sequence of pictures reproduced in keeping with suitably calculated scene-to-scene distances is picked up by the video camera. However, this is not limitative of the invention. Alternatively, recorded TV programs may also be reproduced under the inventive scheme. In this case, the distances between all scenes making up the recorded TV program of interest are first calculated. As with the picture sequence picked up by the video camera, the scenes are then linked together or processed into clusters according to suitable criteria.

For example, the moving picture display area 131 in FIG. 21 may display a user-selected recorded TV program, and the user may be presented automatically with scenes similar to the currently reproduced scene of the program. This allows the user to gain easy access to other TV programs containing similar scenes or to start reproducing one of the similar scenes.

The moving picture display area 221 in FIG. 36 may also display the user-selected recorded TV program, and a distribution of the scenes belonging to the clusters involved may be displayed. This also enables the user to reproduce only the similar scenes consecutively.

Although it was shown above that scenes are clustered solely for the purpose of getting similar scenes reproduced in clusters, this is not limitative of the invention. Alternatively, the user may have the picked-up picture sequence formed into clusters in order to record desired clusters to a storage medium such as DVD or transmit the clusters to another apparatus over a network.

The series of steps or processes described above may be executed either by hardware or by software. For the software-based processing to take place, the programs constituting the software may be either incorporated beforehand in dedicated hardware of a computer or installed upon use over a network or from a suitable recording medium into a general-purpose personal computer or like equipment capable of executing diverse functions based on the installed programs.

As shown in FIG. 7, the recording medium is offered to the user apart from the computer or like equipment not only as removable media 71 constituted by magnetic disks (including flexible disks), optical disks (including CD-ROM (compact disk-read only memory) and DVD (digital versatile disk)), magneto-optical disks (including MD (Mini-disk; registered trademark)), or a semiconductor memory, each of the media carrying the necessary programs; but also in the form of the ROM 62 or a hard disk drive included in the storage unit 68, both accommodating the programs and incorporated beforehand in the computer.

In this specification, the steps describing the programs to be executed represent not only the processes that are to be carried out chronologically in the depicted sequence but also processes that may be performed parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. A picture processing apparatus comprising:
   acquiring means which, apart from a first picture sequence picked up for reproduction purposes, acquires a second picture sequence picked up in synchronism with said first picture sequence, said second picture sequence being made up of pictures wider in angle than those included in said first picture sequence;
   calculating means for calculating degrees of similarity between scenes each made up of a predetermined number of consecutive pictures included in said second picture sequence;
   linking means which, after appropriating the degrees of similarity calculated by said calculating means for the degrees of similarity between the corresponding scenes in said first picture sequence, links together those of said corresponding scenes which have high degrees of similarity in said first picture sequence thereby creating a link destination from the first picture sequence to the second picture sequence;
   reproducing means for reproducing said first picture sequence on a screen; and
   displaying means which, while said first picture sequence is being reproduced by said reproducing means on the screen, displays said second picture sequence established as the link destination for said first picture sequence on said screen in a position different from that in which said first s picture sequence is being displayed.

2. The picture processing apparatus according to claim 1, wherein, in linking the scenes of said first picture sequence, said linking means establishes, as the link destination for a first scene in said first picture sequence, a second scene having a high degree of similarity to said first scene.

3. The picture processing apparatus according to claim 2, wherein said linking means establishes, as the link destination for said first scene, said second scene having a pickup timestamp separated from that of said first scene by a predetermined time period, said second scene being one of the scenes having high degrees of similarity to said first scene.

4. The picture processing apparatus according to claim 2, wherein said reproducing means starts reproducing said second scene when said second scene being displayed by said displaying means is selected by a user.

5. The picture processing apparatus according to claim 1, wherein said linking means searches said first picture sequence for scenes based on said degrees of similarity calculated by said calculating means.

6. The picture processing apparatus according to claim 1, wherein said linking means processes said scenes of said first picture sequence into clusters in accordance with said degrees of similarity.

7. The picture processing apparatus according to claim 6, wherein said linking means establishes a degree of cluster granularity so as to process all scenes of said first picture sequence into a number of clusters determined by the established granularity.

8. The picture processing apparatus according to claim 7, wherein said linking means establishes a plurality of degrees of said cluster granularity so as to process all scenes of said first picture sequence into a number of clusters determined by each of the established degrees of the granularity.

9. The picture processing apparatus according to claim 6, further comprising
reproducing means for reproducing on a screen the scenes belonging to a particular cluster of said first picture sequence following the clustering performed by said linking means.

10. The picture processing apparatus according to claim 9, further comprising
distribution displaying means for displaying a distribution of the scenes belonging to said cluster on a time base following said clustering performed by said linking means, said distribution being displayed on the same screen but in a position different from that in which said scenes reproduced by said reproducing means are displayed.

11. The picture processing apparatus according to claim 10, wherein said reproducing means starts reproducing a scene selected from said distribution of said scenes belonging to said cluster, said distribution being displayed by said distribution displaying means.

12. The picture processing apparatus according to claim 1, wherein said calculating means calculates the degrees of similarity between the scenes of said second picture sequence by matching a feature quantity of each of the pictures included in each of said scenes, against a hidden Markov model (HMM) generated from said second picture sequence.

13. The picture processing apparatus according to claim 1, further comprising
creating means for creating meta data representative of results of the linking performed by said linking means, the created meta data being stored in conjunction with said first picture sequence.

14. A picture processing method comprising the steps of:
acquiring, apart from a first picture sequence picked up for reproduction purposes, a second picture sequence picked up in synchronism with said first picture sequence, said second picture sequence being made up of pictures wider in angle than those included in said first picture sequence;
calculating degrees of similarity between scenes each made up of a predetermined number of consecutive pictures included in said second picture sequence;
appropriating the degrees of similarity calculated in said calculating step for the degrees of similarity between the corresponding scenes in said first picture sequence;
linking together those of said corresponding scenes which have high degrees of similarity in said first picture sequence to create a link destination from the first picture sequence to the second picture sequence;
reproducing said first picture sequence on a screen; and
displaying, while said first scene is being reproduced by said step of reproducing on the screen, said second scene established as the link destination for said first scene on said screen in a position that is different from that in which said first scene is being displayed.

15. A computer readable medium having computer instructions recorded thereon, the computer instructions configured to cause a computer to execute a method, the method comprising the steps of:
acquiring, apart from a first picture sequence picked up for reproduction purposes, a second picture sequence picked up in synchronism with said first picture sequence, said second picture sequence being made up of pictures wider in angle than those included in said first picture sequence;
calculating degrees of similarity between scenes each made up of a predetermined number of consecutive pictures included in said second picture sequence; and
appropriating the degrees of similarity calculated in said calculating step for the degrees of similarity between the corresponding scenes in said first picture sequence;
linking together those of said corresponding scenes which have high degrees of similarity in said first picture sequence to create a link destination from the first picture sequence to the second picture sequence;
reproducing said first picture sequence on a screen; and
displaying, while said first scene is being reproduced by said step of reproducing on the screen, said second scene established as the link destination for said first scene on said screen in a position that is different from that in which said first scene is being displayed.

16. A picture processing apparatus comprising:
an input device that, apart from a first picture sequence picked up for reproduction purposes, acquires a second picture sequence picked up in synchronism with said first picture sequence, said second picture sequence being made up of pictures that are wider in angle than pictures included in said first picture sequence;
a processor that calculates degrees of similarity between scenes of a predetermined number of consecutive pictures included in said second picture sequence and scenes of a predetermined number of consecutive pictures included in said first picture sequence, and that links together corresponding scenes which have high degrees of similarity in said first picture sequence thereby creating a link destination from the first picture sequence to the second picture sequence;
a display device that reproduces said first picture sequence on a screen, and displays the second picture sequence established as the link destination for said first picture sequence on the screen at the same time during which said first picture sequence is being reproduced on the screen, in a position different from that in which said first s picture sequence is being displayed.

* * * * *